US007848868B2

(12) United States Patent
Nakagawa et al.

(10) Patent No.: US 7,848,868 B2
(45) Date of Patent: Dec. 7, 2010

(54) METHOD AND APPARATUS FOR PRESSURE REDUCING VALVE TO REDUCE FUEL PRESSURE IN A COMMON RAIL

(75) Inventors: Hironari Nakagawa, Nagoya (JP); Shigeki Hidaka, Kariya (JP); Kensuke Tanaka, Hekinan (JP); Hatsuo Okada, Hekinan (JP)

(73) Assignee: Denso Corporation, Kariya (JP)

( * ) Notice: Subject to any disclaimer, the term of this patent is extended or adjusted under 35 U.S.C. 154(b) by 762 days.

(21) Appl. No.: 11/896,739

(22) Filed: Sep. 5, 2007

(65) Prior Publication Data

US 2008/0059039 A1 Mar. 6, 2008

(30) Foreign Application Priority Data

Sep. 5, 2006 (JP) ............................ 2006-240490

(51) Int. Cl.
*G06G 7/70* (2006.01)
*G06F 19/00* (2006.01)

(52) U.S. Cl. ......................... 701/99; 701/104; 123/357; 123/458; 137/487.5

(58) Field of Classification Search ................... 701/99, 701/104; 123/458, 447, 497, 357, 501; 700/282; 137/487.5, 488
See application file for complete search history.

(56) References Cited

U.S. PATENT DOCUMENTS

| | | | | | |
|---|---|---|---|---|---|
| 3,844,263 | A | * | 10/1974 | Endo et al. | 123/458 |
| 4,359,032 | A | * | 11/1982 | Ohie | 123/458 |
| 4,597,369 | A | * | 7/1986 | Yasuhara | 123/458 |
| 5,577,479 | A | * | 11/1996 | Popp | 123/458 |
| 5,697,338 | A | * | 12/1997 | Hirose et al. | 123/357 |
| 6,142,120 | A | * | 11/2000 | Biester et al. | 123/456 |
| 6,142,121 | A | * | 11/2000 | Nishimura et al. | 123/456 |

(Continued)

FOREIGN PATENT DOCUMENTS

DE 10 2006 035312 A1 8/2007

(Continued)

OTHER PUBLICATIONS

LQG control for minimization of emissions in a diesel engine; Karlsson, M.; Ekholm, K.; Strandh, P.; Johansson, R.; Tunestal, P.; Control Applications, 2008. CCA 2008. IEEE International Conference on; Digital Object Identifier: 10.1109/CCA.2008.4629619 Publication Year: 2008 , pp. 245-250.*

(Continued)

*Primary Examiner*—Cuong H Nguyen
(74) *Attorney, Agent, or Firm*—Nixon & Vanderhye PC

(57) ABSTRACT

It is a objective of the present invention to provide a control apparatus which is capable of compensating a delay time for opening a pressure reducing valve since an electronic control unit sends a command signal for driving the pressure reducing valve so as to discharge high pressure fuel in a fuel accumulating device of a fuel injection system for the internal combustion engine. The delay time control apparatus for opening a pressure reducing valve has a potential for avoiding an overshoot phenomenon in which an actual pressure of fuel accumulated in the fuel accumulating device overshoots a target value of fuel pressure during the increase the fuel pressure of the fuel accumulating device.

27 Claims, 23 Drawing Sheets

U.S. PATENT DOCUMENTS

| | | | | |
|---|---|---|---|---|
| 6,349,702 | B1 * | 2/2002 | Nishiyama | 123/456 |
| 6,840,220 | B2 * | 1/2005 | Yomogida et al. | 123/456 |
| 6,966,300 | B2 | 11/2005 | Fukuda | |
| 7,293,548 | B2 * | 11/2007 | Oono | 123/446 |
| 7,347,188 | B2 * | 3/2008 | Ohshima | 123/458 |
| 2003/0051709 | A1 | 3/2003 | Yu | |
| 2005/0224049 | A1 * | 10/2005 | Eser | 123/446 |
| 2007/0044763 | A1 * | 3/2007 | Ohshima | 123/458 |

FOREIGN PATENT DOCUMENTS

| | | | |
|---|---|---|---|
| EP | 1 030 047 | A2 | 8/2000 |
| EP | 1 030 048 | A2 | 8/2000 |
| EP | 1088981 | A2 | 4/2001 |
| EP | 1 304 470 | A2 | 4/2003 |
| JP | H08-177583 | | 7/1996 |
| JP | H11-062683 | | 3/1999 |
| JP | H11-257141 | | 9/1999 |
| JP | 2000-240494 | | 9/2000 |
| JP | 2001-115884 | | 4/2001 |
| JP | 2001-182638 | | 7/2001 |
| JP | 2002-371940 | | 12/2002 |
| JP | 2003-120457 | | 4/2003 |
| JP | 2005-139928 | | 6/2005 |
| JP | 2006-132481 | | 5/2006 |

OTHER PUBLICATIONS

Constrained control of Homogeneous Charge Compression Ignition (HCCI) engines; Chia-Jui Chiang; Chian-Ling Chen; Industrial Electronics and Applications (ICIEA), 2010 the 5th IEEE Conference on; Digital Object Identifier: 10.1109/ICIEA.2010.5515149; Publication Year: 2010 , pp. 2181-2186.*

Feedback control of fuel injection based on online valve closure point detection; Lin Chen; Lei Liu; Fuyang Yang; Jianqiu Li; Minggao Ouyang; Industrial Electronics, 2009. ISIE 2009. IEEE International Symposium on; Digital Object Identifier: 10.1109/ISIE.2009.5217931; Publication Year: 2009 , pp. 70-75.*

Simulation of diesel fuel injection system based on different kinds of delivery valves; Wenfu Sun; Xiaobo Li; Yu Ding; Guixin Wang; Control and Decision Conference (CCDC), 2010 Chinese; Digital Object Identifier: 10.1109/CCDC.2010.5498825 Publication Year: 2010 , pp. 2366-2370.*

Rotational angle based pressure control of a common rail fuel injection system for internal combustion engines; Zhen Zhang; Zongxuan Sun; American Control Conference, 2009. ACC '09. Digital Object Identifier: 10.1109/ACC.2009.5160566 Publication Year: 2009 , pp. 2690-2695.*

A new gasoline injector with exhaust gas recirculation; Xiaolu Li; Xiaoming Fang; Vehicle Power and Propulsion Conference, 2008. VPPC '08. IEEE; Digital Object Identifier: 10.1109/VPPC.2008.4677617; Publication Year: 2008 , pp. 1-5.*

A compact flexible pellet injector for the TJ-II stellarator ; McCarthy, K. J. et al.; Review of Scientific Instruments vol. 79 , Issue: 10; Digital Object Identifier: 10.1063/1.2955706; Publication Year: 2008 , pp. 10F321-10F321-3.*

Control of an electronic throttle valve based on concepts of sliding-mode control; Horn, M.et al.; Control Applications, 2008. CCA 2008. IEEE International Conference on; Digital Object Identifier: 10.1109/CCA.2008.4629609; Publication Year: 2008 , pp. 251-255.*

Influence of fuel supply-advanced angle and injection starting pressure on the emission performance of D30 engine Zhu Jianjun et al.; Mechanic Automation and Control Engineering (MACE), 2010 International Conference on; Digital Object Identifier: 10.1109/MACE.2010.5535736; Publication Year: 2010 , pp. 5741-5744.*

Numerical Simulation of Injection and Mixing on New Power Systems of Liquid-Fueled Pulse Detonation Engines Yanli Guo et al.; Power and Energy Engineering Conference (APPEEC), 2010 Asia-Pacific; Digital Object Identifier: 10.1109/APPEEC.2010.5448371; Publication Year: 2010 , pp. 1-4.*

13 Mode Fuel Benefit Investigation Using Variable Valve Timing in a Heavy Duty Diesel Engine; Deng, J.; Stobart, R.; Power and Energy Engineering Conference, 2009. APPEEC 2009. Asia-Pacific; Digital Object Identifier: 10.1109/APPEEC.2009.4918032; Publication Year: 2009 , pp. 1-6.*

Low Power Piezoelectric Micro Mass Flow Controller for Liquid Fuel Injection; Schiffer, M. et al,; Sensors, 2007 IEEE Digital Object Identifier: 10.1109/ICSENS.2007.4388672; Publication Year: 2007 , pp. 1392-1395.*

Extended European Search Report dated Dec. 11, 2007 in Application No. EP 07017407.3-2311.

Japanese Office Action dated Jun. 1, 2010, issued in corresponding Japanese Application No. 2006-240490, with English translation.

* cited by examiner

DELAY TIME IN CLOSING PRESSURE REDUCING VALVE [ms]

CENTRAL CHARACTERISTIC

| | | | | |
|---|---|---|---|---|
| 3.5 | 3.0 | 2.0 | 1.5 | 1.0 |

0 100 200 FUEL PRESSURE IN COMMON RAIL

HOLDING CURRENT

| | | | | |
|---|---|---|---|---|
| | 1.5 | | | 2.5 |
| | | | 2.0 | 2.0 |
| | 1.0 | | | |
| | | | | |

-40 0 200

TEMPERATURE OF TUBULAR COIL (TEMPERATURE OF FUEL)

OFFSET OF DELAY TIME IN CLOSING PRESSURE REDUCING VALVE [ms]

METHOD AND APPARATUS FOR PRESSURE REDUCING VALVE TO REDUCE FUEL PRESSURE IN A COMMON RAIL

CROSS REFERENCE TO RELATED APPLICATION

The present application relates to and incorporates by references Japanese Patent Application No. 2006-240490 filed on Sep. 5, 2006.

BACKGROUND OF THE INVENTION

1. The Field of the Invention

The present invention relates to a technique for a pressure reducing valve assembled in a common rail type fuel injection system, in particular relates to the technique to accurately reduce a pressure of fuel accumulated in the common rail using the pressure reducing valve.

2. Description of the Prior Art

As fuel injection systems for internal combustion engines, a common rail type fuel injection system has been known. In the common rail type fuel injection system, high pressure fuel is accumulated in an accumulation device connected to injection pipes each being directed to an individual injector on respective ends assigned to respective engine cylinders. Such a fuel injection apparatus for a diesel engine is generally referred to as a "common rail" connecting between a high pressure pump pipe and injection pipes. Injectors are triggered individually by an engine control system. In such an accumulator fuel injection system for the internal combustion engines or a common rail fuel injection system for the diesel engines, high pressure fuel is accumulated in the fuel accumulating device (i.e., the common rail). One of the characteristic features of these systems is that the pressure of fuel accumulated in the fuel accumulating device is extremely high, which for example is about 150 Mpa or more in some diesel engines.

A typical fuel injection system for internal combustion engine comprises a fuel accumulating device (a common rail for a diesel engine), which is connected to an injection block that includes injection pipes and a plurality of injectors. The fuel accumulating device is further connected to a high pressure pump for pumping high pressure fuel through a high pressure pump pipe. The high pressure pump is a high pressure fuel supplier to the fuel accumulating device after fuel is drawn from a fuel tank and is highly compressed. The fuel accumulating device is provided in the interior thereof with an accumulation chamber for accumulating high pressure fuel. Injectors are mounted on respective cylinders of the engine for injecting fuel into the respective cylinders. Therefore, fuel is normally transported from the high pressure pump to each of the injectors in the respective cylinders of the engine. The high pressure pipe are connected to the respective cylinders via the high pressure pump pipe, the accumulation chamber of the fuel accumulating device, and the respective injection pipes. The injectors are connected at a downstream end of the plurality of injection pipes branching out from the fuel accumulating device. Each injector includes essentially a fuel nozzle or atomizer and a solenoid valve. The solenoid valve is energized by an electronic control unit (ECU) via an engine drive unit (EDU). The ECU is configured to activate the injection of fuel into each cylinder of the internal combustion engine in response to signals not only from an accelerator pedal driven by a vehicle driver but also from sensors mounted on the vehicle. The sensors monitor engine conditions. The engine conditions include such members as crank speed, cam phase, air temperature, coolant water temperature, boost pressure, and air mass. When the solenoid valve is de-energized, the injection stops. Fuel leaked from the injectors is returned to a fuel tank via a relief pipe.

In addition to the above mentioned typical fuel injection system for internal combustion engines, in particular, for diesel engines, there is a further known a common rail type fuel injection system in which a pressure reducing valve is provided with a fuel accumulating device which discharges the high pressure fuel stored in the fuel accumulating device for reducing the internal pressure of the common rail. Such a system having the fuel accumulating device with a pressure reducing valve is disclosed, for example, in Japanese Unexamined Patent Publication 2005-139928, corresponding to U.S. Pat. No. 6,966,300 to Fukuda.

In the common rail type fuel injection system according to Fukuda, a pressure reducing valve and a pressure sensing means for sensing a fuel pressure in the fuel accumulating device are included in addition to the typical devices of the above mentioned typical common rail type fuel injection systems. Both of the pressure reducing valve and the pressure sensing means are generally installed in the fuel accumulating device, but alternatively, only the pressure reducing valve can be installed in the fuel accumulating device, and the pressure sensing means can be externally connected to the fuel accumulating device. The pressure reducing valve adjusts a degree of opening of a drain passage, through which the fuel accumulated in the fuel accumulating device is drained. A maximum draining rate of the pressure reducing valve for draining the fuel accumulated in the fuel accumulating device is greater than a maximum feed rate of fuel. The fuel is fed from the high pressure pump to the fuel accumulating device via the high pressure pump pipe. The degree of opening is controlled by the electronic control unit (ECU) based on results of continuously measured fuel pressure in the fuel accumulating device by the pressure sensing means so that the fuel pressure in the accumulating device reaches to and agrees with a predetermined target value of the fuel pressure.

Thus, if a target value of fuel pressure in the fuel accumulating device is set near the upper limit value over which the fuel accumulation cannot withstand, an actual pressure on the fuel accumulating device may overshoot the target value during the increase of the fuel pressure in the fuel accumulating device. Hence, in the worst case, the fuel accumulating device will be broken since fuel pressure therein exceeds the limit value.

Further, if a target value of the fuel pressure in the fuel accumulating device is set near the lower limit value under which the engine cannot continue running, an actual pressure on the fuel accumulating device may undershoot the target value during the decrease of the fuel pressure in the fuel accumulating device. In the worst case, the diesel engine may be stopped. In the diesel engine, fuel is ignited when fuel and hot compressed air are mixed in the engine cylinder. However, in the state where the fuel pressure in the fuel accumulating device undershoots the target value while the pressure reducing valve is opened so as to discharge high pressure fuel from the fuel accumulating device, fuel is not sufficiently compressed for ignition.

SUMMARY OF THE INVENTION

The present invention addresses the above disadvantages.

It is an object of the present invention to provide a control apparatus for a pressure reducing valve provided with a fuel accumulating device of a fuel injection system mounted on a vehicle for injecting the fuel into an internal combustion engine installed in the vehicle and is actuated in order to discharge a fuel accumulated in the fuel accumulating device in response to a command signal with a delay time being defined as an interval between a time when the command signal is outputted from a control unit of the fuel injection system and a further time when the pressure reducing valve starts to move for adjusting a degree of opening thereof, the control apparatus comprises engine condition detecting means for detecting either an operating state or an operating condition of the internal combustion engine, either the operating state or the operating condition at least including fuel pressure in the fuel accumulating device sequentially, target reducing time estimating means for estimating a target reducing time when the fuel pressure in the fuel accumulating device reaches at a predetermined target value of the fuel pressure in the fuel accumulating device, delay time estimating means for estimating the delay time in accordance with either the operating state or the operating conditions of the internal combustion engine detected by the engine condition detecting means, a required time estimating means for estimating a required time which needs until the fuel pressure in the fuel accumulating device reaches the target value, and a valve control command outputting means for outputting the command signal to the pressure reducing valve to adjust the degree of opening of the pressure reducing valve when the required time estimated by the required time estimating means becomes to be shorter than the delay time estimated by the delay time estimating means such that the pressure reducing valve starts to change the degree of opening thereof when the fuel pressure in the fuel accumulating device arrives at the target value.

According to a first aspect of the present invention, it is a object of the present invention to provide a control apparatus which is capable of compensating a delay time for opening a pressure reducing valve since an electronic control unit (ECU) has send a command signal for driving the pressure reducing valve so as to discharge high pressure fuel in a fuel accumulating device (a common rail) of a fuel injection system for the internal combustion engine. The delay time control apparatus for opening a pressure reducing valve has a potential for avoiding an overshoot phenomenon in which an actual pressure of fuel accumulated in the fuel accumulating device overshoots a target value of fuel pressure during the increase the fuel pressure of the fuel accumulating device. Therefore, it is possible to prevent the fuel accumulating device from breaking due to the overshooting of the pressure limit of the fuel accumulating device.

In more detail, the control apparatus for compensating a delay in opening a pressure reducing valve (hereinafter referred to as an "delay time control apparatus for opening the pressure reducing valve") comprises fuel pressure sensing means for sensing fuel pressure of a fuel accumulating device, engine condition sensing means for measuring a condition of the internal combustion engine in order to estimate a delay time for opening a pressure reducing valve and the like, fuel pressure obtaining means for obtaining the fuel pressure of the fuel accumulating device, target reducing time estimating means for estimating the target reducing time when the fuel accumulating device reaches a target value of the fuel pressure based on a time sequential data of the fuel pressure of the fuel accumulating device, such as rates of change in the fuel pressure with time, obtained by the fuel pressure obtaining means during a pressure reducing valve closed period over which the pressure reducing valve is closed, delay time estimating means for estimating a delay time which is needed to be taken into consideration in order to accurately estimate the target reducing time when the fuel accumulating device reaches the target pressure of fuel based on the current value of fuel pressure, a time sequential data of fuel pressure of the fuel accumulating device, and at least one parameter obtained by the engine condition sensing means, required time estimating means for estimating time required for reaching the target pressure meeting time, judging means for judging whether or not a current time is the required time before the target pressure meeting time, and valve opening command signal sending means for sending the valve opening command signal for opening the pressure reducing valve from the electric control unit (ECU) to the magnetic circuit of the pressure reducing valve such that after receiving the valve opening command signal, the magnetic circuit starts supplying electric power to a tubular coil of the pressure reducing valve in order to open the pressure reducing valve.

If a delay time for opening the pressure reducing valve is defined as an interval between a first time when the magnetic circuit of the pressure reducing valve receives the command signal for opening the pressure reducing valve from the ECU and a second time when the valve member of the pressure reducing valve starts opening, the apparatus for controlling the pressure reducing valve of the fuel injection system for an internal combustion engine according to the present invention controls the pressure reducing valve with taking into consideration of the delay time for opening the pressure reducing valve.

Further, in order to achieve the objectives of the present invention, there is also provided a first computer program for opening a pressure reducing valve provided with a fuel accumulating device of a fuel injection system for the internal combustion engine. The first computer program is executed for controlling the pressure reducing valve so as to compensate a delay time for opening a pressure reducing valve since an electronic control unit (ECU) has sent a command signal for driving the pressure reducing valve. The first computer program for controlling the pressure reducing valve has a potential for avoiding an overshoot phenomenon in which an actual pressure of fuel accumulated in the fuel accumulating device overshoots a target value of fuel pressure during the increase the fuel pressure of the fuel accumulating device. Therefore, it is possible to prevent the fuel accumulating device from breaking due to the overshooting of the pressure limit of the fuel accumulating device.

The first computer program for opening the pressure reducing valve of the fuel injection system for an internal combustion engine, the fuel injection system having fuel pressure sensing means for sensing fuel pressure of a fuel accumulating device and engine condition sensing means for measuring a condition of the internal combustion engine in order to estimate a delay time for opening a pressure reducing valve, includes a fuel pressure obtaining module for obtaining the fuel pressure of the fuel accumulating device by the fuel pressure obtaining means, a target reducing time estimating module for estimating the target reducing time when the fuel accumulating device reaches a target value of the fuel pressure based on a time sequential data of the fuel pressure of the fuel accumulating device, for example rates of change in the fuel pressure with time, obtained by the fuel pressure obtaining module during a pressure reducing valve closed period over which the pressure reducing valve is closed, a delay time estimating module for estimating a delay time which is needed to be taken into consideration in order to accurately estimate the target reducing time when the fuel accumulating device reaches the target pressure of fuel based on the current value of fuel pressure, the time sequential data of fuel pressure of the fuel accumulating device, and at least one parameter obtained by the engine condition sensing means, a required time estimating module for estimating the time required for reaching the target pressure meeting time will be come, a judging module for judging whether or not a current time is the required time before the target pressure meeting time, and a valve opening command signal sending module for sending the valve opening command signal for opening the pressure reducing valve from the electric control unit (ECU) to the magnetic circuit of the pressure reducing valve such that after receiving the valve opening command signal, the magnetic circuit starts supplying electric power to a tubular coil of the pressure reducing valve in order to open the pressure reducing valve.

Thus, with the execution of the first computer program for opening the pressure reducing valve of the fuel injection system for an internal combustion engine, the ECU controls outputs the command signals for opening the pressure reducing valve at a timing which is the required time before the target pressure meeting time. Therefore, it is possible to reliably open the pressure reducing valve so as to discharge high pressure fuel accumulated in the fuel accumulating device.

In this way, fuel pressure can be prevented from overshooting the upper limit value.

Further, it is preferable that the valve opening command signal sending module starts running either at the time when the delay time for opening the pressure reducing valve becomes to be equal to the target reducing time or at the time when the delay time for opening the pressure reducing valve becomes to be smaller than the target reducing time. That is, the ECU outputs a command signal for opening the pressure reducing valve towards the magnetic circuit so as to move the rod and the valve member following the tubular coil which is energized by the magnetic circuit when the delay time for opening the pressure reducing valve becomes to be equal to or smaller than the target reducing time.

The fuel pressure sensing means for sensing fuel pressure of the fuel accumulating device provided with the fuel injection system for internal combustion engine includes a sensor for measuring fuel pressure inside the fuel accumulating device. The sensor is externally mounted on the fuel accumulating device.

The engine condition sensing means for measuring at least one condition of the internal combustion engine in order to estimate a delay time for opening the pressure reducing valve includes an accelerator sensor for measuring a degree of opening of an accelerator, an engine speed sensor for measuring an engine speed of the internal combustion engine, a coolant temperature sensor for measuring the temperature of the coolant of the internal combustion engine, an intake air temperature sensor foe measuring the temperature of the intake air and the like. These sensors are externally installed in the fuel injection system. In the delay time estimating means, the delay time for opening the pressure reducing valve is estimated based on at least one of the measurement results of the engine conditions obtained by the above mentioned sensors. Measuring tools of the engine condition sensing means are not limited to the sensors as mentioned above, but other tools can be used. For example, external tools which are not loaded on a vehicle having an internal combustion engine and the fuel injection system therefore are applicable if some information about the engine condition is obtainable.

Further, the delay time estimating means is configured to estimate the delay time for opening the pressure reducing valve based on at least one parameter indicating some condition of the internal combustion engine that can be obtained in several possible ways.

For example, in the above mentioned type opening delay time, the delay time estimating means performs such that after receiving parameters indicating some condition of the internal combustion engine from the engine condition sensing means, the delay time estimating means obtains the delay time for opening a pressure reducing valve by referring to a first reference table which contains a first plurality of relationships between parameters indicative of the conditions of the internal combustion engine and the delay times for opening a pressure reducing valve.

In other words, in the opening time control apparatus, the optimum delay times for opening a pressure reducing valve corresponding to parameters indicative of the conditions of the internal combustion engine are previously determined by preliminary experiments and other methods before this control apparatus starts running. The predetermined first relationships between the parameters and the delay times are summarized into a first reference table which is referred to in estimating the delay time for opening the pressure reducing valve. Therefore, the pressure reducing valve can be reliably opened so as to discharge high pressure fuel accumulated in the fuel accumulating device. Furthermore, it is possible to prevent fuel pressure from overshooting the upper limit value.

The first reference table referred to by the delay time estimating means is stored in either a memory provided with the electric control unit (ECU) or an external memory connected to the delay time control apparatus for opening delay time opening a pressure reducing valve.

It is preferable that a delay time control apparatus for opening the pressure reducing valve further comprises a delay time measurement means for measuring an actual delay time between a first time when the magnetic circuit of the pressure reducing valve receives the command signal for opening the pressure reducing valve from the ECU and a second time when the valve member of the pressure reducing valve is actually opened, and first reference table updating means for updating the first reference table after an opening procedure for opening the pressure reducing valve is completed. That is, the first plurality of relationships between the parameters and the delay times is corrected, if necessary, taking into consideration of additional data obtained by the actual opening procedure for opening the pressure reducing valve in addition to the data obtained by the fuel pressure sensing means, the engine condition sensing means, the fuel pressure obtaining means, the target reducing time estimating means, the delay time estimating means, the required time estimating means, the judging means, and the valve opening command signal sending means.

Therefore, in the delay time control apparatus for opening the pressure reducing valve having the delay time measurement means and the first reference table updating means, it is possible to correct predetermined relationships between the parameters and the delay times, even if the predetermined relationships contains an erroneous correlation between some parameter and some delay time. That is to say, every opening procedure gives an additional data for optimizing the first reference table in such a way that the delay time measurement means measures the actual delay time for opening the pressure reducing valve every time the command signal for opening the pressure reducing valve is outputted from the ECU to the magnetic circuit of the pressure reducing valve while the engine condition sensing means performs measurements for obtaining data indicative of the conditions of the internal combustion engine.

The first reference table updating means for updating the first reference table every time an opening procedure for opening the pressure reducing valve is completed, includes a fuel pressure sensor for measuring the fuel pressure in the fuel accumulating device, an accelerator sensor for measuring a degree of opening of an accelerator, an engine speed sensor for measuring an engine speed of the internal combustion engine, a coolant temperature sensor for measuring the temperature of the coolant of the internal combustion engine, and an intake air temperature sensor foe measuring the temperature of the intake air. These sensors are externally and internally installed in the fuel injection system. The measurement results derived from these sensors are used to determine the delay time for opening the pressure reducing valve in the first reference table updating means. Measuring tools of the first reference table updating means are not limited to the sensors as mentioned above, but other tools may also be used. For example, external tools which are not loaded on a vehicle having an internal combustion engine and a fuel injection system therefore are applicable if some information about the vehicle is obtainable.

It is preferable that the delay time control apparatus for opening the pressure reducing valve further comprises first learning commanding means for outputting a command signal to the magnetic circuit of the pressure reducing valve for opening the pressure reducing valve if a predetermined time for learning has been reached, in addition to the fuel pressure sensing means, the engine condition sensing means, the fuel pressure obtaining means, the target reducing time estimating means, the delay time estimating means, the required time estimating means, the judging means, and the valve opening command signal sending means.

In the delay time control apparatus for opening the pressure reducing valve having the first learning commanding means, it is possible to improve a degree of accuracy for estimating the delay time for opening the pressure reducing valve since the predetermined time for learning has been set so as to have a good timing for measuring the delay time for opening the pressure reducing valve and updating the first reference table.

It is preferable that a delay time control apparatus for opening the pressure reducing valve further comprises pressure intensifying means for intensifying the fuel pressure in the fuel accumulating device from the current value of the fuel pressure obtained by the fuel pressure sensing means to a first predetermined value of the fuel pressure and second learning commanding means for outputting a command signal to the magnetic circuit of the pressure reducing valve for opening the pressure reducing valve if the fuel pressure reaches a predetermined value, in addition to the fuel pressure sensing means, the engine condition sensing means, the fuel pressure obtaining means, the target reducing time estimating means, the delay time estimating means, the required time estimating means, the judging means, and the valve opening command signal sending means.

A control method performed by the delay time control apparatus for opening the pressure reducing valve having the pressure intensifying means comprises steps of: measuring a current value of fuel pressure in the fuel accumulating device, intensifying the fuel pressure in the fuel accumulating device from the current value of fuel pressure to a first predetermined value of fuel pressure, waiting until the fuel pressure in the fuel accumulating device reaches a second predetermined value of fuel pressure, and outputting a command signal for opening the pressure reducing valve to the magnetic circuit of the pressure reducing valve.

Therefore, the delay time control apparatus for opening the pressure reducing valve having the pressure intensifying means is capable of improving the accuracy of the delay time for opening the pressure reducing valve at a specified fuel pressure. The improved accuracy of the delay time at the specified fuel pressure is obtained by setting a suitable time when the first learning commanding means starts execution so as to permit the delay time estimating means to measure the delay time for opening the pressure reducing valve, setting the second predetermined value of the fuel pressure, at which there is a necessity of measuring the delay time for opening the pressure reducing valve, and setting the first predetermined value of the fuel pressure, which is higher than the second predetermined value of the fuel pressure.

Preferably, a plurality of second predetermined values are provided in addition to the second predetermined value mentioned above. In the case where there are the plurality of second predetermined values of the fuel pressure, the second learning commanding means starts operating every time a current fuel pressure in the fuel accumulating device obtained by the fuel pressure sensing means agrees with one of the plurality of the second predetermined values of the fuel pressure.

It is further preferable that the predetermined time for learning comes after the internal combustion engine is stopped.

In the delay time control apparatus for opening the pressure reducing valve wherein the predetermined time for learning comes after the internal combustion engine is stopped, the delay time since external disturbances on the measurement such as an engine noise are removed and fluctuations of the fuel pressure in the fuel accumulating device has been suppressed, can be accurately estimated by the delay time measurement means.

Further, the delay time estimating means is configured to estimate the delay time for opening the pressure reducing valve in several possible ways.

For example, it is preferable that a delay time control apparatus for opening pressure reducing valve further comprises a valve opening detecting means for detecting whether or not the pressure reducing valve is opened, in addition to the fuel pressure sensing means, the engine condition sensing means, the fuel pressure obtaining means, the target reducing time estimating means, the delay time estimating means, the required time estimating means, the judging means, and the valve opening command signal sending means.

For example, in the delay time control apparatus for opening the pressure reducing valve having the valve opening detecting means for detecting an opening of the pressure reducing valve, the valve opening detecting means for detecting an opening of the pressure reducing valve performs in such a away that after receiving time sequential values of the fuel pressure from the fuel pressure sensing means, the valve opening detecting means calculates changing ratios of the fuel pressure and obtains the delay time for opening the pressure reducing valve based on the changing ratios of the fuel pressure. Then, the valve opening command signal sending means performs in a such way that the magnetic circuit can start supplying electric power to the tubular coil of the pressure reducing valve in order to open the pressure reducing valve, and the delay time measurement means can measure the actual delay time for opening the pressure reducing valve which is defined as a period between a time when the valve opening command signal sending means sends the command signal for opening the pressure reducing valve and a further time when the valve opening detecting means detects the opening of the pressure reducing valve.

In this case where the valve opening detecting means detects the opening of the pressure reducing valve based on the changing ratios of the fuel pressure, there are advantages that no additional sensor, except for the pressure sensor usually provided with the fuel accumulating device, needs to detect the opening of the pressure reducing valve and that the delay in opening the pressure reducing valve can be measured. Therefore, the delay time control apparatus for opening the pressure reducing valve can be constructed with a small number of devices.

Further, in the delay time control apparatus for opening the pressure reducing valve, it is preferable that the fuel pressure obtaining means is configured to periodically detect the fuel pressure in the fuel accumulating device. A periodic time of detecting the fuel pressure in some conditions where the valve opening detecting means is in operation can be set to be shorter than that in other conditions.

Therefore, it is possible to improve the accuracy of the measured delay time obtained by the opening delay time estimating means because, when the pressure reducing valve is opened, the valve opening detecting means is capable of detecting the opening of the pressure reducing valve with minimum delay.

Similarly, as in the case of the delay time control apparatus for opening the pressure reducing valve, it is preferable that a computer program for compensating the delay time for opening the pressure reducing valve further comprises first delay time measuring module for measuring an actual delay time between a first time when the magnetic circuit of the pressure reducing valve receives the command signal for opening the pressure reducing valve from the ECU and a second time when the valve member of the pressure reducing valve is actually opened, and a first reference table updating module for updating the first reference table which contains a first plurality of relationships between parameters indicative of the conditions of the internal combustion engine and the delay times for closing a pressure reducing valve after completing an opening procedure for opening the pressure reducing valve. That is, the first plurality of relationships is corrected, if necessary, taking into consideration of additional data obtained by the actual opening procedure for opening the pressure reducing valve in addition to the data obtained by the fuel pressure sensing module, the engine condition sensing module, the fuel pressure obtaining module, the target reducing time estimating module, the sensing module, the delay time estimating module, the required time estimating module, the judging module, and the valve opening command signal sending module.

It is preferable that the computer program for compensating the delay time for opening the pressure reducing valve further comprises at least one of a first learning commanding module for outputting a command signal to the magnetic circuit of the pressure reducing valve if a predetermined time for learning arrives, a pressure intensifying module for intensifying the fuel pressure in the fuel accumulating device from the current value of the fuel pressure obtained by the fuel pressure sensing module to a first predetermined value of the fuel pressure, a second learning commanding module for outputting a command signal to the magnetic circuit of the pressure reducing valve if the fuel pressure reaches a predetermined value, and a valve opening detecting module for detecting whether or not the pressure reducing valve is opened, in addition to the fuel pressure sensing module, the engine condition sensing module, the fuel pressure obtaining module, the target reducing time estimating module, the sensing module, the delay time estimating module, the required time estimating module, the judging module, and the valve opening command signal sending module.

According to a second aspect of the present invention, it is a object of the present invention to provide a control apparatus which is capable of compensating a delay time for closing a pressure reducing valve (hereinafter referred to as a "delay time control apparatus for closing the pressure reducing valve) since an electronic control unit (ECU) has sent a command signal for driving the pressure reducing valve so as to stop discharging high pressure fuel in a fuel accumulating device (a common rail) of a fuel injection system for the internal combustion engine. The delay time control apparatus for closing a pressure reducing valve has a potential for preventing the occurrence of an undershoot phenomenon in which an actual pressure of fuel accumulated in the fuel accumulating device undershoots a target value of fuel pressure during the decrease of fuel pressure of the fuel accumulating device. Therefore, an engine-stool phenomenon can be prevented from occurring while fuel pressure is decreasing with use of a pressure reducing valve provided at the fuel accumulating device.

In more detail, the delay time control apparatus for closing a pressure reducing valve further comprises fuel pressure sensing means for sensing fuel pressure of a fuel accumulating device, engine condition sensing means for measuring a condition of the internal combustion engine in order to estimate a delay time for closing a pressure reducing valve and the like, fuel pressure obtaining means for obtaining the fuel pressure of the fuel accumulating device, target reducing time estimating means for estimating the target reducing time when the fuel accumulating device reaches a target value of the fuel pressure based on a time sequential data of the fuel pressure of the fuel accumulating device, such as rates of change in the fuel pressure with time, obtained by the fuel pressure obtaining means during a pressure reducing valve opened period over which the pressure reducing valve is opened, delay time estimating means for estimating a delay time which is needed to be taken into considered in order to accurately estimate the target reducing time when the fuel accumulating device reaches the target pressure of fuel based on the current value of fuel pressure, the time sequential data of fuel pressure of the fuel accumulating device, and at least one parameter obtained by the engine condition sensing means, required time estimating means for estimating the time required for reaching the target pressure meeting time, a judging means for judging whether or not a current time is the required time before the target pressure meeting time, and valve closing command signal sending means for sending the valve closing command signal for closing the pressure reducing valve from the electric control unit (ECU) to the magnetic circuit of the pressure reducing valve such that after receiving the valve closing command signal, the magnetic circuit stops supplying electric power to a tubular coil of the pressure reducing valve in order to close the pressure reducing valve.

If a delay time for closing the pressure reducing valve is defined as an interval between a first time when the magnetic circuit of the pressure reducing valve receives the command signal for closing the pressure reducing valve from the ECU and a second time when the valve member of the pressure reducing valve starts closing, the apparatus for controlling the pressure reducing valve of the fuel injection system for an internal combustion engine according to the present invention controls the pressure reducing valve, taking into consideration of the delay time for closing the pressure reducing valve.

Further, in order to achieve the object of the present invention, there is also provided a second computer program for closing a pressure reducing valve provided at a fuel accumulating device of a fuel injection system for the internal combustion engine. The second computer program is executed for controlling the pressure reducing valve so as to compensate a delay time for closing a pressure reducing valve since an electronic control unit (ECU) has sent a command signal for driving the pressure reducing valve. The second computer program for controlling the pressure reducing valve has a potential for avoiding an undershoot phenomenon in which an actual pressure of fuel accumulated in the fuel accumulating device undershoots a target value of fuel pressure during decreasing the fuel pressure of the fuel accumulating device. Therefore, it is possible to prevent the engine-stool phenomenon from occurring under the condition where the fuel pressure is decreases with the use of a pressure reducing valve provided with the fuel accumulating device.

The second computer program for closing the pressure reducing valve of the fuel injection system for an internal combustion engine, the fuel injection system having fuel pressure sensing means for sensing fuel pressure of a fuel accumulating device and engine condition sensing means for measuring a condition of the internal combustion engine in order to estimate a delay time for closing a pressure reducing valve, includes a fuel pressure obtaining module for obtaining the fuel pressure of the fuel accumulating device, a target reducing time estimating module for estimating the target reducing time when the fuel accumulating device reaches a target value of the fuel pressure based on a time sequential data of the fuel pressure of the fuel accumulating device, such as rates of change in the fuel pressure with time, obtained by the fuel pressure obtaining module during a pressure reducing valve closed period over which the pressure reducing valve is closed, a third time estimating module for estimating a delay time which is needed to take be considered in order to accurately estimate the target reducing time when the fuel accumulating device reaches the target pressure of fuel based on the current value of fuel pressure, the time sequential data of fuel pressure of the fuel accumulating device, and at least one parameter obtained by the engine condition sensing means, a required time estimating module for estimating the time required for reaching the target pressure meeting time, a judging module for judging whether or not a current time is the required time before the target pressure meeting time, and a valve closing command signal sending module for sending the valve closing command signal for closing the pressure reducing valve from the electric control unit (ECU) to the magnetic circuit of the pressure reducing valve in such a way that, after receiving the valve closing command signal, the magnetic circuit can start supplying electric power to a tubular coil of the pressure reducing valve to close the pressure reducing valve.

Thus, with the execution of the second computer program, the ECU controls output a command signal for closing the pressure reducing valve before the target pressure meeting time. Therefore, it is possible to reliably close the pressure reducing valve so as to stop discharging high pressure fuel accumulated in the fuel accumulating device.

In this way, the fuel pressure can be prevented from overshooting the lower limit value.

Further, it is preferable that the valve closing command signal sending module starts running either at the time when the delay time for closing the pressure reducing valve becomes to be equal to the target reducing time or at the time when the delay time for closing the pressure reducing valve becomes to be smaller than the target reducing time. That is, the ECU outputs a command signal for closing the pressure reducing valve towards the magnetic circuit when the delay time for closing the pressure reducing valve becomes to be equal to or smaller than the target reducing time.

The fuel pressure sensing means for sensing fuel pressure of a fuel accumulating device provided in the fuel injection system for internal combustion engine includes a sensor for measuring fuel pressure inside the fuel accumulating device. The sensor is externally mounted on the fuel accumulating device.

The engine condition sensing means for measuring at least one condition of the internal combustion engine in order to estimate a delay time for closing the pressure reducing valve includes an accelerator sensor for measuring a degree of closing of an accelerator, an engine speed sensor for measuring an engine speed of the internal combustion engine, a coolant temperature sensor for measuring the temperature of the coolant of the internal combustion engine, an intake air temperature sensor foe measuring the temperature of the intake air and the like. These sensors are externally installed in the fuel injection system. In the delay time estimating means, the delay time for closing the pressure reducing valve is estimated based on at least one of the measurement results of the engine conditions obtained by the above mentioned sensors. Measuring tools of the engine condition sensing means are not limited to the sensors as mentioned above, but other tools can also be used. For example, external tools which are not loaded on a vehicle having an internal combustion engine and a fuel injection system therefore are applicable if some information about the engine condition is obtainable.

Further, the delay time estimating means is configured to estimate the delay time for closing the pressure reducing valve based on at least one parameter indicating some condition of the internal combustion engine in several possible ways.

For example, in the above mentioned type delay time control apparatus for closing a pressure reducing valve, the delay time estimating means performs in such a way that, after receiving parameters indicating some condition of the internal combustion engine from the engine condition sensing means, the delay time estimating means obtains the delay time for closing a pressure reducing valve by referring to a second reference table which contains a first plurality of relationships between parameters indicative of the conditions of the internal combustion engine and the delay times for closing a pressure reducing valve.

In other words, in this delay time control apparatus for closing a pressure reducing valve, the optimum delay times for closing a pressure reducing valve corresponding to parameters indicative of the conditions of the internal combustion engine are previously determined by preliminary experiments and other methods before this control apparatus starts running. The predetermined first relationships between the parameters indicative of the conditions of the internal combustion engine and the delay times for closing a pressure reducing valve are summarized into the second reference table which is referred to in estimating the delay time for closing the pressure reducing valve. Therefore, the pressure reducing valve can be reliably closed so as to stop discharging high pressure fuel accumulated in the fuel accumulating device. Furthermore, the fuel pressure can be prevented from undershooting the lower limit value.

The first reference table referred to by the delay time estimating means is stored in either a memory provided in the electric control unit (ECU) or an external memory connected to the delay time control apparatus.

It is preferable that a delay time control apparatus for closing the pressure reducing valve further comprises delay time measurement means for measuring an actual delay time between a first time when the magnetic circuit of the pressure reducing valve receives the command signal for closing the pressure reducing valve from the ECU and a second time when the valve member of the pressure reducing valve is actually closed, and first reference table updating means for updating the second reference table which contains a second plurality of relationships between parameters indicative of the conditions of the internal combustion engine and the delay times for closing a pressure reducing valve after completing closing procedure for closing the pressure reducing valve. That is, the first plurality of relationships between the parameters and the delay times for closing a pressure reducing valve is corrected, if necessary, taking into the consideration of additional data obtained by the actual closing procedure for closing the pressure reducing valve in addition to the data obtained by the fuel pressure sensing means, the engine condition sensing means, the fuel pressure obtaining means, the target reducing time estimating means, the sensing means, the delay time estimating means, the required time estimating means, the judging means, and the valve closing command signal sending means.

Therefore, in the delay time control apparatus for closing a pressure reducing valve having the delay time measurement means and the second reference table updating means, it is possible to correct predetermined relationship between parameters indicative of the conditions of the internal combustion engine and the delay times for closing a pressure reducing valve, even if the predetermined relationships contain an erroneous correlation between some parameter and some delay time. That is to say, every time closing procedure is carried out an additional data for optimizing the second reference table is given such that the delay time measurement means measures the actual delay time for closing the pressure reducing valve on every occasion when the command signal for closing the pressure reducing valve is outputted from the ECU to the magnetic circuit of the pressure reducing valve while the engine condition sensing means performs measurements for obtaining data indicative of the conditions of the internal combustion engine.

The first reference table updating means for updating the second reference table every time completing a closing procedure for closing the pressure reducing valve is completed includes a fuel pressure sensor for measuring the fuel pressure in the fuel accumulating device, an accelerator sensor for measuring a degree of closing of an accelerator, an engine speed sensor for measuring an engine speed of the internal combustion engine, a coolant temperature sensor for measuring the temperature of the coolant of the internal combustion engine, and an intake air temperature sensor for measuring the temperature of the intake air. These sensors are externally and internally installed in the fuel injection system. The measurement results derived from these sensors are used to determine the delay time for closing the pressure reducing valve in the second reference table updating means. Measuring tools of the second reference table updating means are not limited to the sensors as mentioned above, but other tools may also be used. For example, external tools which are not loaded on a vehicle having an internal combustion engine and a fuel injection system therefore are applicable if some information about the vehicle is obtainable.

It is preferable that a delay time control apparatus for closing the pressure reducing valve further comprises a third learning commanding means for outputting a command signal to the magnetic circuit of the pressure reducing valve for closing the pressure reducing valve if a predetermined time for learning has been reached, in addition to the fuel pressure sensing means, the engine condition sensing means, the fuel pressure obtaining means, the target reducing time estimating means, the delay time estimating means, the required time estimating means, the judging means, and the valve closing command signal sending means.

In the delay time control apparatus for closing the pressure reducing valve having the third learning commanding means, the degree of accuracy can be improved in estimating the delay time for closing the pressure reducing valve since the predetermined time for learning is set so as to have a good timing for measuring the delay time.

It is preferable that a delay time control apparatus for closing the pressure reducing valve further comprises pressure intensifying means for intensifying the fuel pressure in the fuel accumulating device from the current value obtained by the fuel pressure sensing means to a first predetermined value and forth learning commanding means for outputting a command signal to the magnetic circuit of the pressure reducing valve if the fuel pressure reaches a predetermined value, in addition to the fuel pressure sensing means, the engine condition sensing means, the fuel pressure obtaining means, the target reducing time estimating means, the delay time estimating means, the required time estimating means, the judging means, and the valve closing command signal sending means.

A control method performed by the delay time control apparatus for closing the pressure reducing valve having the pressure intensifying means comprises steps of: measuring a current value of fuel pressure in the fuel accumulating device, intensifying the fuel pressure in the fuel accumulating device from the current value to a first predetermined value, waiting until the fuel pressure in the fuel accumulating device reaches a second predetermined value of fuel pressure, and outputting a command signal for closing the pressure reducing valve to the magnetic circuit of the pressure reducing valve.

Therefore, the delay time control apparatus for closing the pressure reducing valve having the pressure intensifying means is capable of improving the accuracy in the delay time for closing the pressure reducing valve at a specific fuel pressure. This improved accuracy of the delay time at the specific fuel pressure is obtained by setting a suitable time when the third learning commanding means is started executing so as to measure the delay time for closing the pressure reducing valve by the delay time estimating means, setting the second predetermined value of the fuel pressure at which measurement of the delay time is necessary for closing the pressure reducing valve, and setting the first predetermined value of the fuel pressure which is higher than the second predetermined value of the fuel pressure.

It is further preferable that, in addition to then above mentioned second predetermined value of the fuel pressure in the fuel accumulating device, a plurality of second predetermined values are provided. In the case where there are the plurality of second predetermined values of the fuel pressure, the forth learning commanding means for outputting a command signal to the magnetic circuit of the pressure reducing valve for closing the pressure reducing valve starts operating every time a current fuel pressure in the fuel accumulating device obtained by the fuel pressure sensing means agrees with one of the plurality of the second predetermined values of the fuel pressure.

It is further preferable that the predetermined time for learning occurs after stopping the internal combustion engine which connects the fuel injection system including the fuel accumulating device.

In the delay time control apparatus for closing the pressure reducing valve, in which the predetermined time for learning occurs after stopping the internal combustion engine, the delay time for closing the pressure reducing valve is accurately estimated by the delay time measurement means since external disturbances on the measurement such as an engine noise, are removed and fluctuations of the fuel pressure in the fuel accumulating device are suppressed.

Further, the delay time estimating means is configured to estimate the delay time for closing the pressure reducing valve in several possible ways.

For example, it is preferable that a delay time control apparatus for closing a pressure reducing valve further comprises valve closing detecting means for detecting whether or not the pressure reducing valve is closed, in addition to the fuel pressure sensing means, the engine condition sensing means, the fuel pressure obtaining means, the target reducing time estimating means, the delay time estimating means, the required time estimating means, the judging means, and the valve closing command signal sending means.

For example, in the delay time control apparatus for closing the pressure reducing valve having the valve closing detecting means for detecting a closing of the pressure reducing valve, the valve closing detecting means for detecting a closing of the pressure reducing valve performs such that, after receiving time sequential values of the fuel pressure from the fuel pressure sensing means, the valve closing detecting means calculates changing ratios of the fuel pressure and obtains the delay time for closing a pressure reducing valve based on the changing ratios of the fuel pressure. Then, the valve closing command signal sending means for sending the valve closing command signal for closing the pressure reducing valve to the magnetic circuit of the pressure reducing valve performs such that the magnetic circuit starts supplying electric power to the tubular coil of the pressure reducing valve in order to close the pressure reducing valve, and the delay time measurement means measures the actual delay time for closing the pressure reducing valve which is between a time when the valve closing command signal sending means sends the command signal for closing the pressure reducing valve and a further time when the valve closing detecting means detects the closing of the pressure reducing valve.

In this case where the valve closing detecting means detects the closing of the pressure reducing valve based on the changing ratios of the fuel pressure, there are advantages that no additional sensor except for the pressure sensor usually provided at the fuel accumulating device is needed to detect the closing of the pressure reducing valve, and the delay in closing the pressure reducing valve can be measured. Therefore, the delay time control apparatus for closing the pressure reducing valve can be constructed with a small number of devices.

Further, in the delay time control apparatus for closing the pressure reducing valve, it is preferable that the fuel pressure obtaining means is configured to periodically detect the fuel pressure in the fuel accumulating device. A periodic time of detecting the fuel pressure in some condition where the valve closing detecting means is in operation can be set to be shorter than that in the other conditions.

Therefore, the accuracy can be improved in the measured delay time obtained by the closing delay time estimating means because if the pressure reducing valve is closed, the valve closing detecting means is capable for detecting the closing of the pressure reducing valve with minimum delay.

Further, any type of the pressure reducing valve for discharging the high pressurized fuel in the fuel accumulating device is applicable to the delay time control apparatus according to the present invention. A known prior art of a pressure reducing valve is shown in FIG. 20, but the present invention not limited to this type of the pressure reducing valve which can be installed in the fuel injection system provided with the delay time control apparatus according to the present invention. For example, the pressure reducing valve shown in FIG. 18 includes the tube-lime coil (solenoid coil) for driving the valve member via the rod. The armature which is fixed to the rod is subjected to an electromagnetic force generated by the tubular coil controlled by the magnetic circuit of the pressure reducing valve and the ECU connected to the magnetic circuit. Furthermore, the delay time control apparatus is configured to perform a pulse width modulation (PWM) control of the pressure reducing valve. Thus, the delay time control apparatus outputs a PWM signal to the magnetic circuit of the pressure reducing valve which supplies electric power to the tubular coil to attract and move the armature integrated with the rod and the valve member.

For this type of the pressure reducing valve, it is preferable that the control apparatus for compensating a delay caused in the operation of the pressure reducing valve further comprises frequency control means for adjusting a frequency of the PWM signal outputted from the ECU to the magnetic circuit of the pressure reducing valve, in addition to the fuel pressure sensing means, the engine condition sensing means, the fuel pressure obtaining means, the target reducing time estimating means, the delay time estimating means, the required time estimating means, the judging means, and the valve opening command signal sending means.

In the control apparatus for compensating a delay caused in operation of the pressure reducing valve having the frequency control means, the frequency control means performs such that a switching frequency of the PWM signal outputted from the ECU is increased to a value higher than that in a predetermined standard operation before a target reducing time when the fuel accumulating device reaches a target value of the fuel pressure obtained by the target reducing time estimating means.

Therefore, the accuracy can be improved in the delay time for closing the pressure reducing valve by setting the higher switching frequency of the PWM signal which is a control signal of the magnetic circuit of the pressure reducing valve.

Similarly, as in the case of the delay time control apparatus for closing the pressure reducing valve, it is preferable that a computer program for compensating the delay time for closing the pressure reducing valve comprises a second delay time measuring module for measuring an actual delay time between a first time when the magnetic circuit of the pressure reducing valve receives the command signal for closing the pressure reducing valve from the ECU and a second time when the valve member of the pressure reducing valve is actually opened, and a first reference table updating module for updating the first reference table which contains a first plurality of relationships between parameters indicative of the conditions of the internal combustion engine and the delay times for closing a pressure reducing valve after a closing procedure for closing the pressure reducing valve is completed. That is, the first plurality of relationships between the parameters and the delay times is corrected, if necessary, taking into the consideration of additional data obtained by the actual closing procedure for closing the pressure reducing valve in addition to the data obtained by the fuel pressure sensing module, the engine condition sensing module, the fuel pressure obtaining module, the target reducing time estimating module, the sensing module, the second time estimating module, the required time estimating module, the judging module, and the valve closing command signal sending module.

It is preferable that a computer program for compensating the delay time for closing the pressure reducing valve further comprises at least one of a forth learning commanding module for outputting a command signal to the magnetic circuit of the pressure reducing valve for closing the pressure reducing valve if a predetermined time for learning has been reached, a pressure intensifying module for intensifying the fuel pressure in the fuel accumulating device from the current value obtained by the fuel pressure sensing module to a first predetermined value and a forth learning commanding module for outputting a command signal to the magnetic circuit of the pressure reducing valve for closing the pressure reducing valve if the fuel pressure reaches a predetermined value, and a valve closing detecting module for detecting whether or not the pressure reducing valve is closed, in addition to the fuel pressure sensing module, the engine condition sensing module, the fuel pressure obtaining module, the target reducing time estimating module, the sensing module, the delay time estimating module, the required time estimating module, the judging module, and the valve closing command signal sending module.

Therefore, it is possible to control the individual means of the control apparatus for compensating a delay of operating the pressure reducing valve by using the ECU of the fuel injection system which is connected to the fuel injection system in which a computer program mentioned above is stored. The present invention is not limited to the case where the computer program for operating the pressure reducing valve is stored in the ECU of the fuel injection system. That is, an external computer connected to the fuel injection system is also applicable to an apparatus in which the computer program for operating the pressure reducing valve provided with a fuel accumulating device is stored.

For example, the ECU of the fuel injection system has a central processing unit (CPU) and a memory including at least one of a read only memory (ROM) and random access memory (RAM) for storing the computer program. The memory is connected to the CPU via wiring or via a network cable. In order to execute the computer program by the CPU of the ECU, the computer program is loaded into the memory via the wiring or via the network cable.

It is further preferable that the computer program for operating the pressure reducing valve is stored in a writable or a read-only recording medium such as a flexible disk, a magneto-optic (MO), a digital versatile disk (DVD), a compact disk read only memory (CD-ROM), Blue-ray disk, a hard disk (HD), a HD-DVD, memory card, and the like. The computer program stored in the read-only recording medium is loaded to the ECU of the fuel injection system and is executed by the CPU of the ECU.

BRIEF DESCRIPTION OF THE DRAWINGS

The invention, together with additional objectives, features and advantages thereof, can be understood from the following description, the appended claims and the accompanying drawings in which:

DETAILED DESCRIPTION OF THE PREFERRED EMBODIMENTS

In order to describe the present invention in more detail, the various embodiments of the present invention will now be described hereafter with references to accompanying drawings.

Figure 1:
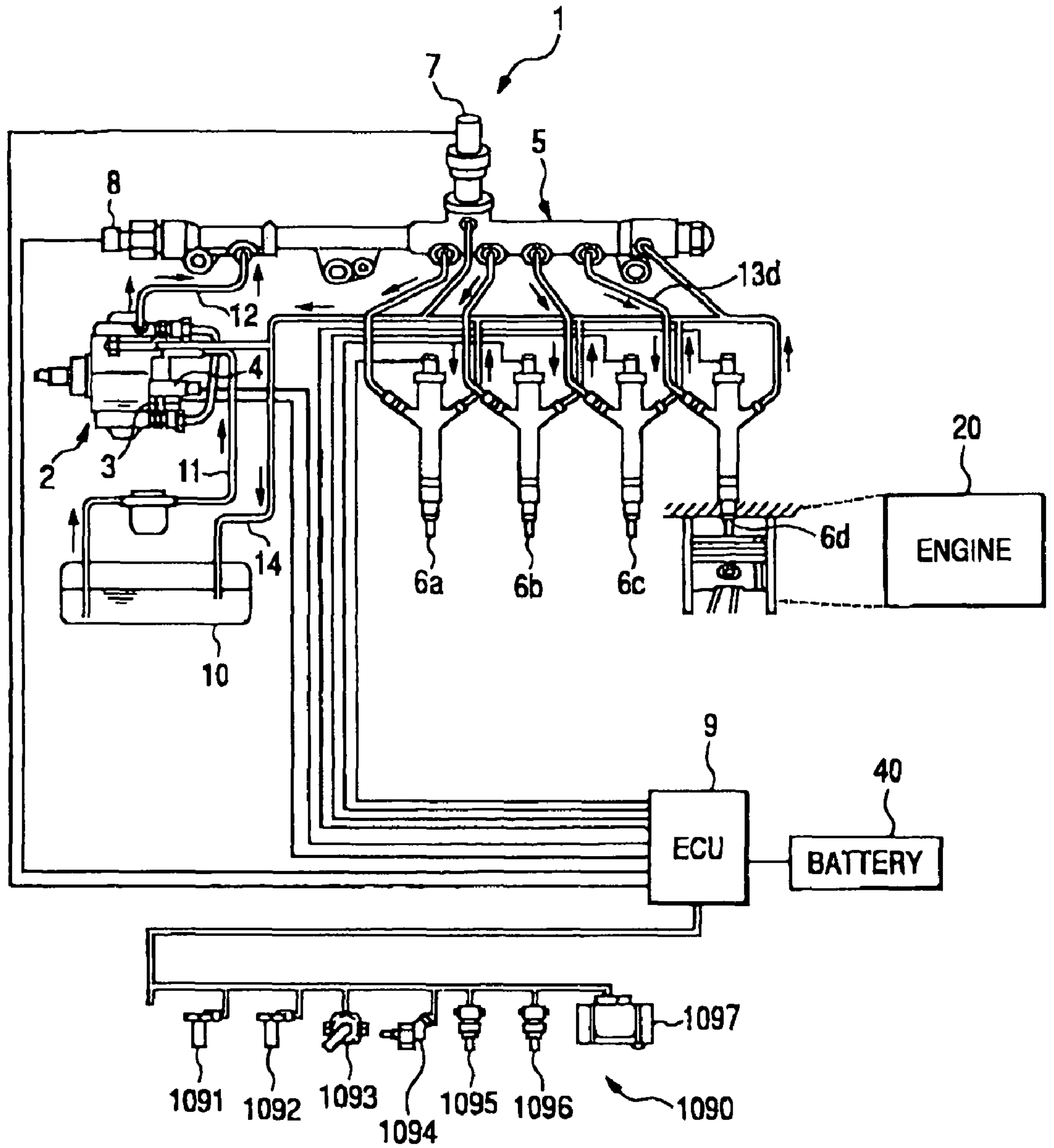
FIG. 1 is a schematic description of a common rail type fuel injection system according to the present invention.

FIG. 1 is a schematic description of a common rail type fuel injection system 1 according to the present invention.

As shown in FIG. 1, there is the common rail type fuel injection system 1, which is, for example, a system for injecting fuel to an internal combustion engine 20 such as a four cylinder diesel engine. The common rail type fuel injection system 1 includes a high pressure pump 2 on which a fuel temperature sensor 3 is mounted, a suction control valve 4, a common rail 5, injectors 6 (6*a*, 6*n*, 6*c*, and 6*d* in FIG. 1), a pressure reducing valve 7, a fuel pressure sensor 8, and an engine control unit (ECU) 9.

The common rail 5 accumulates fuel which is highly pressurized by the high pressure pump 2 so as to be at a high pressure corresponding to a fuel injection pressure, at which the fuel is injected into respective cylinders of the internal combustion engine 20 mounted on a vehicle. Thus, the fuel accumulated in the common rail is a high pressure fuel.

Each of the injectors 6*a* to 6*d* is connected to the common rail 5 via distribution pipes 13*a* to 13*d*, respectively, and injects the high pressure fuel into the respective cylinders of the internal combustion engine 20. The ECU controls the injectors 6, the high pressure pump 4, and the pressure reducing valve 7.

The high pressure pump 2 is a high pressure fuel supplying pump for discharging high pressure fuel from a discharging outlet to the common rail 5. The high pressure pump 2 is provided with a feed pump for drawing a fuel from the fuel tank 10 through a drawing pipe 11. The high pressure pump 2 compresses the fuel drawn by a feed pump for producing a high pressure fuel. The high pressure fuel is delivered to the common rail 5 through a high pressure pump pipe 12 so that the fuel whose pressure corresponds to the fuel injection pressure is accumulated in the common rail 5. The feed pump and the high pressure pump are driven by the internal combustion engine via a crankshaft.

The high pressure pump 2 is electronically connected to, and is controlled by the ECU. The ECU commands a quantity of the fuel drawn from a pressurizing chamber of the high pressure pump 2 to feed the common rail 5 after the fuel is pressurized thereby.

Further, the high pressure pump 2 has a suction control valve 4 in its fuel passage for guiding the fuel to a pressurizing chamber.

The fuel temperature sensor 3 is installed in the high pressure pump 2 for measuring temperature of the fuel to be pumped to the common rail 5 from the high pressure pump 2. The fuel temperature sensor 3 outputs a fuel temperature sensor signal which includes information about measured fuel temperature towards the ECU. The fuel temperature sensor is either an analog electric signal or a digital electric signal.

The suction control valve 4 is attached to the pressure chamber. The suction control valve 4 is an electromagnetic actuator and is disposed in the fuel passage leading from the feed pump of the high pressure pump 2 to the pressurizing chamber of the high pressure pump 2. The suction control valve 4 regulates a valve-opening degree of the fuel passage in order to increase or decrease a quantity of the fuel discharged from the high pressure pump 2 to the common rail 5. The suction control valve 4 is electronically connected to and is controlled by the ECU 9. The ECU 9 includes an engine driving unit (EDU) in this case, but if desired the ECU and the EDU can be provided separately.

The common rail 5 is a fuel accumulator which accumulates a high pressure fuel to be supplied to the injectors 6 via the distribution pipes 13. The common rail 5 is connected to the outlet of the high pressure pump 2 through the high pressure pipe 12 and is also connected to the distribution pipes 13. A relief pipe 14 is disposed for returning the fuel from the common rail 5 to the fuel tank 10. A pressure reducing valve 7 is also installed in the common rail 5. Although more detailed description about the pressure reducing valve 7 will be given later, the pressure reducing valve 7 is normally closed and adjusts a degree of opening of a drain passage, which communicates between the common rail 5 and the relief pipe 14 to drain the fuel which is accumulated in the common rail 5.

The injectors 6 (6*a*, 6*b*, 6*c*, and 6*d*) are mounted in the four cylinders of the internal combustion engine 20. Each injector is provided to a corresponding cylinder and injects the corresponding cylinder of the internal combustion engine 20. Each injector 6 is connected to the corresponding distribution pipe 13 in order to communicate with the common rail 5. The distribution pipes 13 branch from the common rail 5. Further, each of the injectors 6 includes a fuel injection nozzle, an electromagnetic valve (a solenoid valve, an actuator), and spring or the like as a biasing means. The fuel injection nozzle injects the fuel which has been pressurized by the high pressure pump 2 into each cylinder of the internal combustion engine 20. The electromagnetic valve drives a nozzle needle of the fuel injection nozzle so as to open a fuel passage in the injection valve. The fuel injection from the injectors 6 into each cylinder of the internal combustion engine 20 is electronically controlled by switching on or off of energization to the electromagnetic valve, which controls a pressure in a pressure control chamber of the nozzle needle. More specifically, the high pressure fuel accumulated in the common rail 5 is injected into each cylinder of the internal combustion engine 20 while the electromagnetic valve of the injector 6 is opened due to an electromagnetic force countering a force generated by the biasing means, such as the spring force. Fuel leaked from the injectors 6 and discharged from the pressure control chambers is returned to the fuel tank 10 through the relief pipe 14.

The pressure reducing valve 7 is installed to the common rail 5. Since a detailed description about the pressure reducing valve 7 has been already given with references to FIGS. 20 to 22 in the previous section, a simple description is given here about the pressure reducing valve 7 only. The pressure reducing valve 7 adjusts the degree of opening of the drain passage to drain or discharge the fuel accumulated in the common rail 5. The pressure reducing valve 7 is configured to rapidly reduce the fuel pressure accumulated in the common rail 5 through the relief pipe 14 to a value that corresponds to a driving state of a vehicle.

Figure 20:
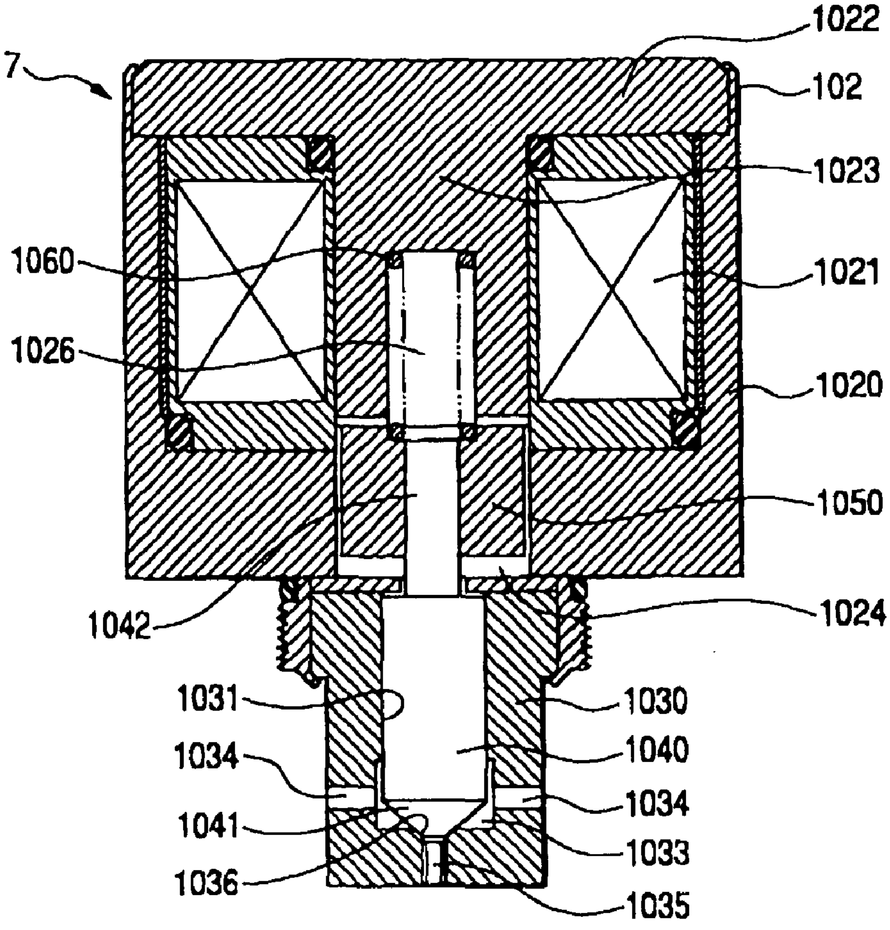
FIG. 20 shows a typical pressure reducing valve.

The pressure reducing valve 7 has a valve part and a solenoid. If FIG. 20 is used to explain the valve part and the solenoid, the valve part includes a valve member 1040, a rod 1042, and an armature 1050, and the solenoid includes a tubular coil 1021. The valve part changes the degree of opening in the drain passage (1035 in FIG. 20), and the solenoid adjusts the degree of opening of the valve part based on a control value for the pressure reducing valve supplied from the ECU 9 to the solenoid of the pressure reducing valve 7. When the solenoid is deenergized, the pressure reducing valve 7 is closed, i.e., the degree of opening of the valve member 1040 becomes zero.

Figure 21:
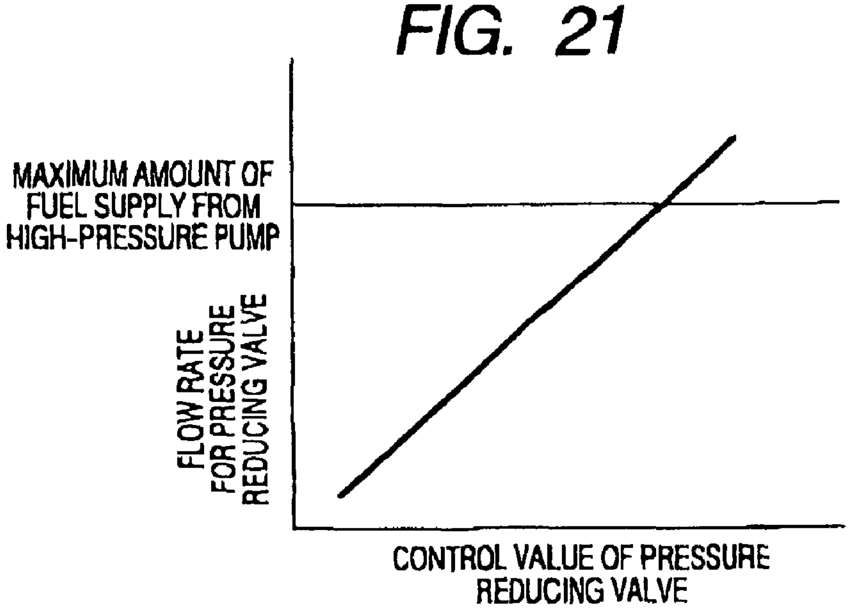
FIG. 21 is a graph showing a relationship between a flow rate of the pressure reducing valve and a control value for the pressure reducing valve.

In order to rapidly decrease the fuel pressure in the common rail 5, a maximum discharging rate of the pressure reducing valve 7 for discharging fuel is greater than that of the high pressure pump 2. Further as shown in FIG. 21, when the control value for the pressure reducing valve is gradually increased, the flow rate of the fuel through the pressure reducing valve 7 in a steady state is increased proportionally with the control value for the pressure reducing valve 7. It should be noted that since the pressure reducing valve is opened or closed by an electromagnetic force generated by the solenoid while the electromagnetic force is receiving a reactive mechanical force generated by a spring (1060 in FIG. 20), and a counter electromotive force is generated in the solenoid when the solenoid is energized, there must be a delay to start opening or closing of the valve part of the pressure reducing valve 7.

A typical pressure reducing valve is shown in FIG. 20. This type of pressure reducing valve is disclosed in Japanese Unexamined Patent Publication No. 2001-182638. As shown in FIG. 20, the pressure reducing valve 7 includes a valve member 1040 for adjusting a cross section of a feed passage 1034 in which high pressure fuel flows, a tubular coil 1021 housed inside a solenoid housing 1020 which serves as a container and is shaped like a cylinder having a central longitudinal axis and two ends, the tubular coil 1021 constituting electromagnetic driving component for opening and closing the valve member 1040, and a valve housing 1030 for supporting the valve member 1040. The valve housing 1030 is also shaped like a cylinder having larger diameter than the solenoid housing 1020 and is fixed at a first end of the solenoid housing 1020. At a second end of the solenoid housing 1020, the solenoid housing 1020 has an opening in which a T-shaped lid 1022 and a caulked fixation portion 1027 for fastening the lid 1022 in the opening. A pillar shaped section 1023 is a part of the lid 1022. The pillar shaped section 1023 juts out into a cylinder of the tubular coil 1021 along the central longitudinal axis of the solenoid housing 1020, and constitutes a part of a magnetic circuit connected to the electronic control unit (ECU) 2090 so as to adjust a degree of opening of the feed passages 1034. A space 1024 is opened so as to abut on an end of the cylinder of the tubular coil 1021. Inside the space 1024, an armature 1050 is arranged. The armature 1050 constitutes an electromagnetic driving component.

As to the valve housing 1030, an end near to the solenoid housing 1020 is defined as a first end and the other end is defined as a second end. In the valve housing 1030, a sliding hole 1031 is formed along a central axis of the cylindrically shaped valve housing 1030 and the valve member 1040 is arranged in the sliding hole 1031 so as to slide along the central axis of the valve housing 1030. At an end of the sliding hole 1031 near the second end of the solenoid housing 1020, a low pressure chamber 1033 is formed. A diameter of the low pressure chamber 1033 is a little larger than that of the sliding hole 1031. A low pressure passage (feed passage) 1034 is formed in a side wall of the valve housing 1030 for communicating with the relief pipe. A high pressure passage 1035 is opened at the second end of the solenoid housing 1020 along the central axis thereof. The high pressure passage 1035 is connected to the fuel accumulating device (the common rail). The high pressure passage is closed by a valve element 1041 which is formed at an end of the valve member 1040 such that a diameter of the valve element is tapered towards the second end of the valve housing 1030. The valve member 1040 slides inside the sliding hole 1031.

A rod 1042 is formed so as to connect another end of the valve member 1040 near the housing 1020 to the other end having the valve element 1041. The rod 1042 and the valve member 1040 are integrated. The rod 1042 is prolonged into the through hole 1024 of the solenoid housing 1020. The armature 1050 is fixed to the periphery of the rod 1042 such that if the armature is moved by the electromagnetic force generated by the tubular coil 1021 driven by the electromagnetic circuit, both the rod 1042 to which the armature 1050 is fixed and the valve member 1040 can slide along the through hole 1024 and the sliding hole 1031, respectively, so as to open and close the high pressure passage 1035 for adjusting the amount of fuel flow in the high pressure passage 1035.

A spring room 1026 is established adjacent to a space to the through hole 1024 along the central axis of the solenoid housing 1020. A spring 1060 serving as an energizing device is held in the spring room 1026 in order to push the valve element 1041 of the valve member 1040 for closing operation of the high pressure passage 1035 via the rod 1042 to which the armature 1050 is fixed. FIG. 20 is illustrating the pressure reducing valve 7 in a state where the ECU controls the electromagnetic circuit such that driving electric current is not supplied to the tubular coil 1021, so that the spring 1060, the rod 1042 with which the armature 1050 is integrated, and the valve element 1041 are energized toward the direction of the second end of the valve housing 1030 so as to close the high pressure passage 1035. In another case where the ECU controls the electromagnetic circuit of the pressure reducing valve 7 such that driving electric current is supplied to the tubular coil 1021, the armature 1050 is attracted to the tubular coil 1021. Then the rod 1042 and the valve element 1041 move against an energizing force generated by the spring 1060 so that the high pressure passage 1035 is opened.

FIG. 21 is a graph showing a relationship between a flow rate of the pressure reducing valve 7 and a control value for the pressure reducing valve. As can be seen from FIG. 21, when the control value for the pressure reducing valve 7 is gradually increased, a flow rate of the fuel through the pressure reducing valve 7 is increased proportionally with the control value of the pressure reducing valve 7.

Figure 22:
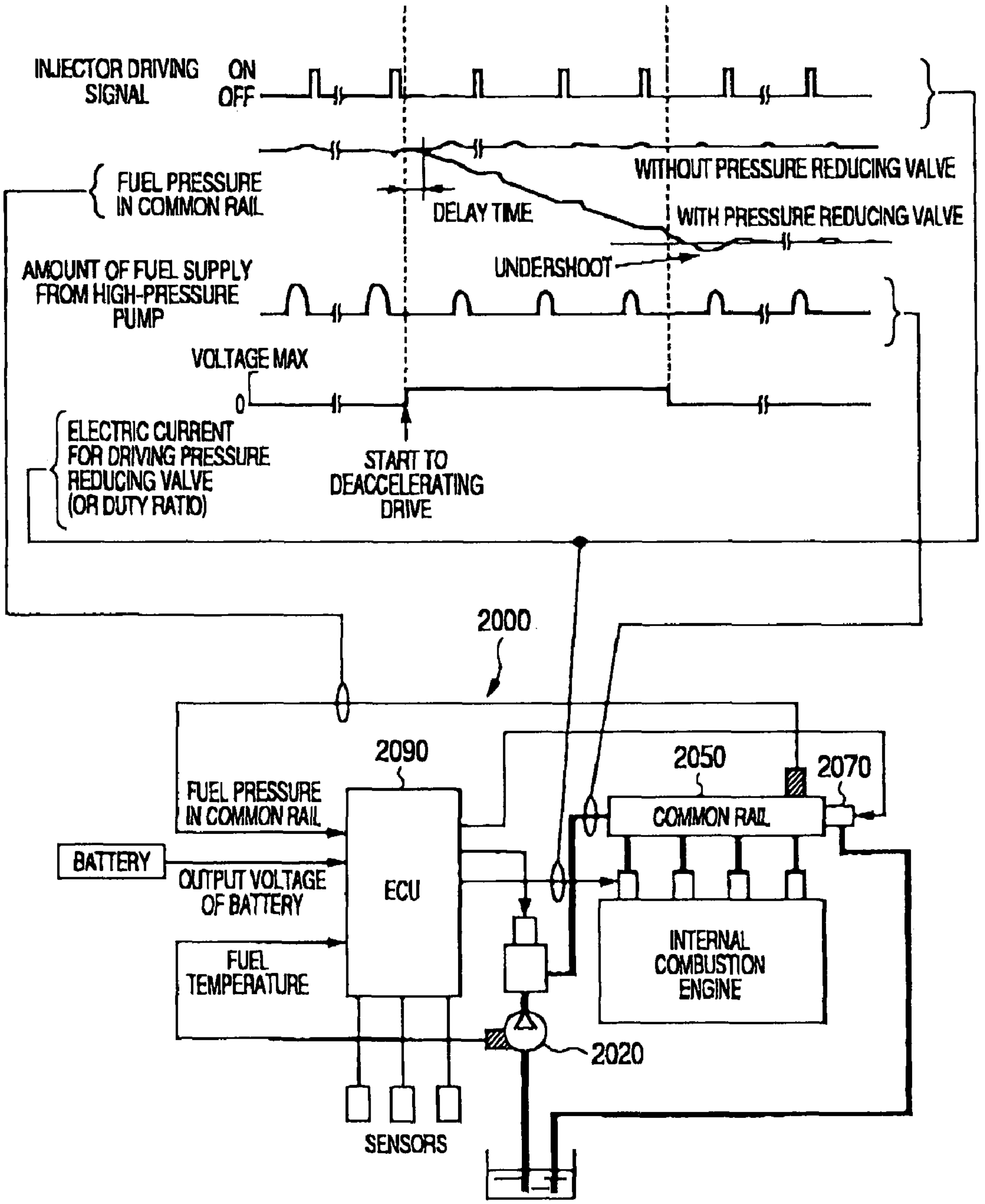
FIG. 22 (PRIOR ART)
FIG. 22 shows an advantage of a common rail type fuel injection system having the fuel accumulating device (a common rail) which includes the pressure reducing valve exemplified as shown in FIG. 20.

FIG. 22 shows an advantage of a common rail type fuel injection system 2000 having the fuel accumulating device 2050 (a common rail) which includes the pressure reducing valve 2070 as exemplified in FIG. 20. In a stationary operating state of a fuel injection system provided with the fuel accumulating device 2050, pressure of the fuel accumulating device 2050 is determined primarily based on a fuel pumping speed of a high pressure pump 2020, a fuel injection amount injected from injectors 2200, and amount of fuel leaking from the high pressure pump 2020 and the injectors 2200. Therefore, when it is intended to increase or keep the pressure of the fuel accumulating device 2050, the fuel pumping speed of the high pressure pump 2020 is controlled to be higher by the ECU 2090.

A maximum draining rate of the pressure reducing valve 7 is greater than a maximum discharge rate of the high pressure pump 2020, as shown in FIG. 21.

On the other hand, when the pressure of the fuel accumulating device 2050 is intended to be decreased, it has been necessary to increase fuel consumption or the fuel injection amount. However, usually, a rapid decrement in the pressure of the fuel accumulating device 2050 is necessary when the engine speed is decreasing. In this case, the fuel injection amount injected from the injectors 2200 drop down to zero. Therefore, a decreasing rate of the pressure of the fuel accumulating device 2050 is very slow, as shown in FIG. 22.

FIG. 22 contains a time chart showing an example of the behavior of the pressure of the fuel accumulating device relative to an injector driving signal timing, the amount of the fuel feed from the high pressure pump 2020, and a driving current for the tubular coil 1021 of the pressure reducing valve 7, for the common rail type fuel injection system with or without the pressure reducing valve 7 under the condition that the pressure of the fuel accumulating device is decreasing. In case of the common rail type fuel injection system with the pressure reducing valve 7, an undershoot phenomena can be found after the tubular coil 1021 is de-energized to close the pressure reducing valve 7.

The pressure reducing valve 7 shown in FIG. 20 improves the decreasing rate of the pressure of the fuel accumulating device 2050, as shown in FIG. 22. By discharging high pressure fuel accumulated in the fuel accumulating device 2050, a rapid decrease in the pressure of the fuel accumulating device 2050 is accomplished. However, as mentioned above, in the pressure reducing valve 7, the rod 1042 and the valve element 1041 move against an energizing force generated by the spring 1060 when the ECU 2090 sends a command signal towards the magnetic circuit of the pressure reducing valve 7 for moving the rod 1042 to which the armature 1050 is fixed to open the high pressure passage 1035. After the magnetic circuit of the pressure reducing valve 7 supplies electric power to the tubular coil 1021, it is necessary to delay time for starting the movement of the rod 1042 and the valve element 1041 which adjusts the cross section of the high pressure passage 1035, as shown in FIG. 20. In other words, the high pressure valve 1035 is not rapidly opened the instant the magnetic circuit of the pressure reducing valve 7 supplies electric power to the tubular coil 1021 to cause a magnetic force for attracting the armature 1050 which is integrated with the rod 1042 so as to open the high pressure passage 1035. Some of the causes for this phenomenon are attributed to the occurrences of a counter reactive force due to the energizing force generated by the spring 1060 as explained, a counter electromotive force generated in the tubular coil 1021 when the magnetic circuit starts supplying electric power to the tubular coil 1021, and other counter forces.

Thus, if a target value of fuel pressure in the fuel accumulating device is set near the upper limit value over which the fuel accumulation cannot withstand, an actual pressure on the fuel accumulating device may overshoot the target value during the increase of the fuel pressure in the fuel accumulating device. Hence, in the worst case, the fuel accumulating device will be broken since fuel pressure therein exceeds the limit value.

Further, the high pressure valve 1035 is not rapidly closed the instant the magnetic circuit of the pressure reducing valve 7 stops supplying electric power to the tubular coil 1021 to release the magnetic force for attracting the rod 1042 so as to close the high pressure passage 1035. Thus, when the ECU 2090 sends a command signal towards the magnetic circuit of the pressure reducing valve 7 for moving the rod 1042 to close the high pressure passage 1035, there is a delay time until the valve element 1041 comes to cover an opening of the high pressure passage 1035. There are some reasons why high pressure passage 1035 by the valve element 1041 cannot be rapidly closed. First, there exists a reactive force against the energizing force caused by the spring 1060 for pushing the valve element 1041 of the valve member 1040 to close the high pressure passage 1035 via the rod 1042. The reactive force is generated by the pressure of the fuel accumulated in the fuel accumulating device. Second, a counter electromotive force is generated in the tubular coil 1021 so as to maintain a magnetized state of the tubular coil 1021 when the magnetic circuit stops supplying electric power to the tubular coil 1021.

Thus, if a target value of the fuel pressure in the fuel accumulating device is set near the lower limit value under which the engine cannot continue running, an actual pressure on the fuel accumulating device may undershoot the target value during the decrease of the fuel pressure in the fuel accumulating device, as shown in FIG. 22. In the worst case, the diesel engine may be stopped. In the diesel engine, fuel is ignited when fuel and hot compressed air are mixed in the engine cylinder. However, in the state where the fuel pressure in the fuel accumulating device undershoots the target value while the pressure reducing valve is opened so as to discharge high pressure fuel from the fuel accumulating device, fuel is not sufficiently compressed for ignition.

The fuel pressure sensor 8 is installed in the common rail 5 as a fuel pressure sensing means. The fuel pressure sensor 8 detects a fuel pressure in the common rail 5 and outputs an electric signal containing information about detected results of the fuel pressure in the common rail 5 towards the ECU 9. The electric signal containing the information about the detected results of the fuel pressure in the common rail 5 is either an analogue electric signal or a digital signal. The fuel pressure in the common rail 5 detected by the fuel pressure sensor 8 is used, for example, to adjust an injection amount of the fuel from the injectors 6 by controlling timing of opening and closing the electromagnetic valves of the injectors 6.

The ECU 9 includes a microcomputer having the functions of a central processing unit (CPU) which performs control processing and calculation processing, a storing unit such as read only memory (ROM), random access memory (RAM), Electronically Erasable and Programmable Read Only Memory (EEPROM) for storing various programs and data as will be described later based in supplied sensor signals, the ECU 9 performs various computing operations, e.g., a computing operation for computing injection timing of each injector 6, a computing operation for controlling a degree of opening of the pressure reducing valve 7.

The ECU 9 includes the EDU in this embodiment of the present invention. The EDU is a driving circuit that provides control signals to the solenoid valves of the injectors 6, the solenoid of the pressure reducing valve 7, the suction control valves 4, and the high pressure pump 2 based on sensor signals from sensors 1090 which are connected to the ECU 9. The sensors 1090 includes a crank speed sensor 1091, a crank angle sensor 1092, an accelerator depression quantity sensor 93, a boost pressure sensor 1094, an air temperature sensor 1095, a coolant water temperature sensor 1096, an air mass flow sensor 1097, and the like, besides the fuel pressure sensor 8 and the fuel temperature sensor 3. These sensors 1090, the fuel pressure sensor 8, and the fuel temperature sensor 3 serve as a vehicle operational conditional state sensing means for sensing the operational state of the vehicle.

The ECU 9 is supplied electric power from a battery 40 which connects to the ECU 9 in order to supply electric power towards electric consumers, such as the microcomputer of the ECU 9, the solenoid of the injectors 6 and the pressure reducing valve 7.

Figure 3:
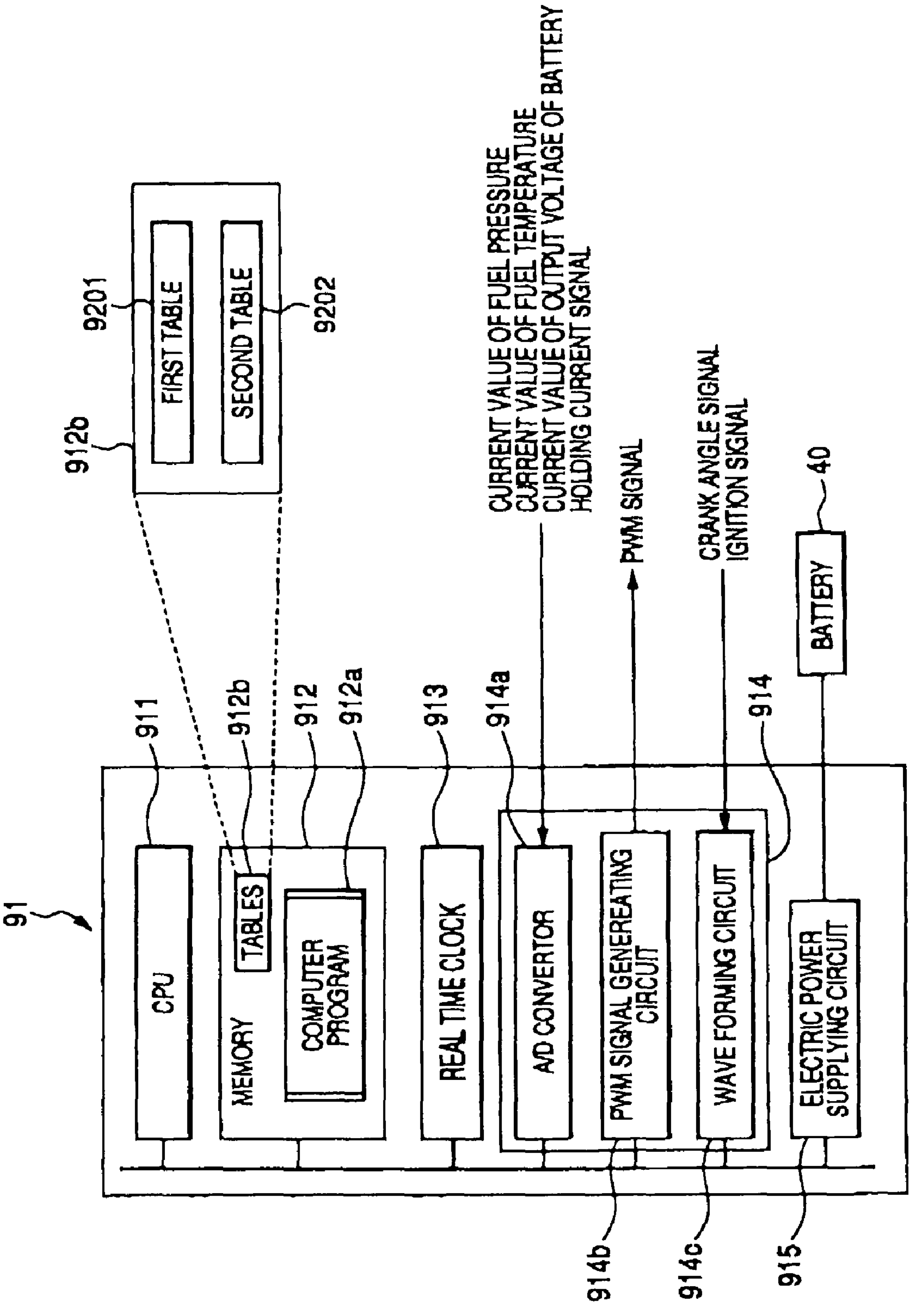
FIG. 3 shows a block diagram of the control unit shown in FIG. 1.
Figure 15:
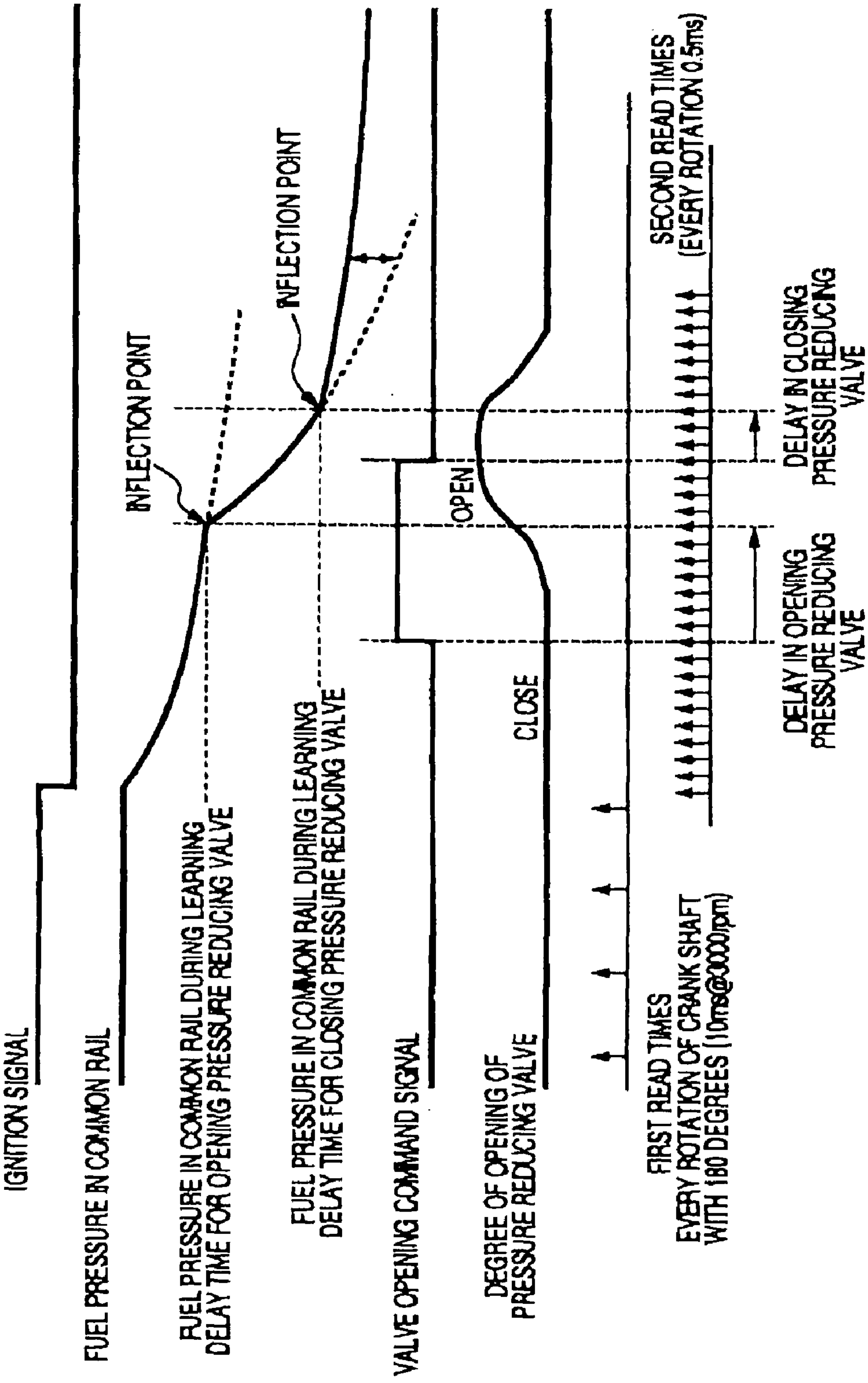
FIG. 15 is a graph showing changes over time of the ignition signal, the fuel pressure in the common rail, the valve opening command signal, and a degree of opening of the pressure reducing valve when the internal combustion engine is stopped.
Figure 16:
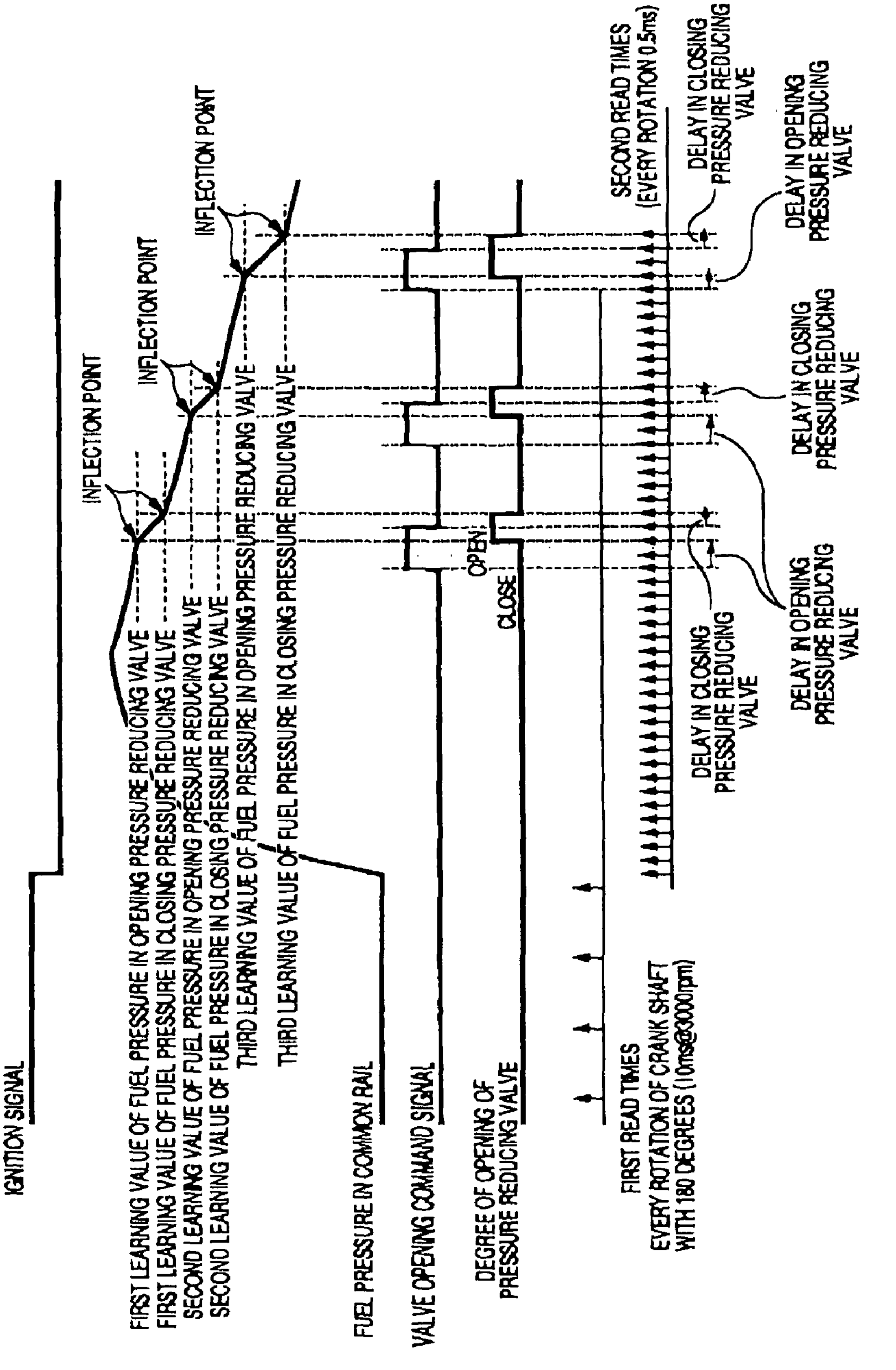
FIG. 16 is a graph showing operations of the control unit 91 of the ECU at an EOL production test, that is, changes over time of the ignition signal, the fuel pressure in the common rail, the valve opening command signal, and a degree of opening of the pressure reducing valve at an EOL production test.

Specifically, the ECU receives at least four electric signals from the fuel temperature sensor 3, the crank angle sensor 92, the battery 40 and an ignition key (not shown). A fuel temperature signal is an analogue electric signal from the fuel temperature sensor 3 including information about a detected value of the fuel temperature corresponding to a temperature of the fuel accumulated in the common rail 5. An electric power signal is also an analogue electric signal from the battery 40 including information about an output voltage value of the battery 40. A crank angle signal is an analogue or digital electric signal from the crank angle sensor 92 including information about a crank angle. The ignition key sends to the ECU 9 an ignition signal which indicates whether or not the internal combustion engine 20 is activated, as shown in FIG. 3 and FIGS. 15 to 16.

The crank angle sensor 1092 is an electromagnetic rotation sensor for measuring a rotation angle of a crankshaft disposed in each cylinder of the internal combustion engine 20. The crank angle sensor 1092 has a timing rotor which is made of magnetic material and is fixed to the crankshaft of the internal combustion engine 20, an electromagnetic pickup coil which is arranged so that the pickup coil faces the periphery of the timing rotor, a permanent magnet for generating magnetic flux, and the like. The timing rotor is formed with a plurality of projective teeth at a predetermined interval. For example, the predetermined interval is an angle of 30 degrees. If the timing rotor rotates, a distance between each projective tooth and the pickup coil increases or decreases. The pickup coil outputs a crank angle signal based on a tendency of whether the distance between each projective tooth and the pickup coil increases or decreases. A pulse signal is widely used as the crank angle signal. The ECU receives the pulse signal from the crank angle sensor 92 and recognizes that the crankshaft of the internal combustion engine 20 is rotated at the predetermined angle.

The ignition signal outputted by the ignition key is designed such that whether or not the internal combustion engine 20 is running is distinguished by ON and OFF states of the ignition signal.

Figure 2:
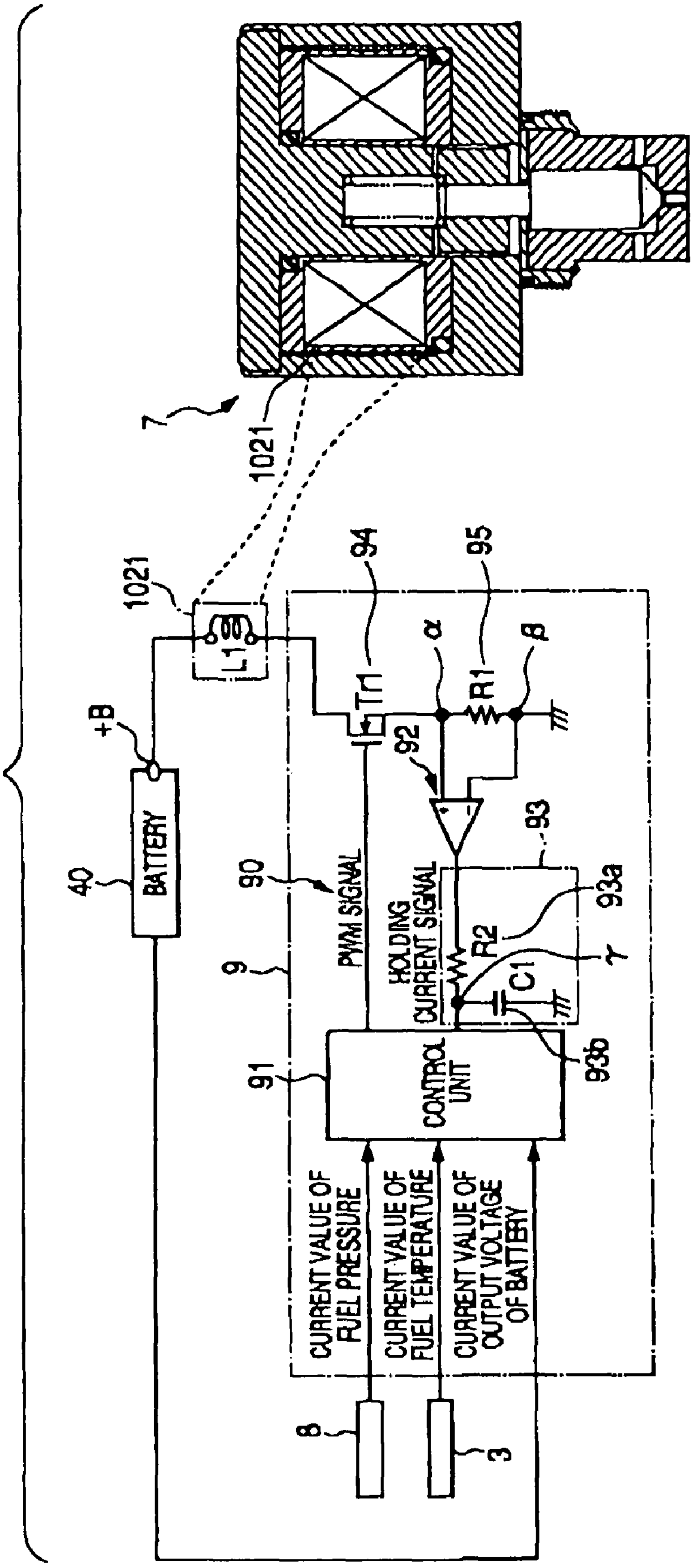
FIG. 2 is an illustration of a pressure reducing valve control circuit in FIG. 1.

FIG. 2 is an illustration of a pressure reducing valve control circuit 90, which is installed in the ECU 9.

As shown in FIG. 2, the pressure reducing valve control circuit 90 has a control unit 91, a comparator 92, a low-pass filter 93, a transistor 94, and a resistance 95.

The control unit 91 will be described with reference to FIG. 3. The control unit 91 includes the central processing unit (CPU) 911, a memory 912 serving as the storing unit such as read only memory (ROM), random access memory (RAM), Electronically Erasable and Programmable Read Only Memory (EEPROM) for storing computer programs and data, a real time clock 913, an In/Out interface unit 914, an electric power supplying unit 915 and several input ports (not shown). The control unit 91 serves as the microcomputer of the ECU 9. In the memory 912, the computer programs 912*a* and reference tables 912*b* are stored, although detailed descriptions about the computer programs 912*a* and reference tables 912*b* will be given later. The CPU performs the control processing and the calculation processing by executing the computer programs 912*a* with reference with the reference tables 912*b*. The real time clock 913 is capable of counting time. The I/O interface unit 914 has an A/D converter 914*a*, a pulse width modulation (PWM) signal generating circuit 914*b*, and a wave forming circuit 914*c*. The A/D converter 914*a* converts analog signals from the sensors, e.g., the sensors 1090, the fuel pressure sensor 8, and the fuel temperature sensor 3, to digital signals which can be treated by the CPU 911 and the memory 912, if the sensors 1090, the fuel pressure sensor 8, and the fuel temperature sensor 3 outputs the analog signals which contain information about detected results. The PWM signal generating unit 914*b* generates a PWM signal for using a PWM energization of the pressure reducing valve 7 in response to a command signal from the CPU 911. A PWM energization will be briefly explained now. In the PWM energization, applied voltage is rapidly switched on and off with an arbitrary switching frequency. One of the advantages of the PWM energization is that a higher voltage than the standard voltage of the battery 40 can be applied because the average power delivered is proportional to the switching frequency. The applied voltage is a time independent constant under the 100% PWM energization control. The switching frequency of the PWM signal can be taken with the arbitrary values.

Referring to FIG. 2 again, further explanation of the pressure reducing valve control circuit 90 will be given.

The transistor 94 is an n-channel metal-oxide-silicon field effect transistor (MOSFET). A gate terminal of the transistor 94 is connected to one of the output ports of the control unit 91. More specifically, the gate terminal of the transistor 94 is connected to the PWM signal generating unit 914*b* of the control unit 91 shown in FIG. 3. A drain terminal of the transistor 94 is connected to the magnetic circuit of the pressure reducing valve 7, more specifically, to one of two terminals of the tubular coil 1021, and a source terminal of the transistor 94 is connected via the resistance 95 to a ground such as an anode terminal (ground) of the battery 40 mounted on the vehicle. Another terminal of the tubular coil 1021 of the pressure reducing valve 7 is connected to the battery 40. The battery 40 is capable to supply direct current (DC) voltages from 6 volt to 16 volt in this embodiment.

The comparator 92 has at least an anode input, a cathode input, and an output terminal. The anode input terminal of the comparator 92 is connected to a contact α which is located between the source terminal of the transistor 84 and the resistance 94. The cathode input terminal of the comparator 92 is connected to a contact β which is located between the resistance 94 and the ground. The output terminal of the comparator 92 is connected to one of terminals of the low-pass filter 93.

The comparator 92 works as follows. That is to say, the comparator 92 compares two input voltages which are inputted through the anode input terminal and the cathode input terminal thereof, and outputs an electric signal indicating which is larger. In the case where the transistor 94 is turned on and electric current flows from the cathode terminal +B of the battery 40 to the ground via the tubular coil 1021 of the pressure reducing valve 7, the transistor 94, and the resistance 95, the comparator 92 outputs the most positive voltage. In the opposite case, i.e., where the transistor 94 is turned off and electric current is stopped from flowing from the cathode terminal +B of the battery 40 to the ground, the comparator 92 outputs the lowest voltage (0 volt).

The low-pass filter 93 has a resistance 93*a* and a condenser 93*b*. In more detail, the resistance 93*a* is arranged between the output terminal of the comparator 92 and the input port of the control unit 91, specifically, the A/D converter 914*a* of the In/Out interface unit 914 of the control unit 91 as shown in FIG. 3. If a contact γ is located between the A/D converter 914*a* of the In/Out interface unit 914 of the control unit 91 and the resistance 93*a*, the condenser 93*b* is arranged between the contact γ and the ground.

In the case where the comparator 92 outputs the most positive voltage, an output voltage from the low-pass filter 93 to the control unit 91 is monotonically increased to a saturation value of the output voltage of the comparator 92. In the opposite case where the comparator 92 outputs the lowest voltage, an output voltage from the low-pass filter 93 to the control unit 91 is monotonically decreased to the lowest value (0 volt) of the output voltage of the comparator 92. The output voltage from the low-pass filter 93 indicates a holding current flowing through the tubular coil 1021 of the pressure reducing valve 7 and is recognized by the control unit 91 as a holding current signal which is an analogue electric signal indicative of the holding current.

As described above with reference with FIG. 3, the I/O interface unit 914 of the control unit 91 has the A/D converter 914*a* which receives an electric power signal and a fuel temperature signal in addition to the holding current signal indicative of the holding current flowing through the tubular coil 1021 of the pressure reducing valve 7. The electric power signal is indicative of a value of the output voltage of the battery 40 and is send by the battery 40. The fuel temperature signal is indicative of a detected value of a fuel temperature detected by the fuel temperature sensor 3. All of the electric power signals, the fuel temperature signals, and the holding current signals are analogue electric signals that are converted to digital electric signal by the A/D converter 914*a* and are used by the CPU 911 to perform necessary control operations.

If the crank angle signal from the crank angle sensor 92 and the ignition signal which indicates whether or not the internal combustion engine 20 is activated are digital electric signals, the control unit 91 further has an input port to which digital electric signals including the crank angle signal and the ignition signal are inputted. The digital electric signals are interpreted as waveforms by the wave forming circuit 914*c*, and then the wave forming circuit 914*c* outputs electric signals in accordance with the waveforms obtained by the digital electric signals.

Further the control unit 91 has an output port (not shown) for outputting digital electric signals and the PWM signal. The output port for outputting digital electric signals of the control unit 91 is connected to a coil of a main relay (not shown) which is an electromagnetic relay for transferring electric power from the battery 40 to the control unit 91. The output port for outputting the PWM signal of the PWM signal generating unit 914*b* is connected to the suction control valve 4 and the injectors 6 via electric cables.

The control unit 91 performs control operation by providing control signals to the solenoid valves of the injectors 6, the solenoid of the pressure reducing valve 7 for opening or closing the valve member 1041 of the pressure reducing valve 7, the suction control valves 4 for controlling the fuel pressure in the common rail 5, and the high pressure pump 2 for adjusting the amount of the fuel pumped from the high pressure pump 2 to the common rail 5 based on the analogue and digital electric signals such as the electric power signal, the fuel temperature signal, the holding current signal, the crank angle signal, the ignition signal and other electric signals from the sensors 1090.

It should be noted that the control unit 91 calculates a delay which occurred in opening or closing the pressure reducing valve 7 and compensates the delay in opening and closing the pressure reducing valve 7 with the use of practical controls.

All of the above mentioned operations performed by the control unit 91 are carried out by using the computer programs 912*a* and the reference tables 912*b*.

Figure 4A:
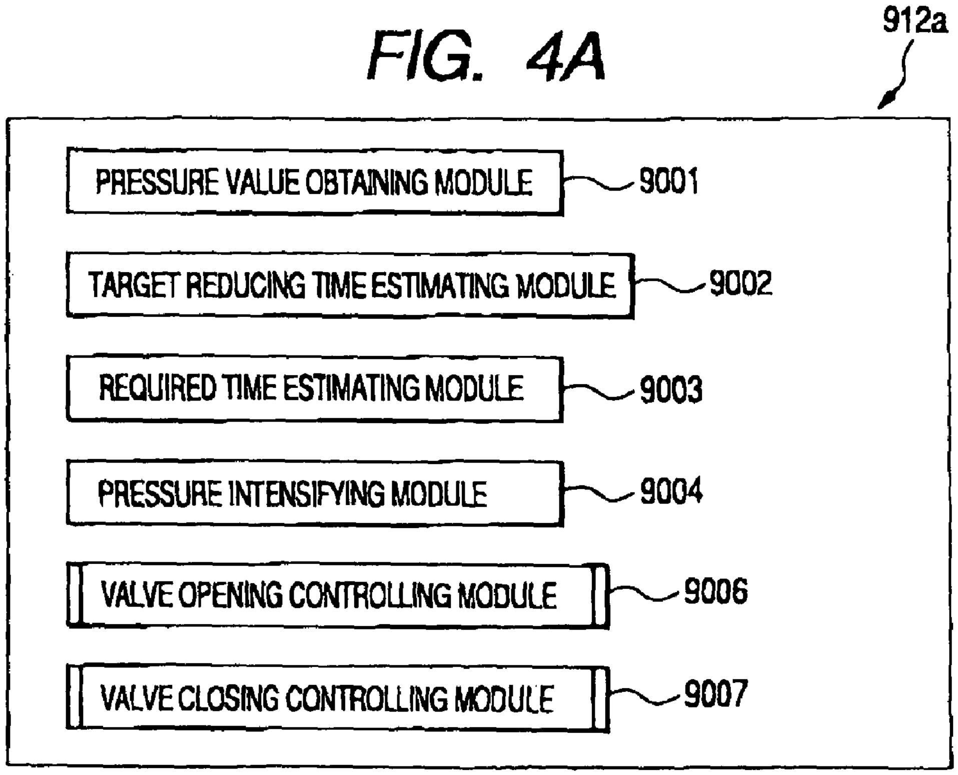
FIG. 4A shows a block diagram of the computer program stored in the memory of the control unit shown in FIG. 3.

FIG. 4A shows a structure of the computer programs 912*a* stored in the memory 912 of the control unit 91. The computer program 912*a* includes several modules; a pressure value obtaining module 9001, a target reducing time estimating module 9002, a required time estimating module 9003, a pressure intensifying module 9004, a valve opening controlling module 9007, and a-valve closing controlling module 9008.

Figure 4B:
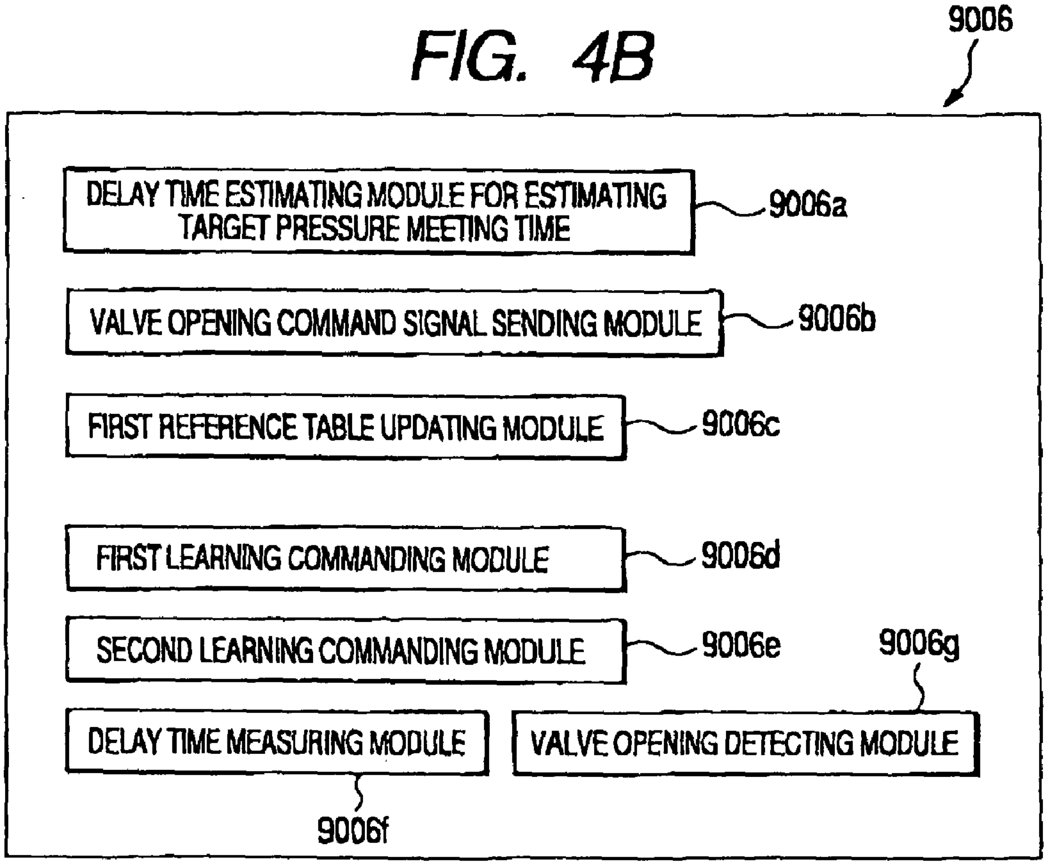
FIG. 4B shows valve opening controlling modules which constitute the computer program stored in the memory of the control unit shown in FIG. 4A.
Figure 4C:
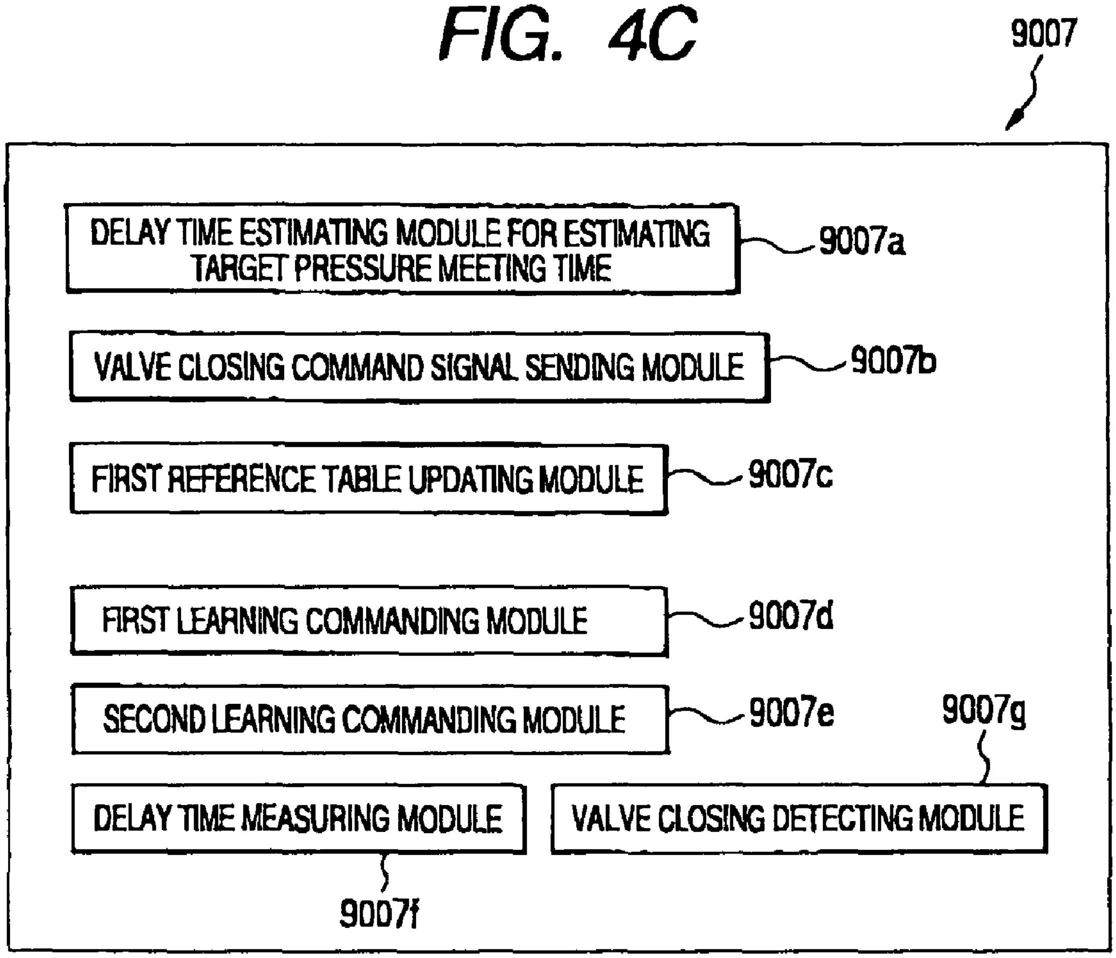
FIG. 4C shows valve closing controlling modules which constitute the computer program stored in the memory of the control unit shown in FIG. 4A.

As shown in FIG. 4B and FIG. 4C, both the valve opening controlling module 9006 and the valve closing controlling module 9007 include several respective sub-modules.

FIG. 4B shows contents of the valve opening controlling module 9006. The valve opening controlling module 9006 includes a delay time estimating module 9006*a* for estimating a target pressure meeting time, a valve opening command signal sending module 9006*b*, a first reference table updating module 9006*c*, a first learning-commanding module 9006*d*, a second learning commanding module 9006*e*, a first delay time measuring module 9006*f*, and a valve opening detecting module 9006*g*.

FIG. 4C shows contents of the valve closing controlling module 9007. The valve closing controlling module 9007 includes a third time estimating module 9007*a* for estimating a target pressure meeting time, a valve closing command signal sending module 9006*b*, a second reference table updating module 9007*c*, a third learning commanding module 9007*d*, a forth learning commanding module 9007*e*, a second delay time measuring module 9007*f*, and a valve closing detecting module 9007*g*.

The pressure value obtaining module 9001 is executed by the CPU for obtaining a fuel pressure of the common rail 5 using the fuel pressure sensor 8. The target reducing time estimating module 9002 is executed by the CPU for estimating the target reducing time when the common rail 5 reaches a target value of the fuel pressure based on a time sequential data of the fuel pressure of the common rail 5, for example rates of change in the fuel pressure with time, obtained by the fuel pressure obtaining module 9001. The required time estimating module 9003 is executed by the CPU to estimate when the target pressure will be reached and how long it will take to meet it. A time when target pressure will be reached defines the target pressure meeting time. The pressure intensifying module 9004 is executed by the CPU for intensifying the fuel pressure in the common rail 5 from the current value of the fuel pressure obtained by the fuel pressure sensor 8 to a first predetermined value of the fuel pressure.

The delay time estimating module 9006*a* is executed in order to ascertain when the target pressure will be met. This time defines a target pressure meeting time. The valve opening command signal sending module 9006*b* is executed for sending the valve opening command signal for opening the pressure reducing valve 7 from the ECU 9 to the solenoid of the pressure reducing valve 7 such that after receiving the valve opening command signal, the solenoid of the pressure reducing valve 7 starts supplying electric power to a tubular coil 1021 of the pressure reducing valve 7 in order to open the pressure reducing valve 7. The first reference table updating module 9006*c* is executed for updating a first reference table 9201 which contains a first plurality of relationships between parameters indicative of the conditions of the internal combustion engine 20 and the delay times for closing a pressure reducing valve 7 after an opening procedure for opening the pressure reducing valve 7 is completed. As shown in FIG. 3, the first reference table 9201 is stored in the memory 912*b* of the control unit 91. The first learning commanding module 9006*d* is used for outputting a command signal to the solenoid of the pressure reducing valve 7 for opening the pressure reducing valve 7 if a predetermined time for learning has been reached. The second learning commanding module 9006*e* is used for outputting a command signal to the solenoid of the pressure reducing valve 7 for opening the pressure reducing valve 7 if the fuel pressure reaches a predetermined value. The first delay time measuring module 9006*f* is used for measuring an actual delay time between a first time when the solenoid of the pressure reducing valve 7 receives the command signal for opening the pressure reducing valve 7 from the ECU 9 and a second time when the valve member 1041 of the pressure reducing valve 7 is actually opened. The valve opening detecting module 9006*g* is used for detecting whether or not the pressure reducing valve 7 is opened.

The third time estimating module 9007*a* is executed for estimating a target pressure meeting time. The valve closing command signal sending module 9007*b* is executed for sending the valve opening command signal for closing the pressure reducing valve 7 from the ECU 9 to the solenoid of the pressure reducing valve 7 such that after receiving the valve closing command signal, the solenoid of the pressure reducing valve 7 stops supplying electric power to a tubular coil 1021 of the pressure reducing valve 7 in order to close the pressure reducing valve 7. The second reference table updating module 9007*c* is executed to update a second reference table 9202 which contains a second plurality of relationships between parameters indicative of the conditions of the internal combustion engine 20 and the delay times for closing a pressure reducing valve 7 after a closing procedure for closing the pressure reducing valve 7 is completed. As shown in FIG. 3, the second reference table 9202 is stored in the memory 912*b* of the control unit 91. The second learning commanding module 9007*d* is used for outputting a command signal to the solenoid of the pressure reducing valve 7 for closing the pressure reducing valve 7 if a predetermined time for learning has been reached. The forth learning commanding module 9007*e* is used for outputting a command signal to the solenoid of the pressure reducing valve 7 for closing the pressure reducing valve 7 if the fuel pressure reaches a predetermined value. The second delay time measuring module 9007*f* is used for measuring an actual delay time between a first time when the solenoid of the pressure reducing valve 7 receives the command signal for closing the pressure reducing valve 7 from the ECU 9 and a second time when the valve member 1041 of the pressure reducing valve 7 is actually closed. The valve closing detecting module 9007*g* is used for detecting whether or not the pressure reducing valve 7 is closed.

There modules of the computer program 912*a* constitute components of respective means for performing respective operations. For example, the pressure value obtaining module 9001, the fuel pressure sensor 8, the CPU 911, the memory 912, the A/D converter 914*a* of the In/Out interface unit 914 and the real time clock 913 constitute a pressure value obtaining means for obtaining the fuel pressure of the common rail 5. As is the case with the pressure value obtaining means, the target reducing time estimating module 9002, the required time estimating module 9003, the pressure intensifying module 9004, the valve opening controlling module 9007, and the valve closing controlling module 9008 are components of a target reducing time estimating means, a required time estimating means, a pressure intensifying means, a valve opening controlling means, and a valve closing controlling means, respectively.

In a similar way, a delay time estimating means, a valve opening command signal sending means, a first reference table updating means, a first learning commanding means, a second learning commanding means, a first delay time measuring means, and a valve opening detecting means can be constructed by adopting as one of components of those the delay time estimating module 9006*a*, the valve opening command signal sending module 9006*b*, the first reference table updating module 9006*c*, the first learning commanding module 9006*d*, a second learning commanding module 9006*e*, the first delay time measuring module 9006*f*, and the valve opening detecting module 9006*g*, respectively.

A third time estimating means, a valve closing command signal sending means, a second reference table updating means, a third learning commanding means, a forth learning commanding means, a second delay time measuring means, and a valve closing detecting means are also able to be constructed by adopting one of the components from any of the third time estimating module 9007*a*, the valve closing command signal sending module 9006*b*, the second reference table updating module 9007*c*, the third learning commanding module 9007*d*, the forth learning commanding module 9007*e*, the second delay time measuring module 9007*f*, or the valve closing detecting module 9007*g*.

Figure 5A:
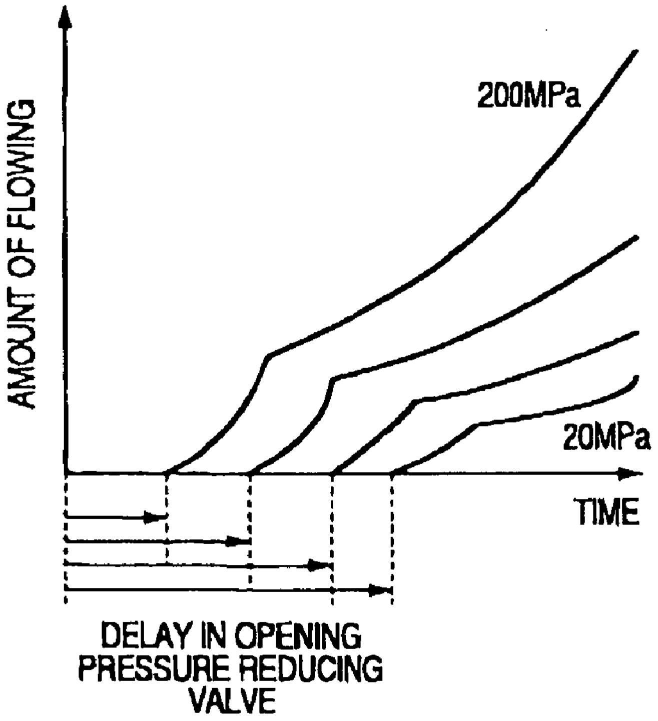
FIG. 5A shows a relationship between an amount of fuel discharged from the common rail to the relief pipe and a delay caused in opening the pressure reducing valve.

FIG. 5A shows a relationship between an amount of fuel discharged from the common rail 5 to the relief pipe 14 and a delay caused in opening the pressure reducing valve 7. The delay is defined as a time between a time when the ECU 9 outputs a command signal for opening the pressure reducing valve 7 and a further time when the valve member 1041 of the pressure reducing valve 7 is moved to open a high pressure passage 1035 for discharging the fuel in the common rail 5.

As can seen from curves in FIG. 5A, the delay in opening the pressure reducing valve 7 becomes shorter as the fuel pressure in the common rail 5 is increased since the valve member 1041 receives a pressure force due to the fact that the fuel accumulated in the common rail 5 is highly compressed. As shown in FIG. 5A, the curve corresponding at the fuel pressure 200 Mpa is always higher than that corresponding at the fuel pressure 20 Mpa in the amount of fuel discharged from the common rail 5 versus the delay in opening the pressure reducing valve 7.

Further, as the fuel pressure in the common rail 5 is decreased, the delay in opening the pressure reducing valve 7 becomes longer.

Figure 5B:
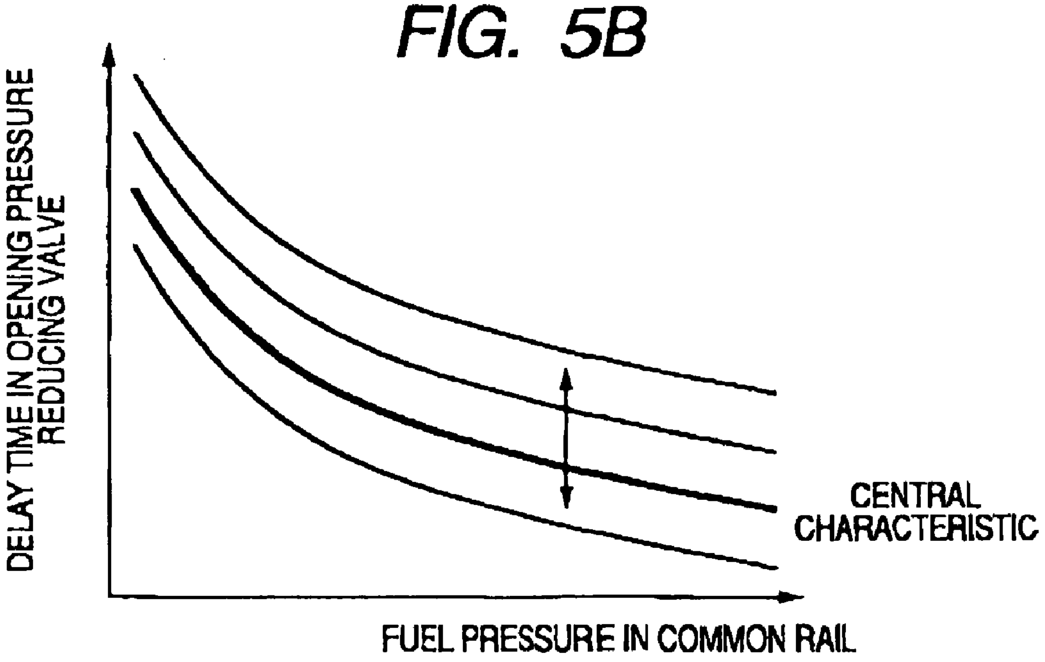
FIG. 5B shows a graph wherein each curves represents a delay in opening the pressure reducing valve as a function of the fuel pressure accumulated in the common rail when a output voltage of the battery or at a temperature of the tubular coil of the pressure reducing valve is given.

As shown in FIG. 5B, the delay not only be a function of the fuel pressure in the common rail 5, but also depends on an output voltage of the battery 40 and a temperature of the tubular coil 1021 of the pressure reducing valve 7. Generally, the temperature of the tubular coil 1021 of the pressure reducing valve 7 is close to a temperature of the fuel accumulated in the common rail 5, i.e, a temperature of a fuel injected from the injectors 6 to each cylinder of the internal combustion engine 20. Each of the curves shown in FIG. 5B represents a delay as a function of the fuel pressure accumulated in the common rail 5 at a given output voltage of the battery 40 or a given temperature of the tubular coil 1021 of the pressure reducing valve 7.

Thus, it is necessary to learn the relationship between the delay in opening the pressure reducing valve 7 and the fuel pressure accumulated in the common rail 5 at several values of the output voltage of the battery 40 or the temperature of the tubular coil 1021 of the pressure reducing valve 7 and store the memory 912 of the control unit 91 with the learned relationship when an end of line (EOL) production test is performed, i.e., when a vehicle just constructed in a production line in a factory is tested for imperfections. There are checking matters at the EOL production test which include not only a central characteristic curve of the delay in opening the pressure reducing valve 7 as a function of the fuel pressure accumulated in the common rail 5, but also offset values of the delay in opening the pressure reducing valve 7, each of the offset values corresponding at a given output voltage of the battery 40 or a given temperature of the tubular coil 1021 of the pressure reducing valve 7. The central characteristic curve of the delay in opening the pressure reducing valve 7 is defined as a delay time that is functions of the fuel pressure in the common rail 5 when the output voltage of the battery 40 and the temperature of the tubular coil 1021 of the pressure reducing valve 7 are within a predetermined range.

FIG. 5B illustrates an example of the central characteristic curve of the delay in opening the pressure reducing valve 7.

Figure 5C:
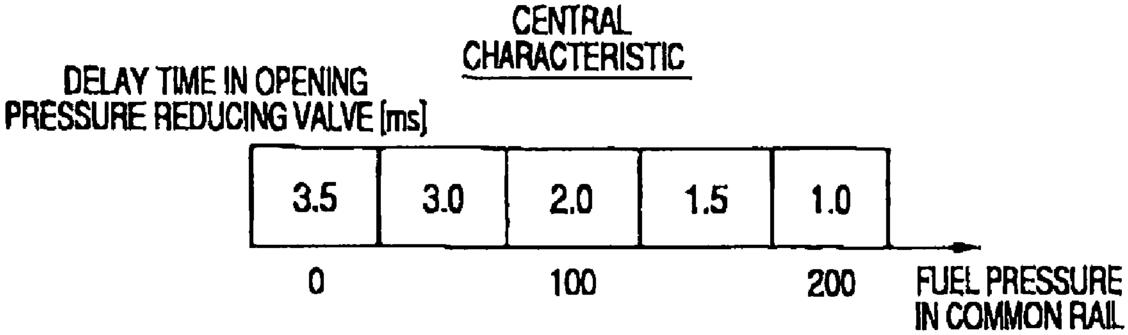
FIG. 5C shows an example of a central characteristic map which is obtained by extracting several points from the characteristic curve of the delay in opening the pressure reducing valve.
Figure 5D:
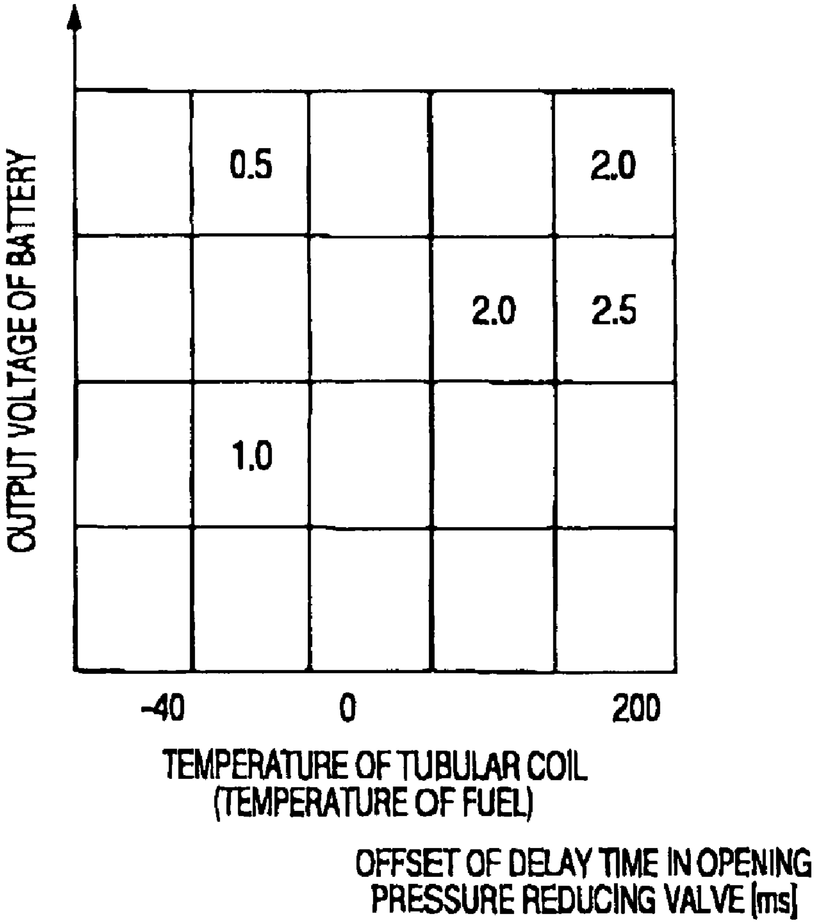
FIG. 5D shows an example of offset maps which show the offset values which are deviations from the central characteristic curve shown in FIG. 5C as functions both of the output voltage of the battery and of the temperature of the tubular coil of the pressure reducing valve.

The learned results of the central characteristic curve of the delay in opening the pressure reducing valve 7 and the offset values corresponding at a given output voltage of the battery 40 and a given temperature of the tubular coil 1021 of the pressure reducing valve 7 are stored in the memory 912 such as EEPROM as the first and the second reference table as shown in FIG. 5C and FIG. 5D.

FIG. 5C shows an example of a central characteristic map which is obtained by extracting several point on the characteristic curve of the delay in opening the pressure reducing valve 7.

FIG. 5D shows an example of offset maps which show the offset values which are deviations from the central characteristic curve of the delay in opening the pressure reducing valve 7 as a function of the output voltage of the battery 40 and the temperature of the tubular coil 1021 of the pressure reducing valve 7.

Figures 6A, 6B, 6C:
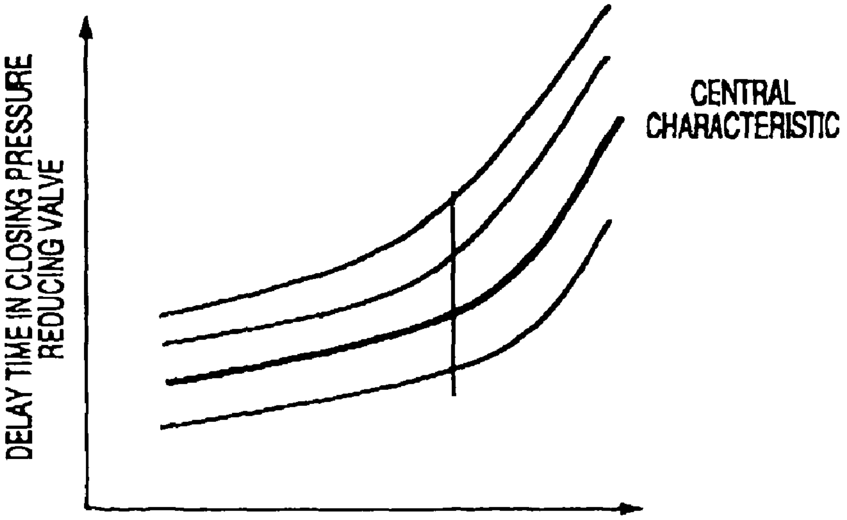
FIG. 6A shows a relationship between an amount of fuel discharged from the common rail to the relief pipe and a delay caused in closing the pressure reducing valve.
FIG. 6B shows an example of a central characteristic map which is obtained by extracting several points from the central characteristic curve of the delay in closing the pressure reducing valve.
FIG. 6C shows an example of offset maps which show the offset values that is deviations from the central characteristic curve of the delay in closing the pressure reducing valve as functions both of the output voltage of the battery and of the temperature of the tubular coil of the pressure reducing valve.

FIG. 6A shows a relationship between an amount of fuel discharged from the common rail 5 to the relief pipe 14 and a delay caused in closing the pressure reducing valve 7. The delay is defined as a time between a time when the ECU 9 outputs a command signal for closing the pressure reducing valve 7 and a further time when the valve member 1041 of the pressure reducing valve 7 closes a high pressure passage 1035 for discharging the fuel in the common rail 5, that is, the ECU 9 stops discharging the fuel accumulated in the common rail 5 to the fuel tank 10 so as to reduce the fuel pressure in the common rail 5.

As shown in FIG. 6A, the delay in closing the pressure reducing valve 7 becomes longer as the fuel pressure in the common rail 5 is increased since the valve member 1041 receives a pressure force due to the fact that the fuel accumulated in the common rail 5 has a tendency to expand its volume because the fuel has been pressurized before it flows into the common rail 5.

Further, as the fuel pressure in the common rail 5 is decreased, the delay in closing the pressure reducing valve 7 becomes shorter.

As shown in FIG. 6A, the delay is not only a function of the fuel pressure in the common rail 5, but also depends on an output voltage of the battery 40 and a temperature of the tubular coil 1021 of the pressure reducing valve 7. Generally, the temperature of the tubular coil 1021 of the pressure reducing valve 7 is close to a temperature of the fuel accumulated in the common rail 5, i.e, a temperature of a fuel injected from the injectors 6 to each cylinder of the internal combustion engine 20. Each of the curves shown in FIG. 6B represents a delay as a function of the fuel pressure accumulated in the common rail 5 at a given output voltage of the battery 40 or a given temperature of the tubular coil 1021 of the pressure reducing valve 7.

Thus, it is necessary to learn the relationship between the delay in closing the pressure reducing valve 7 and the fuel pressure accumulated in the common rail 5 at several values of the output voltage of the battery 40 or the temperature of the tubular coil 1021 of the pressure reducing valve 7 and store the memory 912 of the control unit 91 with the learned relationship at an end of line (EOL) production system, i.e., when a vehicle just constructed in a production line in a factory is tested for imperfections. There are checking matters at the EOL production system which include not only a central characteristic curve of the delay in opening the pressure reducing valve 7 as a function of the fuel pressure accumulated in the common rail 5, but also offset values of the delay in closing the pressure reducing valve 7, each of the offset values corresponding at a given output voltage of the battery 40 or a given temperature of the tubular coil 1021 of the pressure reducing valve 7. The central characteristic curve of the delay in closing the pressure reducing valve 7 is defined as a delay time which is a function of the fuel pressure in the common rail 5 when the output voltage of the battery 40 and the temperature of the tubular coil 1021 of the pressure reducing valve 7 are within a predetermined range.

The learned results of the central characteristic curve of the delay in closing the pressure reducing valve 7 and the offset values corresponding at a given output voltage of the battery 40 and a given temperature of the tubular coil 1021 of the pressure reducing valve 7 are stored in the memory 912 such as EEPROM as the third and the forth reference table as shown in FIG. 6B and FIG. 6C.

FIG. 6B shows an example of a central characteristic map which is obtained by extracting several point on the characteristic curve of the delay in closing the pressure reducing valve 7.

FIG. 6C shows an example of offset maps which show the offset values that is deviations from the central characteristic curve of the delay in closing the pressure reducing valve 7 as functions of the output voltage of the battery 40 and the temperature of the tubular coil 1021 of the pressure reducing valve 7.

Next control methods for compensating the delay time for opening or closing the pressure reducing valve 7 will be explained with references to FIGS. 7 to 14.

Figure 7:
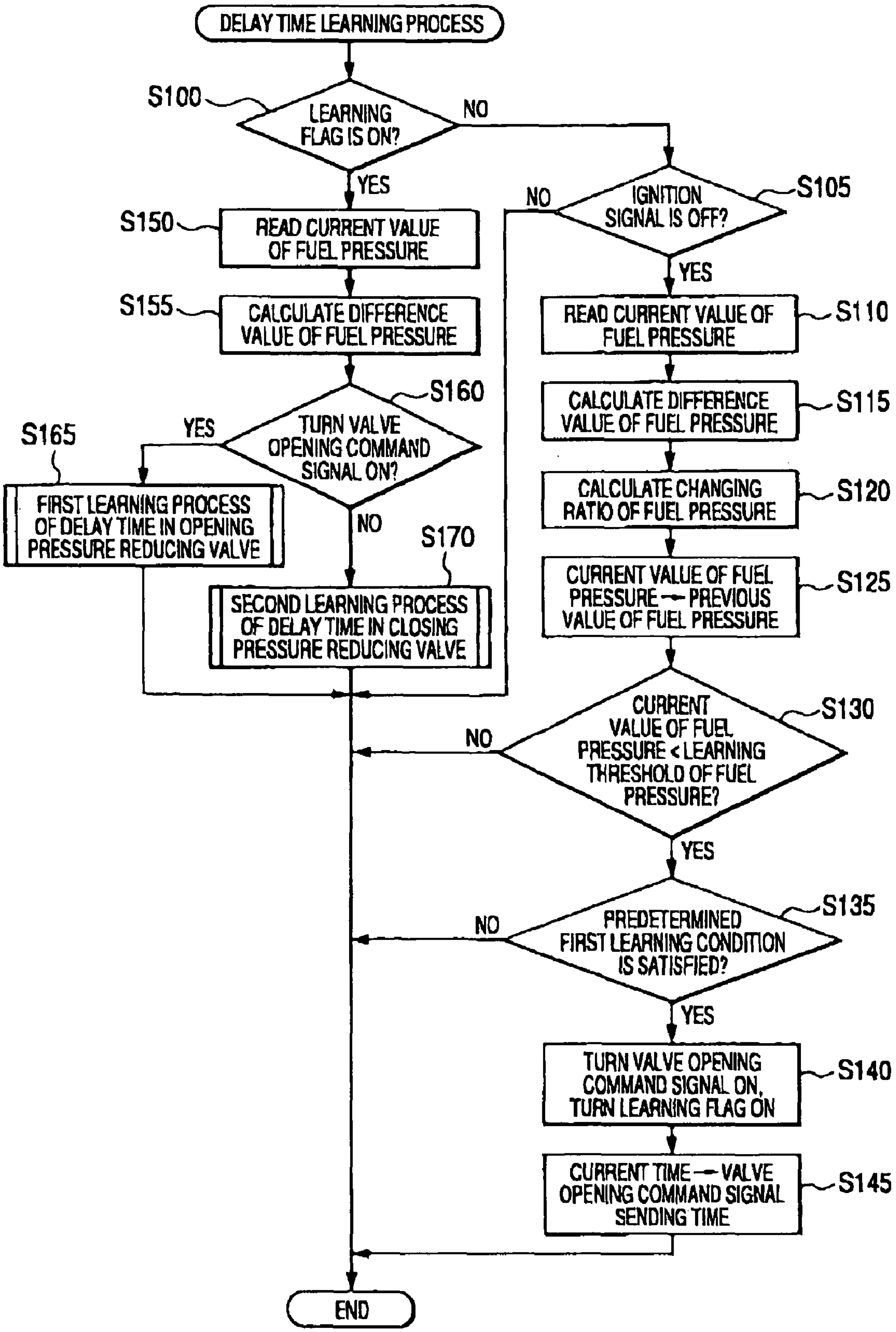
FIG. 7 is a flowchart showing a control method for compensating the delay time for opening the pressure reducing valve which is carried out when the internal combustion engine is stopped.

FIG. 7 is a flowchart showing a control method for compensating the delay time for opening the pressure reducing valve 7 which is carried out when the internal combustion engine 20 is stopped. With a control operation shown in FIG. 7, the pressure reducing valve 7 is controlled such as shown in FIG. 15. Although a detailed explanation will be given later, FIG. 15 is a graph showing changes over time of the ignition signal, the fuel pressure in the common rail 5, the valve opening command signal, and a degree of opening of the pressure reducing valve 7.

In a control method shown in FIG. 7, the ECU 9 obtains a fuel pressure in the common rail 5 at every rotation of the crank shaft of the internal combustion engine 20 with a predetermined angle, 180 degrees in this embodiment while the internal combustion engine 20 is running. The above mentioned timing to read the fuel pressure while the internal combustion engine 20 is running defines a first read time to read the fuel pressure in the common rail 5 in response to a command signal outputted from the ECU 9 as can be seen from FIG. 15. Since the internal combustion engine 20 is running, the ignition key outputs to the ECU an ignition signal indicating an "ON" state of the ignition key. While the ECU 9 obtains the fuel pressures at every first read times, change rates of the fuel pressure in the common rail 5 are calculated as changing ratios of the fuel pressures.

If the internal combustion engine 20 is stopped, that is, the ignition key is turned to an "OFF" state, the ECU 9 obtains a fuel pressure in the common rail 5 with a predetermined interval that is shorter than a time for rotating of the crank shaft of the internal combustion engine 20 with a predetermined angle. In this embodiment, the predetermined interval is 5 milliseconds. This predetermined interval defines a second read time to read the fuel pressure while the internal combustion engine 20 is stopped. That is, the second read time to read the fuel pressure while the internal combustion engine 20 is stopped is suitable at every end of the predetermined intervals.

The control operation according to the control method shown in FIG. 7 is started at every second read time.

As shown in FIG. 7, when the operation is started, the ECU 91 reads a learning flag which indicates whether or not the ECU 91 is learning a delay in opening or closing the pressure reducing valve 7 at step S100. The learning flag is in an "ON" state when the ECU 91 is learning the delay in opening or closing the pressure reducing valve 7. If the learning flag is in the "ON" state, the result of the determination in step S100 is "YES". In contrast, if the learning flag is in an "OFF" state, i.e., the ECU 91 is not learning the delay in opening or closing the pressure reducing valve 7, the determination in step S100 is "NO", and then it is determined whether or not the ignition signal is turned "OFF" at step S105.

If the result of the determination at step S105 is "NO", i.e., the ignition signal is in an "OFF" state, the control operation is terminated.

In contrast, if the result of the determination at step S105 is "YES", i.e., the ignition signal is in an "ON" state, the current value of the fuel pressure is measured at step S110. Then, at step S115, a fuel pressure difference between the current value and a previous value of the fuel pressure in the common rail 5 is calculated. The previous value of the fuel pressure is the last measured value of the fuel pressure. A smearing process on the current value of the fuel pressure is performed to obtain the smeared value of the fuel pressure and the smeared value of the fuel pressure is used to calculate a smeared differential value of the fuel pressure at step S120. In the smearing process, the current value of the fuel pressure is corrected so as to a change in the fuel pressure is continuous and smooth over time. If the previous value of the fuel pressure is empty, calculations of the fuel pressure difference at step S115 and the differential value of the fuel pressure at step S120 are not performed.

At step S125, the current value of the fuel pressure moves to the previous value of the fuel pressure.

At step S130, it is determined whether or not the current value of the fuel pressure is smaller than a learning threshold value of the fuel pressure below which the ECU 91 carries out a learning of the delay in opening or closing the pressure reducing valve 7.

If the result of the determination at step S130 is "No", that is, when the current value of the fuel pressure is equal to or larger than the predetermined threshold value of the fuel pressure, the control operation is terminated.

In contrast, if the result of the determination at step S130 is "YES", that is, when the current value of the fuel pressure is smaller than the predetermined threshold value of the fuel pressure, it is further determined whether or not a predetermined first learning condition is satisfied at step S135.

In this embodiment, the predetermined first learning condition is set such that a temperature of the tubular coil 1021 is within a predetermined rage, for example, from −40 degrees Celsius to 200 degrees Celsius, and the output voltage of the battery 40 is within a further predetermined range, for example, from +8 volts to +16 volts.

If the result of the determination at step S135 is "NO", that is, when the first learning condition is not satisfied, the control operation is terminated.

In contrast, if the result of the determination at step S135 is "YES", that is, when the first learning condition is actually satisfied, an valve opening command signal is outputted from the ECU 91 by the valve opening command signal sending means, and then the learning flag is tuned into the "ON" state at step S140.

At step S145, after a current time is set as a valve opening command sending time, the control operation is terminated.

Meanwhile, if the learning flag is in the "ON" state, that is, when the result of the determination in step S100 is "YES", the ECU 91 read the current value of the fuel pressure at step S150 by using the fuel pressure sensing means and calculates the difference value of the fuel pressure in the common rail 5 between the current value and the previous value of the fuel pressure at step S155.

At step S160, it is determined whether or not the valve opening command signal is in an "ON" state. If the result of the determination at step S160 is "YES", that is, when the valve opening command signal is reliably in the "ON" state, a first learning processing of a delay in opening the pressure reducing valve 7 is carried out at step S165 as will be described later in detail. Then, the control operation is terminated.

In contrast, if the result of the determination at step S165 is "NO", that is, when the valve opening command signal is in an "OFF" state, the process proceeds to a second learning processing of a delay in closing the pressure reducing valve 7 is carried out at step S170 as will be described later in detail. Then, the control operation is terminated.

Figure 8:
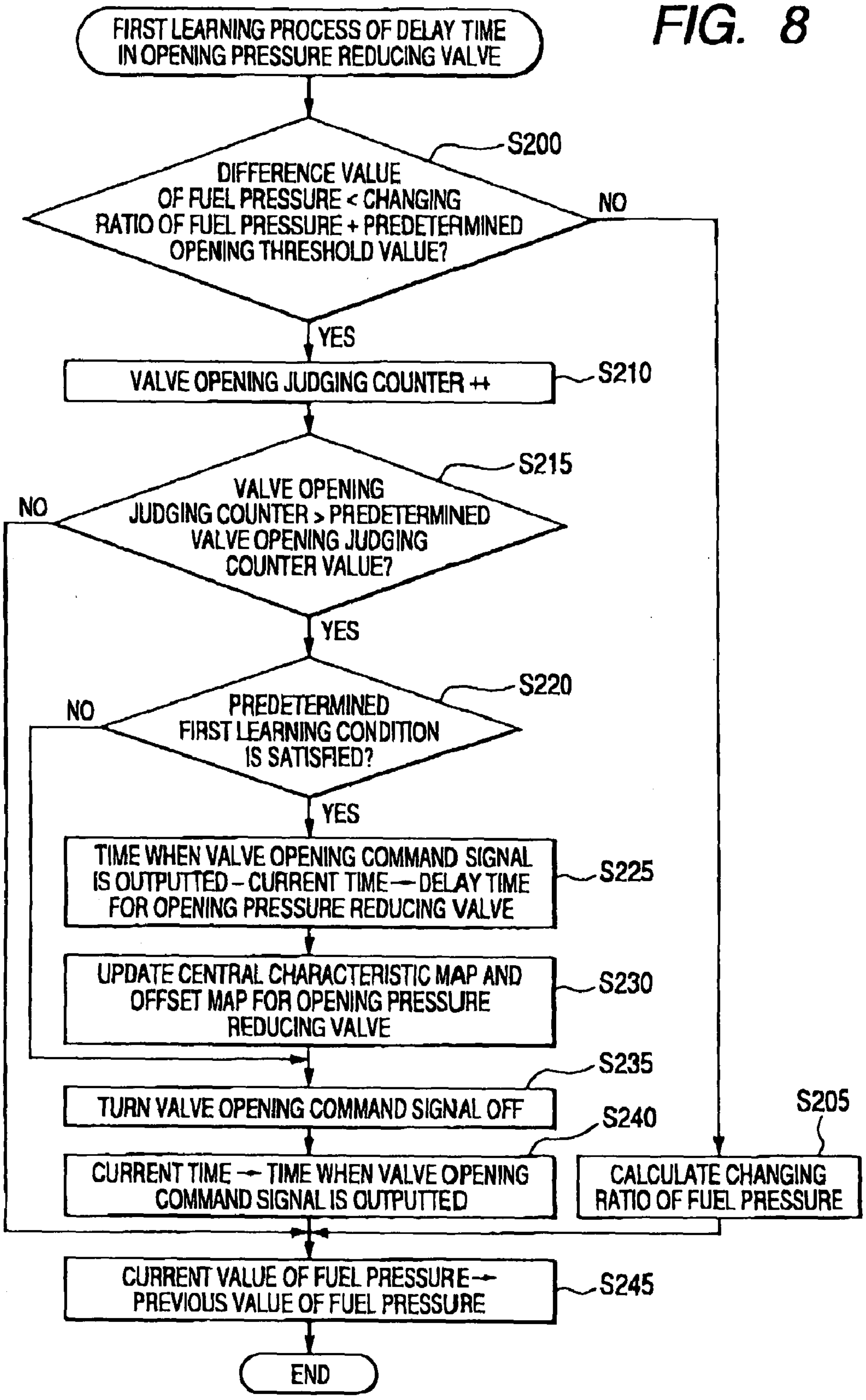
FIG. 8 is a flowchart showing the first learning processing of the delay in opening the pressure reducing valve is carried out at step S165 in FIG. 7.

FIG. 8 is a flowchart showing the first learning processing of the delay in opening the pressure reducing valve 7 is carried out at step S165 in FIG. 7.

As shown in FIG. 8, it is determined whether or not a fuel pressure difference between the current value and a previous value of the fuel pressure in the common rail 5 is smaller than the sum of the differential value of the fuel pressure and a predetermined opening threshold value at step S200. This determination judges whether or not an evidence of a fact that the pressure reducing valve 7 is opened. The predetermined opening threshold value is a negative value and is set such that a differential value of the fuel pressure which is obtained when the pressure reducing valve 7 is closed and the predetermined opening threshold value itself can be approximated by a fuel pressure difference between the current value and a previous value of the fuel pressure in the common rail 5 which is obtained when the pressure reducing valve 7 is opened.

If the result of the determination at step S200 is "NO", that is, when the fuel pressure difference between the current value and the previous value of the fuel pressure in the common rail 5 is larger than the sum of the differential value of the fuel pressure and the predetermined opening threshold value, a smeared differential value of the fuel pressure is calculated after the smearing process on the current fuel pressure is performed so as to be used for calculating the smeared differential value of the fuel pressure at step S205. In the smearing process, the current value of the fuel pressure is corrected so as to ensure that the change in the fuel pressure is continuous and smooth over time. Then, the control operation proceeds to step S245.

In contrast, if the result of the determination at step S200 is "YES", that is, when the fuel pressure difference between the current value and the previous value of the fuel pressure in the common rail 5 is smaller than the sum of the differential value of the fuel pressure and the predetermined opening threshold value, the control operation proceeds to step S210.

After a valve opening judging counter is incremented at step S210, it is determined whether or not the current value of the valve opening judging counter is larger than a predetermined valve opening judging counter value at step S215. The predetermined valve opening judging counter value is a possible value which can be taken by the valve opening judging counter when the pressure reducing valve 7 is actually opened. By performing steps S210 and S215, it is possible to prevent making any mistakes in detecting an inflection point of a fuel pressure curve even if some error is contained in either the current value of the fuel pressure or the previous value of the fuel pressure.

If the result of the determination at step S215 is "NO", that is, when the current value of the valve opening judging counter is smaller than the predetermined valve opening judging counter value, the control operation directly proceeds to step S245.

In contrast, if the result of the determination at step S215 is "YES", that is, when the current value of the valve opening judging counter is larger than the predetermined valve opening judging counter value, the ECU 91 recognized that the pressure reducing valve 7 is actually opened.

At step S220, it is judged whether or not the predetermined first learning condition is satisfied. If the result of the judgment at step S220 is "NO", that is, when the predetermined first learning condition is not satisfied, the control operation directly proceeds to step S235. In contrast, if the result of the judgment at step S220 is "YES", that is, when the predetermined first learning condition is actually satisfied, a delay time for opening the pressure reducing valve 7 is calculated by subtracting the current time from a time when the valve opening command signal is outputted from the ECU 91 by using the valve opening command sending means at step S225. Then, at step S230, the central characteristic map for opening the pressure reducing valve 7 and the offset map for opening the pressure reducing valve 7 are updated based on the calculated delay time by using the first reference table updating means.

After the updating the central characteristic map for opening the pressure reducing valve 7 and the offset map for opening the pressure reducing valve 7 is finished, the valve opening command signal is tuned off at step S235. Then, at step S240, the time when the valve opening command signal is outputted from the ECU 91 is set to be the current time.

At step S245, the current value of the fuel pressure moves to the previous value of the fuel pressure in the common rail 5, and the control operation is terminated.

Figure 9:
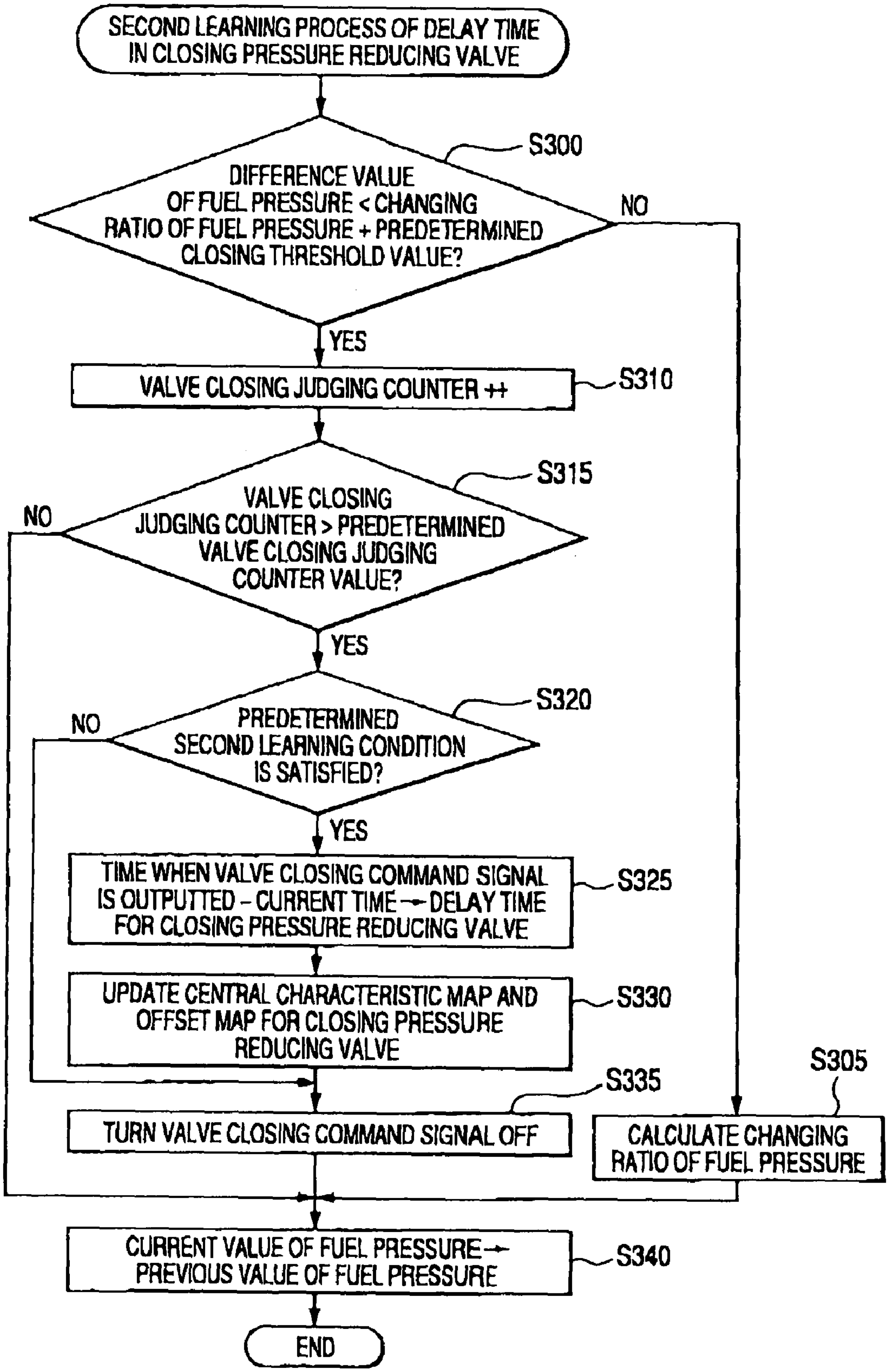
FIG. 9 is a flowchart showing the first learning processing of the delay in closing the pressure reducing valve is carried out at step S170 in FIG. 7.

FIG. 9 is a flowchart showing the first learning processing of the delay in closing the pressure reducing valve 7 is carried out at step S170 in FIG. 7.

As shown in FIG. 8, at first, it is determined whether or not a fuel pressure difference between the current value and a previous value of the fuel pressure in the common rail 5 is larger than the sum of the differential value of the fuel pressure and a predetermined closing threshold value at step S300. This determination judges whether or not an evidence of a fact that the pressure reducing valve 7 is closed. The predetermined closing threshold value is a negative value and is set such that a differential value of the fuel pressure which is obtained when the pressure reducing valve 7 is opened and the predetermined closing threshold value itself can be approximated by a fuel pressure difference between the current value and a previous value of the fuel pressure in the common rail 5 which is obtained when the pressure reducing valve 7 is closed.

If the result of the determination at step S300 is "NO", that is, when the fuel pressure difference between the current value and the previous value of the fuel pressure in the common rail 5 is smaller than the sum of the differential value of the fuel pressure and the predetermined opening threshold value, a smeared differential value of the fuel pressure is calculated after the smearing process on the current fuel pressure is performed on the fuel pressure so as to be used for calculating the smeared differential value of the fuel pressure at step S305. In the smearing process, the current value of the fuel pressure is corrected so as to ensure that the change in the fuel pressure is continuous and smooth over time. Then, the control operation proceeds to step S340.

In contrast, if the result of the determination at step S300 is "YES", that is, when the fuel pressure difference between the current value and the previous value of the fuel pressure in the common rail 5 is larger than the sum of the differential value of the fuel pressure and the predetermined opening threshold value, the control operation proceeds to step S310.

After a valve closing judging counter is incremented at step S310, it is determined whether or not the current value of the valve closing judging counter is larger than a predetermined valve closing judging counter value at step S315. The predetermined valve closing judging counter value is a possible value which can be taken by the valve closing judging counter when the pressure reducing valve 7 is actually closed. By performing steps S310 and S315, it is possible to prevent making any mistakes in detecting an inflection point of a fuel pressure curve even if some error is contained in either the current value of the fuel pressure or the previous value of the fuel pressure.

If the result of the determination at step S315 is "NO", that is, when the current value of the valve closing judging counter is smaller than the predetermined valve closing judging counter value, the control operation directly proceeds to step S340.

In contrast, if the result of the determination at step S315 is "YES", that is, when the current value of the valve closing judging counter is larger than the predetermined valve closing judging counter value, the ECU 91 recognized that the pressure reducing valve 7 is actually closed.

At step S320, it is judged whether or not the predetermined second learning condition is satisfied. If the result of the judgment at step S220 is "NO", that is, when the predetermined second learning condition is not satisfied, the control operation directly proceeds to step S335. In contrast, if the result of the judgment at step S320 is "YES", that is, when the predetermined second learning condition is actually satisfied, a delay time for closing the pressure reducing valve 7 is calculated by subtracting the current time from a time when the valve closing command signal is outputted from the ECU 91 by using the valve closing command sending means at step S325. Then, at step S230, the central characteristic map for closing the pressure reducing valve 7 and the offset map for closing the pressure reducing valve 7 are updated based on the calculated delay time by using the second reference table updating means.

In this embodiment, the predetermined second learning condition is set such that a temperature of the tubular coil 1021 of the pressure reducing is within a predetermined rage, for example, from −40 degrees Celsius to 200 degrees Celsius, and the holding current flowing through the tubular coil 1021 of the pressure reducing valve 7 is within a further predetermined range, for example, from +1 amperes to +4 amperes.

At step S320, it is judged whether or not the predetermined second learning condition is satisfied. If the result of the judgment at step S320 is "NO", that is, when the predetermined second learning condition is not satisfied, the control operation directly proceeds to step S335. In contrast, if the result of the judgment at step S320 is "YES", that is, when the predetermined second learning condition is actually satisfied, a delay time for opening the pressure reducing valve 7 is calculated by subtracting the current time from a time when the valve closing command signal is outputted from the ECU 91 by using the valve closing command sending means at step S325. Then, at step S330, the central characteristic map for closing the pressure reducing valve 7 and the offset map for closing the pressure reducing valve 7 are updated based on the calculated delay time by using the second reference table updating means.

After the updating the central characteristic map for closing the pressure reducing valve 7 and the offset map for closing the pressure reducing valve 7 is finished, the learning flag which indicates whether or not the ECU 91 is learning a delay in opening or closing the pressure reducing valve 7 is set in an "OFF" state at step S335.

At step S340, the current value of the fuel pressure moves to the previous value of the fuel pressure in the common rail 5, and the control operation is terminated.

Figure 10:
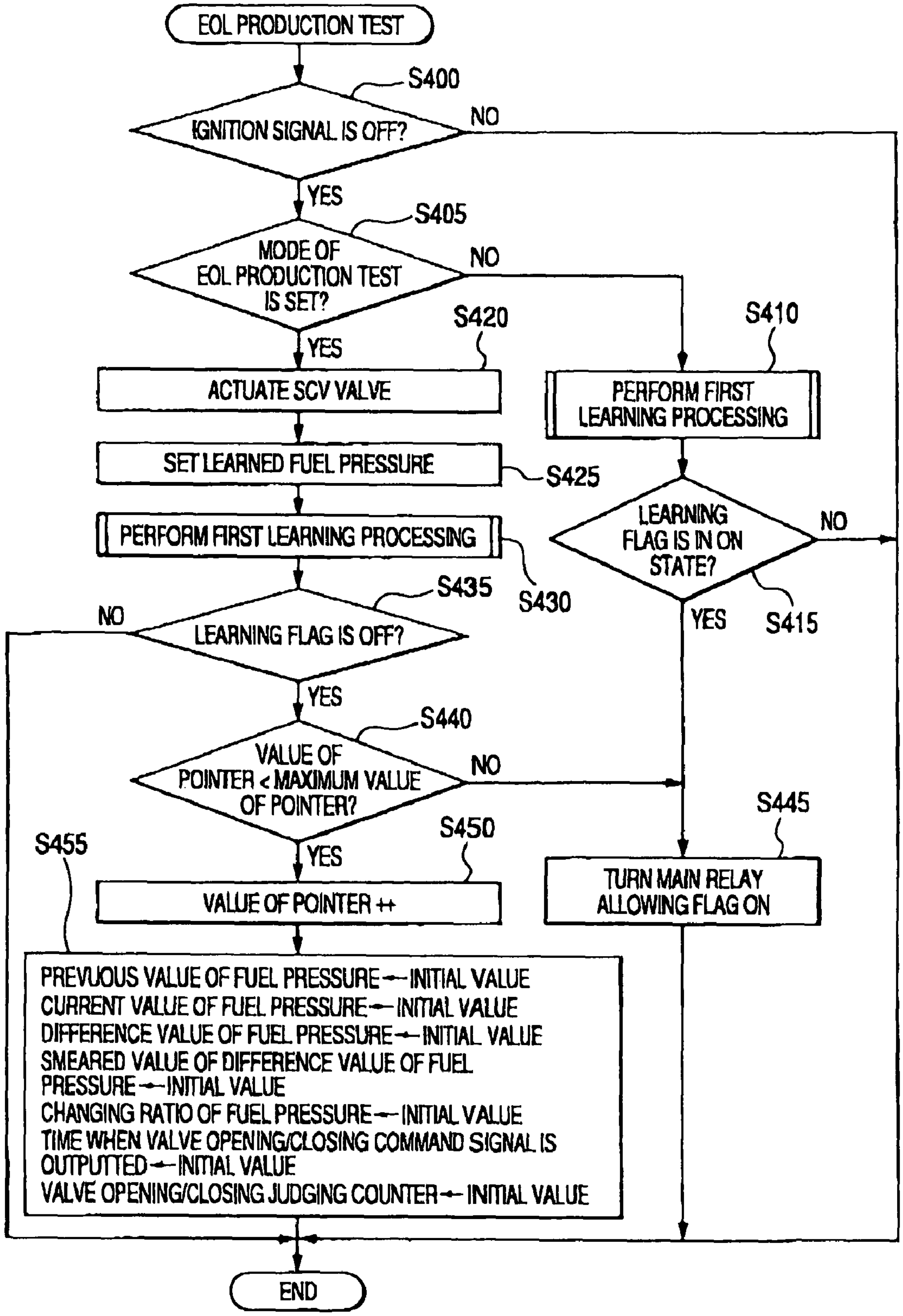
FIG. 10 is a flowchart showing an EOL learning procedure by which the ECU learnes delay characteristics in opening or closing the pressure reducing valve as a function of the fuel pressure accumulated in the common rail, the temperature of the tubular coil of the pressure reducing valve, the output voltage of the battery and the like at an EOL production test.

Next, FIG. 10 is a flowchart showing an EOL learning procedure by which the ECU 9 learns delay characteristics in opening or closing the pressure reducing valve 7 as a function of the fuel pressure accumulated in the common rail 5, the temperature of the tubular coil 1021 of the pressure reducing valve 7, the output voltage of the battery 40 and the like at an EOL production test. With a control operation shown in FIG. 10, the pressure reducing valve 7 is controlled such as shown in FIG. 16. Although a detailed explanation will be given later, FIG. 16 is a graph showing changes over time of the ignition signal, the fuel pressure in the common rail 5, the valve opening command signal, and a degree of opening of the pressure reducing valve 7.

The EOL learning procedure starts to be carried out at every second read time.

As shown in FIG. 10, the EOL production test is started with step S400. At step S400, it is determined whether or not the ignition signal is in "OFF" state. If the result of the determination at step S400 is "NO", that is, when the ignition signal is not outputted from the ignition key, the EOL production test is terminated.

In contrast, if the result of the determination at step S400 is "YES", that is, when the ignition signal is outputted from the ignition key, it is determined whether a mode of the EOL production test is set at step S405. The mode of the EOL production test is stored in the ECU 9 and is set by an external device while the ignition key is turned on.

If the result of the determination at step S405 is "NO", that is, the mode of the EOL production test is not set yet, the first learning processing of the delay in opening or closing the pressure reducing valve 7 is carried out at step S410. Then, it is determined whether or not the learning flag which indicate whether or not the ECU 91 is learning a delay in opening or closing the pressure reducing valve 7 is set in an "OFF" state at step S415.

If the result of the determination at step S415 is "NO", that is, the learning flag is in an "ON" state, the EOL production test is terminated. If the result of the determination at step S415 is "YES", that is, the learning flag is in the "OFF" state, the procedure directly proceeds to step S445.

In contrast, if the result of the determination at step S405 is "YES", that is, the mode of the EOL production test is already set, at step S420 the suction control valve (SCV) 4 is actuated in order to increase a valve-opening degree of the fuel passage leading from the feed pump of the high pressure pump 2 to the pressurizing chamber of the high pressure pump 2 such that the fuel pressure in the common rail 5 is increased till an upper limit value of the fuel pressure in the common rail 5. If the fuel pressure in the common rail 5 is already reached to the upper limit value of the fuel pressure in the common rail 5 because the suction control valve (SCV) 4 had been actuated to increase the fuel pressure in the common rail 5, the SCV 4 is not actuated.

Then, the ECU 9 read a pointer value of the fuel pressure of a learned fuel pressure table and set it as a learned fuel pressure at step S425. In the learned fuel pressure table, fuel pressure values are predetermined as functions of several parameters, each being indicative of engine conditions. In an initial condition, all of the pointer values are set to 0.

At step S430, the EOL production test is carried out.

After the EOL production test is finished, it is determined whether or not the learning flag is set to be in "OFF" state at step S345. If the result of the determination at step S345 is "NO", that is, when the learning flag is in "ON" state, the EOL production test is terminated.

Meanwhile, if the result of the determination at step S345 is "YES", that is, when the learning flag is in "OFF" state, it is determined whether or not the value of the pointer reaches the maximum value at step S440.

If the result of the determination at step S340 is "NO", that is, the value of the pointer has been reached at the maximum value, a main relay allowing flag which indicates whether or not an operation in which the main relay can be turn off is allowed is set to be in an "ON" state at step S445. Then, the EOL production test is terminated. Finally, the battery 40 which supplies electric power to the ECU 9 is switched off.

In contrast, if the result of the determination at step S440 is "YES", that is, the value of the pointer does not has been reached at the maximum value yet, the value of the pointer is incremented at step S450 and the procedure proceeds to step S455.

At step S445, the current fuel pressure in the common rail 5, the previous fuel pressure, the fuel pressure difference between the current value and the previous value of the fuel pressure, the differential value of the fuel pressure, the smeared fuel pressure difference between the smeared value of the fuel pressure and the previous value of the fuel pressure, the time when the valve opening command signal, the time when the valve closing command signal, the valve opening judging counter, and the valve closing judging counter are reset so as to be set to the initial values. Then, the EOL production test is terminated.

Figure 11:
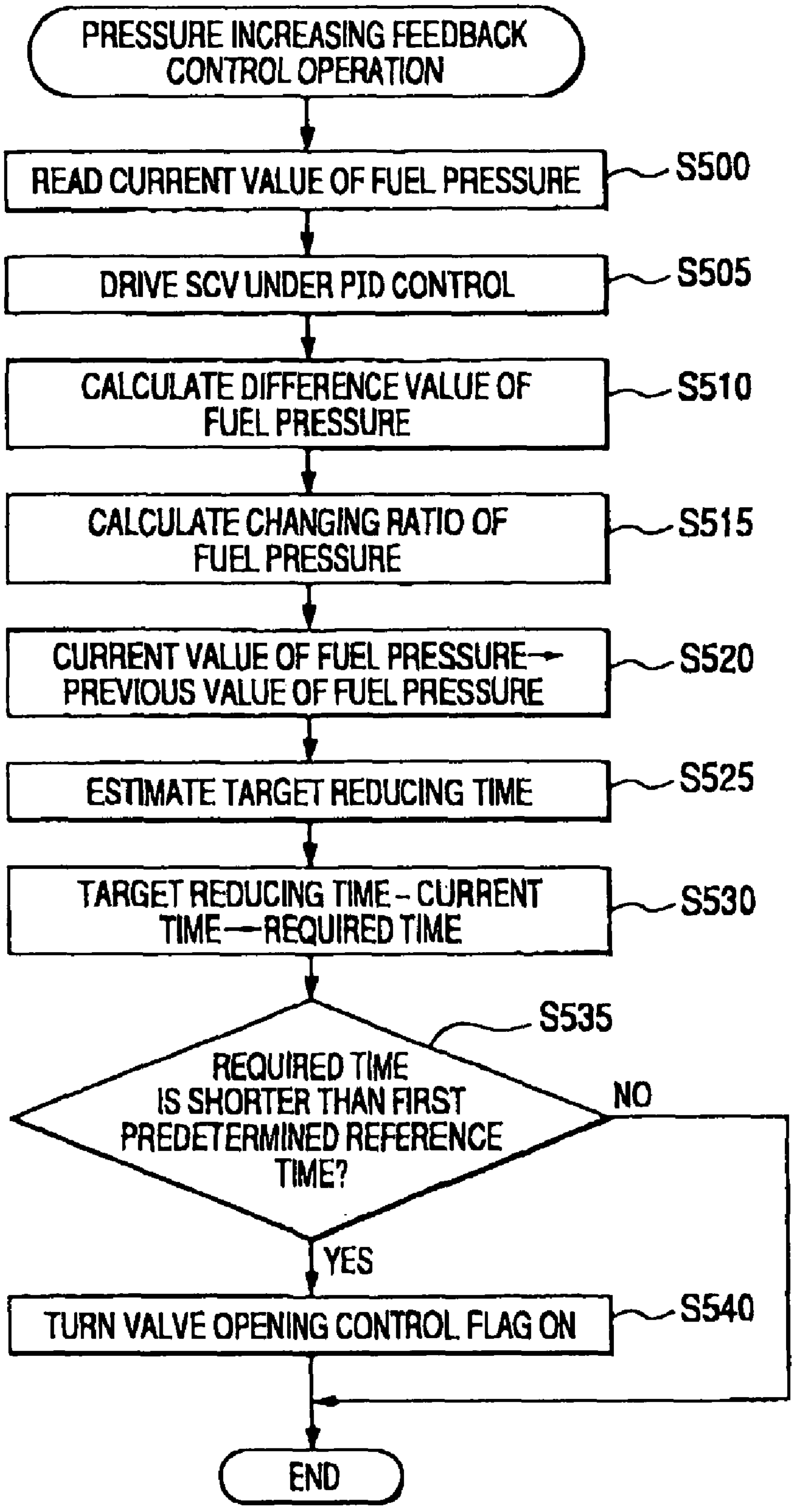
FIG. 11 is a flowchart showing a pressure increasing feedback control operation.
Figure 17:
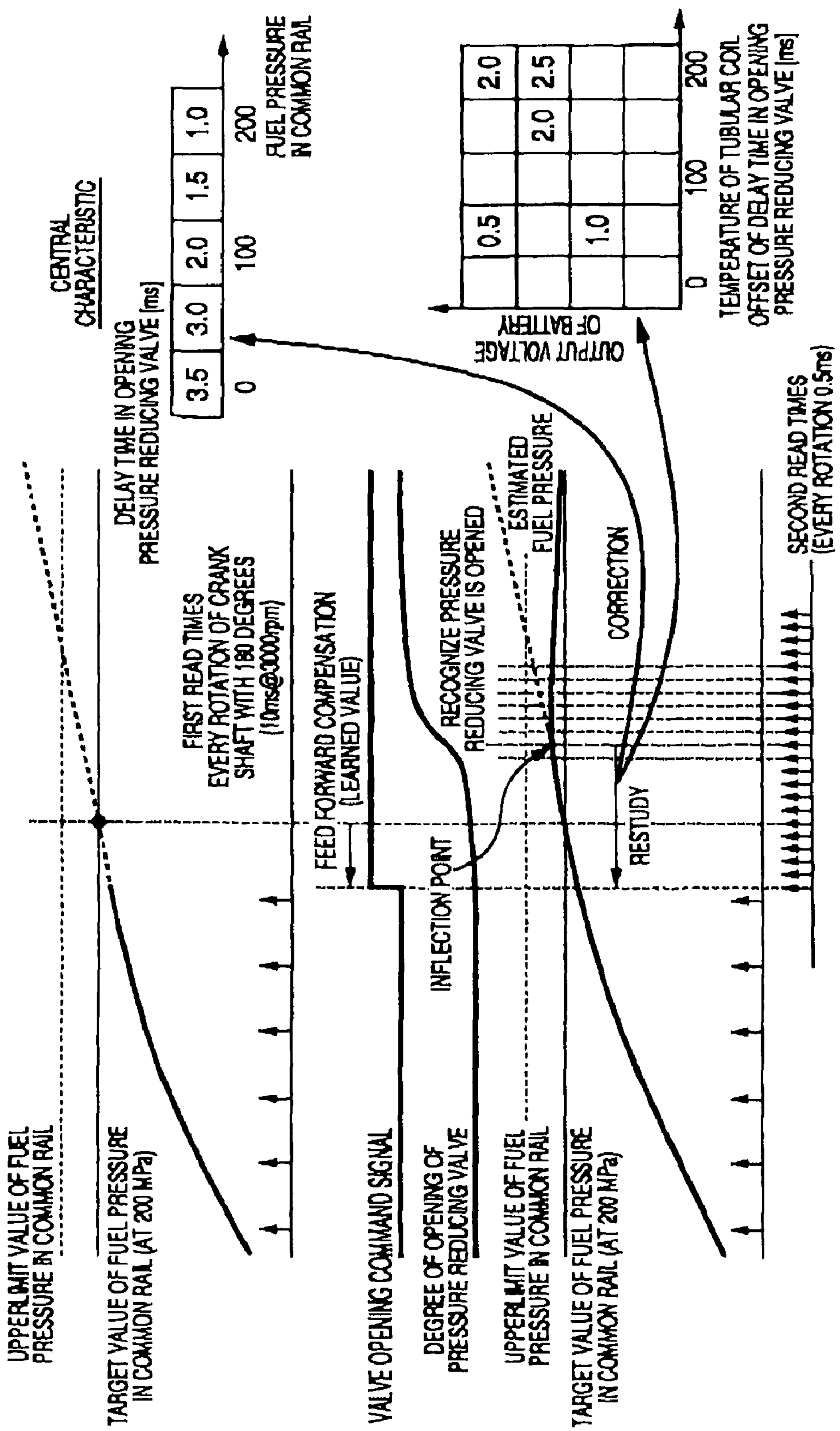
FIG. 17 is a graph showing changes over time of the fuel pressure in the common rail, the valve opening command signal, and a degree of opening of the pressure reducing valve when the fuel pressure in the common rail is increasing.

Next, FIG. 11 is a flowchart showing a pressure increasing feedback control operation. With a control operation shown in FIG. 11, the pressure reducing valve 7 is controlled such as shown in FIG. 17. Although a detailed explanation will be given later, FIG. 17 is a graph showing changes over time of the fuel pressure in the common rail 5, the valve opening command signal, and a degree of opening of the pressure reducing valve 7 when the fuel pressure in the common rail 5 is increasing.

The pressure increasing feedback control operation shown in FIG. 11 is started at every first read times.

Figure 14:
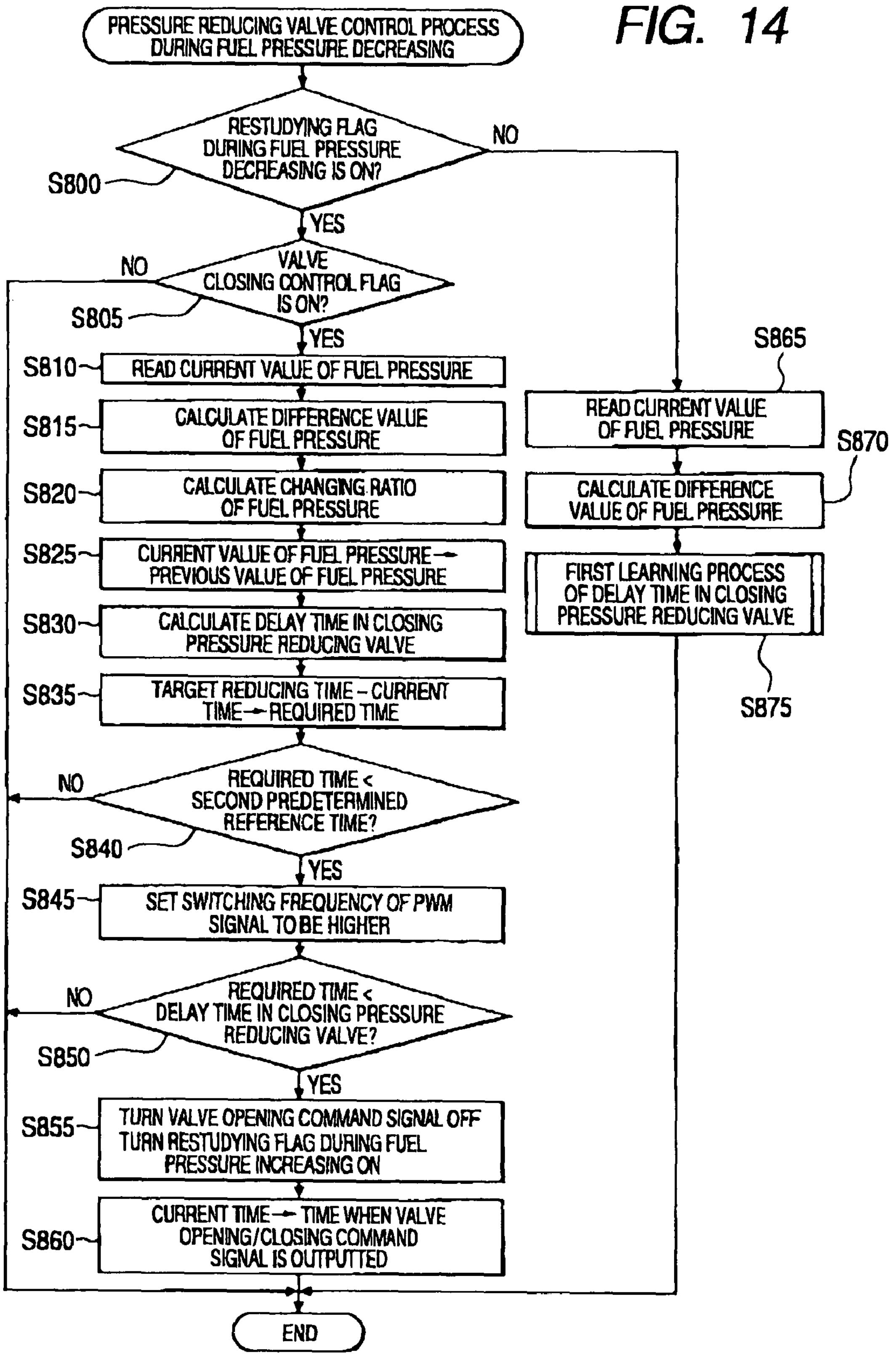
FIG. 14 is a flowchart showing a pressure reducing valve control process during the fuel pressure decreasing.

As shown in FIG. 14, the pressure increasing feedback control operation starts with step S500. At step S500, the ECU 9 reads a current fuel pressure in the common rail 5 by using the fuel pressure sensing means, and then the procedure proceeds to step S505.

At step S505, the ECU 9 calculates a difference between the current fuel pressure obtained at step S500 and a previous fuel pressure which has been obtained and stored and drives the SCV 4 by using a proportional-integral-derivative (PID) control algorithm.

The PID control algorithm is a control loop feedback algorithm and is used to correct an error between a measured process variable and a desired value. In the PID control algorithm, an output is constitutes of three terms: a proportional, an integral and a derivative terms. The proportional term makes a change to the output that is proportional to a current error value. The proportional response can be adjusted by multiplying the error by a constant called the proportional gain. The contribution to the output from integral term is proportional to both the magnitude of the error and the duration of the error. The integral term accelerates the movement of the process towards the desired value and eliminates the residual steady-state error since the integral term is responding to accumulated errors from the past. The derivative term is involved in multiplying a rate of change of the process error which is a slope of the error over time by a constant called a derivation gain. The deviation term slows the rate of change of the output. Thus, the derivation term can compensates the contribution from the integral term which sometimes causes the present value to overshoot the desired value. In most industrial application of the PID control algorithm, by tuning the three constants, i.e., the proportional gain, the integral gain, and the derivation gain the PID control algorithm can provide a suitable control action designed for specific process requirement.

At step S510, a difference between the current fuel pressure and the previous one is calculated.

Next at step S515, the difference between the current fuel pressure and the previous one is smeared by a smearing process so as to obtain a differential value of the fuel pressure.

If the previous value of the fuel pressure is empty, calculating the difference between the current fuel pressure and the previous one and the differential value of the fuel pressure are not performed.

Then at step S520, the current fuel pressure moves to the previous fuel pressure and the procedure proceeds to step S525.

At step S525. The ECU 9 estimates a target reducing time when the fuel pressure in the common rail 5 reaches a target value of the fuel pressure based on the differential value of the fuel pressure and the current fuel pressure. The process at step S525 is carried out by the target reducing time estimating means.

After the target reducing time is estimated at step S525, a required time by which it is necessary to take until the fuel pressure reaches the target value of the fuel pressure is obtained by subtracting the current time from the target reducing time at step S530.

Next, at step S535, it is determined whether or not the required time is shorter than the first predetermined reference time. The first reference time is set to be sufficiently long such that the delay in opening or closing the pressure reducing valve 7 can be compensated.

If the result of the determination at step S525 is "NO", that is, the required time is not shorter than a first predetermined reference time, the pressure increasing feedback control operation is terminated.

In contrast, if the result of the determination at step S525 is "YES", that is, the required time is actually shorter than the first predetermined reference time, the ECU 9 performs setting a valve opening control flag into an "ON" state which indicates that the pressure reducing valve 7 is under control by the ECU 9 for opening the valve member 1041 to discharge the fuel in the common rail 5 so as to reduce the fuel pressure in the common rail 5 at step S540. Then, the pressure increasing feedback control operation is terminated.

Figure 12:
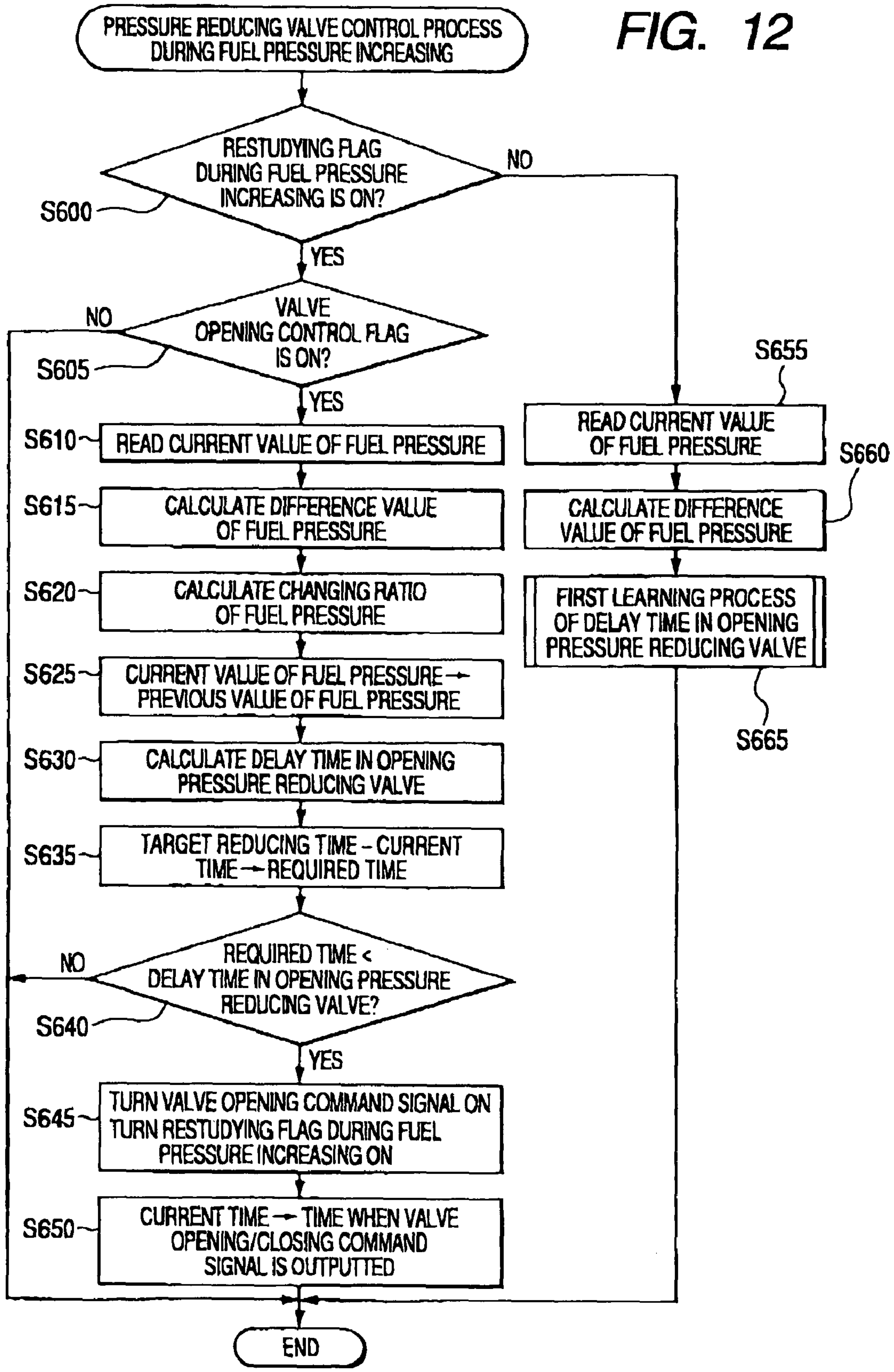
FIG. 12 is a flowchart showing a pressure reducing valve control process during the fuel pressure increasing.

FIG. 12 is a flowchart showing a pressure reducing valve control process during the fuel pressure increasing. With a control operation shown in FIG. 11, the pressure reducing valve 7 is controlled such as shown in FIG. 17. The pressure reducing valve control process during the fuel pressure increasing shown in FIG. 12 is started at every first read times.

As shown in FIG. 12, the pressure reducing valve control process during the fuel pressure increasing starts with step S600. At step S600, it is determined whether or not a restudying flag during the fuel pressure increasing is set in an "OFF" state. The restudying flag during the fuel pressure increasing indicates whether or not the ECU 91 is restudying the delay in opening the pressure reducing valve 7 in the situation where the fuel pressure in the common rail 5 is increasing.

If the result of the determination at step S600 is "YES", that is, when the restudying flag during the fuel pressure increasing is set in an "OFF" state, the procedure proceeds to step S605.

At step S605, it is determined whether or not the valve opening control flag mentioned at step 540 in FIG. 11 is set to be in an "ON" state.

If the result of the determination at step S605 is "NO", that is, when the valve opening control flag is set to be in an "OFF" state, the pressure reducing valve control process during the fuel pressure increasing is terminated.

In contrast, the result of the determination at step S605 is "YES", that is, when the valve opening control flag is set to be in an "ON" state, the ECU 91 reads the current fuel pressure in the common rail 5 at step S610 and the procedure proceeds to step S615.

At step S615, the ECU 9 calculates a difference between the current fuel pressure obtained at step S605 and a previous fuel pressure which has been obtained and stored. Then, the procedure proceeds to step S620.

Next, the difference between the current fuel pressure and the previous one is smeared by the smearing process so as to obtain a differential value of the fuel pressure at step S620.

Then, the current fuel pressure moves to the previous fuel pressure at step S625.

At step S630, the delay time for opening the pressure reducing valve 7 is calculated based on the central characteristic map for opening the pressure reducing valve 7 and the offset map for opening the pressure reducing valve 7.

After this at step S635, the required time by which it is necessary to take until the fuel pressure reaches the target value of the fuel pressure is obtained by subtracting the current time from the target reducing time at step S530.

Next, at step S640, it is determined whether or not the required time is shorter than the delay in opening the pressure reducing valve 7.

If the result of the determination at step S640 is "NO", that is, the required time is not shorter than the delay in opening the pressure reducing valve 7, the pressure reducing valve control process during the fuel pressure increasing is terminated.

If the result of the determination at step S640 is "YES", that is, the required time is shorter than the delay in opening the pressure reducing valve 7, the ECU 9 turns the valve opening commanding signal into the "ON" state and set the restudying flag during the fuel pressure increasing to be in the "ON" state at step S645.

Then, the ECU 9 moves the current time into the time when the valve closing command signal at step S650.

Finally, the pressure reducing valve control process during the fuel pressure increasing is terminated.

Meanwhile, if the result of the determination at step S600 is "NO", that is, when the restudying flag during the fuel pressure increasing is set in an "ON" state, the ECU 91 reads the current fuel pressure in the common rail 5 at step S655 and calculates the difference between the value of current fuel pressure and the value of the previous fuel pressure in the common rail 5 at step S660. Then, the first learning processing of the delay in opening the pressure reducing valve 7 is carried out at step S665 and the pressure reducing valve control process during the fuel pressure increasing is terminated.

In the first learning processing of the delay in opening the pressure reducing valve 7 carried out at step S655, if a learning of the delay in opening the pressure reducing valve 7 is finished, the ECU 9 sets both the restudying flag during the fuel pressure increasing the valve opening control flag to be in the "OFF" state.

Figure 13:
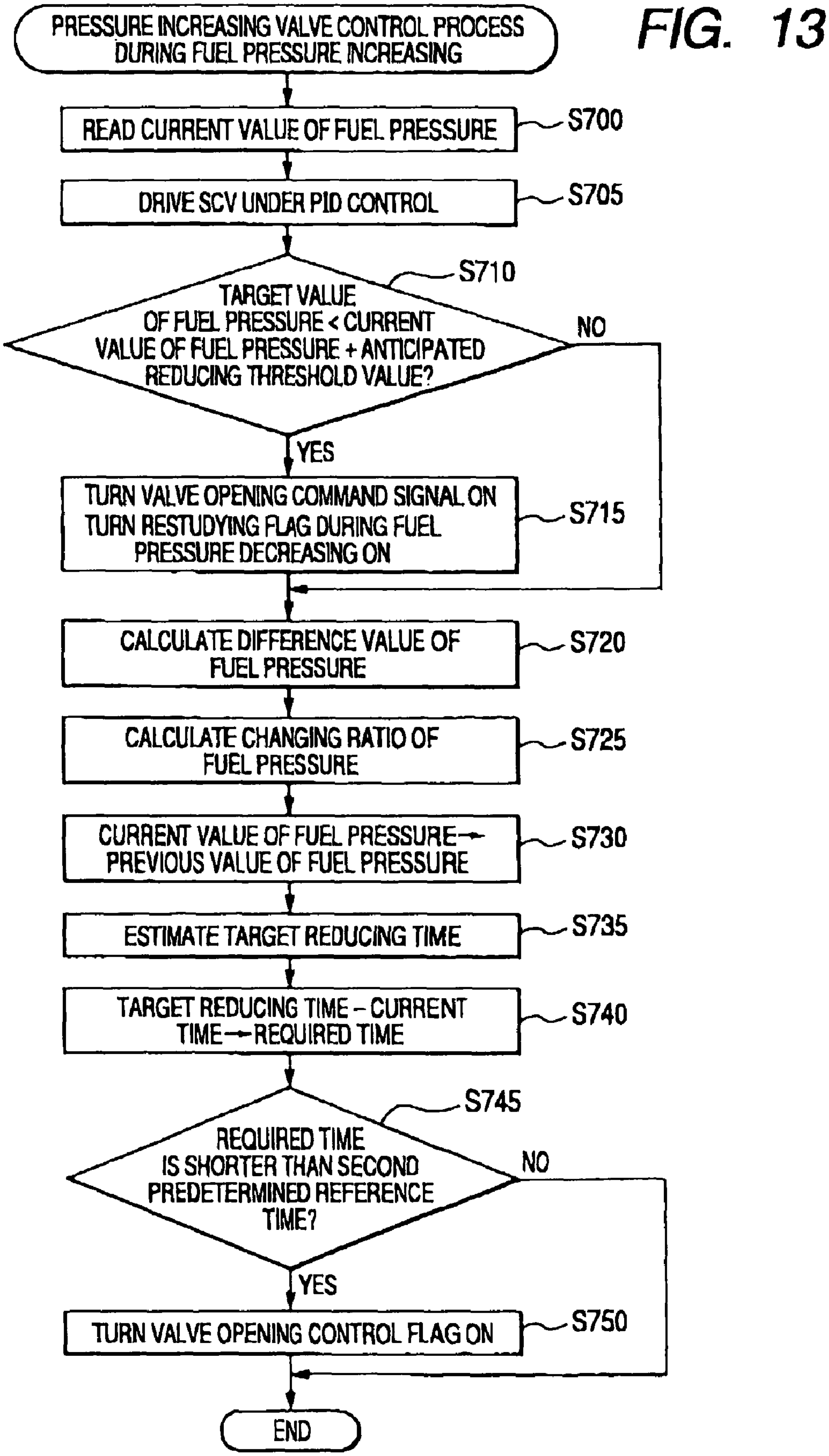
FIG. 13 is a flowchart showing a pressure decreasing feedback control operation.
Figure 18:
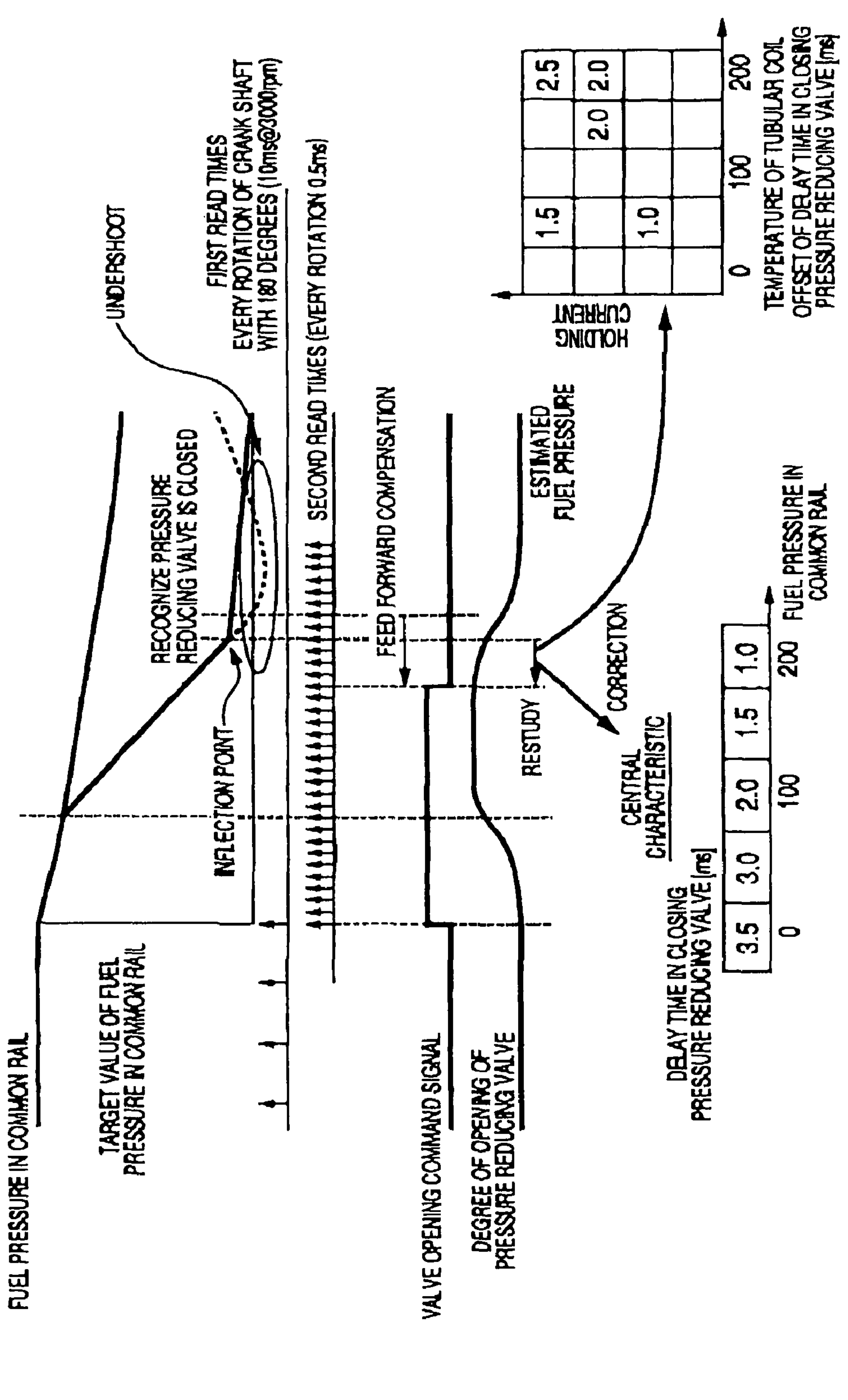
FIG. 18 is a graph showing changes over time of the fuel pressure in the common rail, the valve opening command signal, and a degree of opening of the pressure reducing valve when the fuel pressure in the common rail is decreasing.

FIG. 13 is a flowchart showing a pressure decreasing feedback control operation. With a control operation shown in FIG. 13, the pressure reducing valve 7 is controlled such as shown in FIG. 18. Although a detailed explanation will be given later, FIG. 18 is a graph showing changes over time of the fuel pressure in the common rail 5, the valve opening command signal, and a degree of opening of the pressure reducing valve 7 when the fuel pressure in the common rail 5 is decreasing.

The pressure decreasing feedback control operation shown in FIG. 13 is started at every first read times. The first read times have been defined such that the ECU 9 obtains a fuel pressure in the common rail 5 at every rotation of the crank shaft of the internal combustion engine 20 with a predetermined angle, 180 degrees in this embodiment while the internal combustion engine 20 is running.

As shown in FIG. 13, the pressure decreasing feedback control operation starts with step 8700. At step S700, the ECU 9 reads a current fuel pressure in the common rail 5 by using the fuel pressure sensing means, and then the procedure proceeds to step S705.

At step S705, the ECU 9 calculates a difference between the current fuel pressure obtained at step S700 and a previous fuel pressure which has been obtained and stored and drives the SCV 4 by using a proportional-integral-derivative (PID) control algorithm. The procedure proceeds to step S710.

Then, at step S710, it is determined whether or not a target value of the fuel pressure is smaller than the sum of the current value of the fuel pressure and an anticipated arrival threshold value.

The anticipated arrival threshold value is used to judge whether or not the current value of the fuel pressure is close to the target value of the fuel pressure.

If the result of the determination at step S710 is "NO", that is, when the target value of the fuel pressure is equal to or larger than the sum of the current value of the fuel pressure and an anticipated arrival threshold value, the procedure directly proceeds to step S720.

In contrast, the result of the determination at step S710 is "YES", that is, when the target value of the fuel pressure is smaller than the sum of the current value of the fuel pressure and an anticipated arrival threshold value, the ECU 9 sets the valve opening command signal to be in the "ON" state, i.e., the ECU 9 starts sending the valve opening command signal, and sets the restudying flag during the fuel pressure increasing to be in the "ON" state, which indicates that the ECU 91 is restudying the delay in opening the pressure reducing valve 7 in the situation where the fuel pressure in the common rail 5 is increasing. These setting operations are preformed at step S715.

At step S720, a difference between the current fuel pressure and the previous one is calculated.

Next at step S725, the difference between the current fuel pressure and the previous one is smeared by the smearing process so as to obtain a differential value of the fuel pressure. As stated above, the smearing process on the current value of the fuel pressure is performed to obtain the smeared value of the fuel pressure. In the smearing process, the current value of the fuel pressure is corrected so as to ensure that the change in the fuel pressure is continuous and smooth over time.

If the previous value of the fuel pressure is empty, calculating the difference between the current fuel pressure and the previous one and the differential value of the fuel pressure are not performed.

Then at step S730, the current fuel pressure moves to the previous fuel pressure and the procedure proceeds to step S735.

At step S735, The ECU 9 estimates a target reducing time when the fuel pressure in the common rail 5 reaches a target value of the fuel pressure based on the differential value of the fuel pressure and the current fuel pressure by using the target reducing time estimating means.

After the target reducing time is estimated at step S735, a required time by which it is necessary to take until the fuel pressure reaches the target value of the fuel pressure is obtained by subtracting the current time from the target reducing time at step S740.

Next, at step S745, it is determined whether or not the required time is shorter than the second predetermined reference time. The second reference time is set to be sufficiently long such that the delay in closing the pressure reducing valve 7 can be compensated.

If the result of the determination at step S745 is "NO", that is, the required time is not shorter than the second predetermined reference time, the procedure is terminated.

In contrast, if the result of the determination at step S745 is "YES", that is, the required time is actually shorter than the second predetermined reference time, the ECU 9 performs at step S750 setting a valve opening control flag into an "ON" state which indicates that the pressure reducing valve 7 is under control by the ECU 9 for closing the valve member 1041 to discharge the fuel in the common rail 5 so as to reduce the fuel pressure in the common rail 5 at step S540. Then, the procedure is terminated.

FIG. 14 is a flowchart showing a pressure reducing valve control process during the fuel pressure decreasing. With a control operation shown in FIG. 14, the pressure reducing valve 7 is controlled such as shown in FIGS. 18 and 19B. The pressure reducing valve control process during the fuel pressure increasing shown in FIG. 14 is started at every second read times.

As shown in FIG. 14, the pressure reducing valve control process during the fuel pressure increasing starts with step S800. At step S800, it is determined whether or not a restudying flag during the fuel pressure decreasing is set in an "OFF" state. The restudying flag during the fuel pressure decreasing indicates whether or not the ECU 91 is restudying the delay in opening the pressure reducing valve 7 in the situation where the fuel pressure in the common rail 5 is decreasing.

If the result of the determination at step S800 is "YES", that is, when the restudying flag during the fuel pressure decreasing is set in an "OFF" state, the procedure proceeds to step S805.

At step S805, it is determined whether or not the valve opening control flag mentioned at step 540 in FIG. 11 is set to be in an "ON" state.

If the result of the determination at step S805 is "NO", that is, when the valve opening control flag is set to be in an "OFF" state, the pressure reducing valve control process during the fuel pressure decreasing is terminated.

In contrast, the result of the determination at step S805 is "YES", that is, when the valve opening control flag is set to be in an "ON" state, the ECU 91 reads the current fuel pressure in the common rail 5 at step S810 and the procedure proceeds to step S815.

At step S815, the ECU 9 calculates a difference between the current fuel pressure obtained at step S805 and a previous fuel pressure which has been obtained and stored. Then, the procedure proceeds to step S820.

Next, the difference between the current fuel pressure and the previous one is smeared by the smearing process so as to obtain a differential value of the fuel pressure at step S820. The smearing process on the current value of the fuel pressure is performed to obtain the smeared value of the fuel pressure and the smeared value of the fuel pressure is used to calculate a smeared differential value of the fuel pressure as a differential value of the fuel pressure at step S820.

Then, the current fuel pressure moves to the previous fuel pressure at step S825.

At step S830, the delay time for opening the pressure reducing valve 7 is calculated based on the central characteristic map for opening the pressure reducing valve 7 and the offset map for opening the pressure reducing valve 7.

After this, the required time by which it is necessary to take until the fuel pressure reaches the target value of the fuel pressure is obtained by subtracting the current time from the target reducing time at step S835.

Then, it is determined whether or not the required time obtained at step S835 is shorter than the sum of the delay time for opening the pressure reducing valve 7 calculated at step S830 and a high frequency control period at step 840.

The high frequency control period is defined as follows.

Figure 19A:
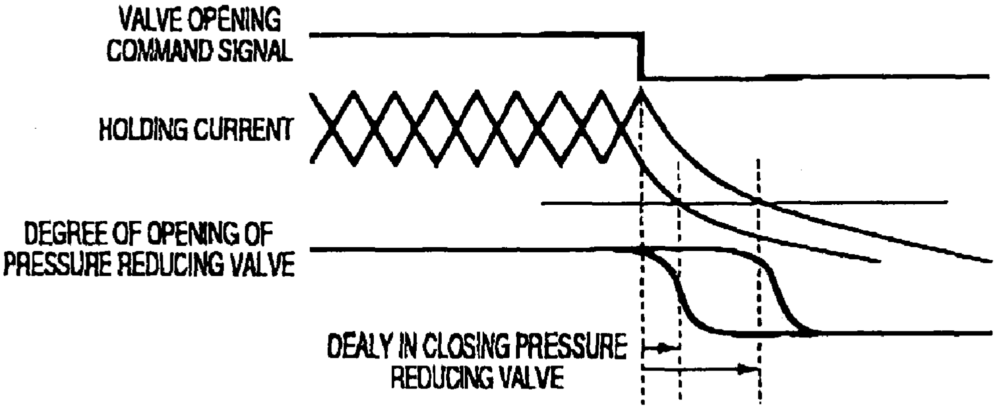
FIG. 19A is a graph showing that, when a switching frequency of the PWM signal is low, a ripple of the holding current following through the tubular coil of the pressure reducing valve, that is, an other component of the holding current following through the tubular coil from a direct current (DC) component of the holding current following therethrough, is increased.
Figure 19B:
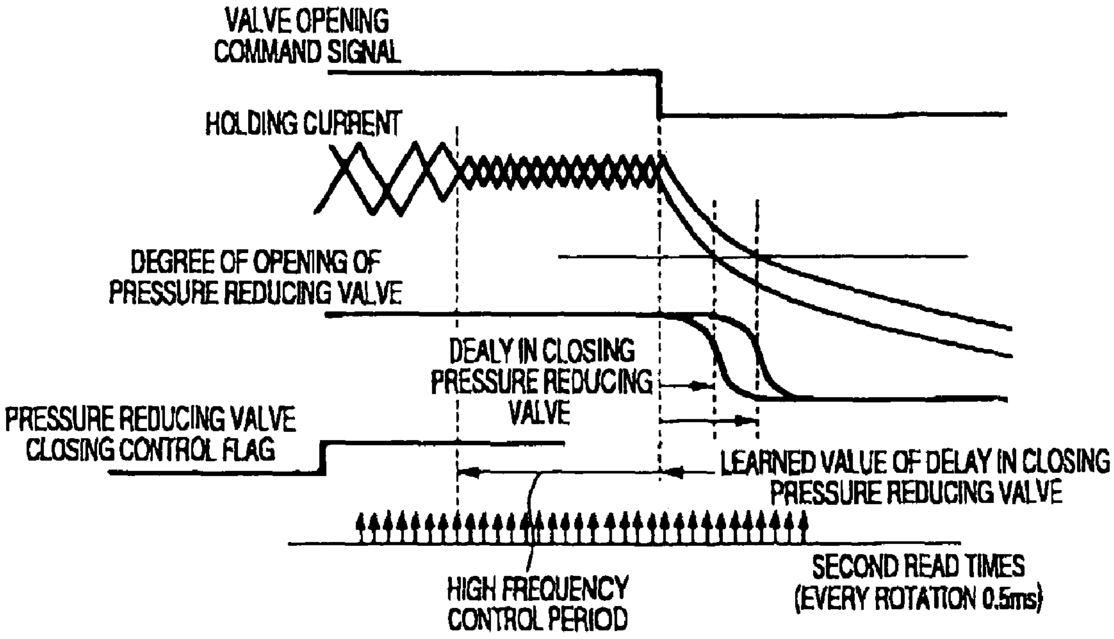
FIG. 19B is a graph showing that the ECU operates such that before the valve opening command stops sending, i.e., before the valve opening command is turned into an "OFF" state, a higher switching frequency of the PWM signal is set for a predetermined period in order to reduce the error in the delay in opening the pressure reducing valve.

As shown in FIG. 19A, when a switching frequency of the PWM signal is low, a ripple of the holding current following through the tubular coil 1021 of the pressure reducing valve 7, that is, an other component of the holding current following through the tubular coil 1021 from a direct current (DC) component of the holding current following therethrough, is increased. Hence, a large error is caused in timings at which the holding current flowing through the tubular coil 1021 starts decreasing according as a further timing at which the valve opening command from the ECU 9 is outputted. The large error in the timings at which the holding current flowing through the tubular coil 1021 starts decreasing leads to a further large error in the delay in opening the pressure reducing valve 7.

Therefore, as shown in FIG. 19B, the ECU 9 operates such that before the valve opening command stops sending, i.e., before the valve opening command is turned into an "OFF" state, a higher switching frequency of the PWM signal is set for a predetermined period. As a result of this control, it becomes to be possible that the error in the delay in opening the pressure reducing valve 7 is reduced. The predetermined period over which the PWM signal has the higher switching frequency is called "the high frequency control period".

FIG. 19A shows a time chart showing changes over time of the valve opening command signal, the holding current flowing through the tubular coil 1021, and the degree of opening the pressure reducing valve 7 without taking account of the high frequency control period.

FIG. 19B shows a time chart showing changes over time of the valve opening command signal, the holding current flowing through the tubular coil 1021, and the degree of opening the pressure reducing valve 7 with taking account of the high frequency control period.

Returning to FIG. 14, if the result of the determination at step S840 is "NO", that is, when the required time obtained at step S835 is not shorter than the sum of the delay time for opening the pressure reducing valve 7 calculated at step S830 and a high frequency control period, the procedure is terminated.

If the result of the determination at step S840 is "YES", that is, when the required time obtained at step S835 is shorter than the sum of the delay time for opening the pressure reducing valve 7 calculated at step S830 and a high frequency control period, the frequency of the PWM signal set to be a higher one at step S845.

Next, at step S850, it is determined whether or not the required time is shorter than the delay in opening the pressure reducing valve 7.

If the result of the determination at step S850 is "NO", that is, the required time is not shorter than the delay in opening the pressure reducing valve 7, the procedure is terminated.

If the result of the determination at step S850 is "YES", that is, the required time is shorter than the delay in opening the pressure reducing valve 7, the ECU 9 turns the valve opening commanding signal into the "ON" state and set the restudying flag during the fuel pressure increasing to be in the "ON" state at step S855.

Then, the ECU 9 moves the current time into the time when the valve closing command signal at step S860.

Finally, the procedure is terminated.

Meanwhile, if the result of the determination at step S800 is "NO", that is, when the restudying flag during the fuel pressure increasing is set in an "ON" state, the ECU 91 reads the current fuel pressure in the common rail 5 at step S865 and calculates the difference between the value of current fuel pressure and the value of the previous fuel pressure in the common rail 5 at step S870. Then, the first learning processing of the delay in opening the pressure educing valve 7 is carried out at step S875 and the pressure reducing valve control process during the fuel pressure increasing is terminated.

In the first learning processing of the delay in opening the pressure reducing valve 7 carried out at step S875, if a learning of the delay in opening the pressure reducing valve 7 is finished, the ECU 9 sets both the restudying flag during the fuel pressure increasing the valve opening control flag to be in the "OFF" state.

The operations of the control apparatus for the pressure reducing valve 1 will now be explained with reference to FIG. 15 to 18.

FIG. 15 is a graph showing changes over time of the ignition signal, the fuel pressure in the common rail 5, the valve opening command signal, and a degree of opening of the pressure reducing valve 7 when the internal combustion engine 20 is stopped.

As shown in FIG. 15, when the internal combustion engine 20 is running, that is when the ignition signal is in the “ON” state, the control unit 91 of ECU 9 obtains a fuel pressure in the common rail 5 at every rotation of the crank shaft of the internal combustion engine 20 with a predetermined angle (at every first read times). The predetermined angle is 180 degrees in this embodiment. Based on the obtained fuel pressure, a differential value of the fuel pressure in the common rail 5 is calculated.

Then, if the internal combustion engine 20 is stopped at a time, that is, if the ignition signal is set to be in the “OFF” state, the control unit 91 of the ECU 9 obtains a fuel pressure in the common rail 5 at every second read times. An interval between the second read times is shorter than that between the first read times. In other words, a rotation angle of the crank shaft of the internal combustion engine 20 which defines the second read time is smaller than that defines the first read time. Concretely in this embodiment, the interval of the first read times is 10 milliseconds, although the interval of the second read times is 0.5 milliseconds.

Similar to the case where the internal combustion engine 20 is running, after the fuel pressures in the common rail 5 is obtained at every second read times, the differential value of the fuel pressure is calculated.

In this case shown in FIG. 15, the fuel pressure in the common rail 5 is gradually decreasing.

If the fuel pressure in the common rail 5 reaches a learning threshold value of the fuel pressure below which the ECU 91 carries out a learning of the delay in opening or closing the pressure reducing valve 7, the control unit 91 of the ECU 9 outputs the valve opening command signal, i.e., the valve opening command signal is turned to be in the “ON” state. If the valve opening command signal is received by the pressure reducing valve 7, the pressure reducing valve 7 starts opening. After this, the ECU 9 detect the inflection point of the fuel pressure curve which represents the time-dependent values of the fuel pressure in the common rail 5, at which the change rate of the fuel pressure in the common rail 5 is suddenly changed.

The valve opening command signal is used to define a duty ratio of the PWM signal. That is, if the valve opening command signal is in the “ON” state, the duty ratio of the PWM signal outputted from the ECU 9 to the pressure reducing valve 7 is set to a predetermined value. In contrast, if the valve opening command signal is in the “OFF” state, the duty ratio of the PWM signal is set to 0%.

If the control unit 91 detects an inflection point of the fuel pressure curve, a delay in opening the pressure reducing valve 7 is determined based on a period from a time when the control unit 91 outputs the valve opening command signal to a further time when the control unit 91 detects the inflection point of the fuel pressure curve.

After this, the control unit 91 sets the valve opening command signal to be in the “OFF” state so as to start closing the pressure reducing valve 7 and detecting a inflection point of the fuel pressure curve in the case where the pressure reducing valve 7 is closed.

If the control unit 91 detects the inflection point of the fuel pressure curve, a delay in closing the pressure reducing valve 7 is determined based on a period from a time when the control unit 91 stops sending the valve opening command signal to a further time when the control unit 91 detects the inflection point of the fuel pressure curve.

FIG. 16 is a graph showing operations of the control, unit 91 of the ECU 9 at an EOL production test, that is, changes over time of the ignition signal, the fuel pressure in the common rail 5, the valve opening command signal, and a degree of opening of the pressure reducing valve 7 at an EOL production test.

As shown in FIG. 16, if the ignition signal becomes to be in the “OFF” state, the control unit 91 causes the fuel pressure in the common rail 5 to increase until the value of the fuel pressure reaches at the upper limit value of the fuel pressure by driving the suction control valve (SCV) 4. In this embodiment, the upper limit value of the fuel pressure is 200 mega Pascal (MPa).

Further, accompanying with this, the control unit 91 obtains the fuel pressure in the common rail 5 at every second read times and calculates the change rate of the fuel pressure based on the obtained fuel pressure. While the control unit performs above operations, the fuel pressure in the common rail 5 is continuously reducing.

When the fuel pressure reaches at the first learning value, the control unit 91 set the valve opening command signal to be in the “ON” state so as to start opening the pressure reducing valve 7 and detecting a inflection point of the fuel pressure curve in the case where the pressure reducing valve 7 is opened.

If the control unit 91 detects the inflection point of the fuel pressure curve, a delay in opening the pressure reducing valve 7 is determined based on a period from a time when the control unit 91 stops sending the valve opening command signal to a further time when the control unit 91 detects the inflection point of the fuel pressure curve.

Next, the control unit 91 sets the valve opening command signal to be in the “OFF” state so as to start closing the pressure reducing valve 7 and detecting a inflection point of the fuel pressure curve in the case where the pressure reducing valve 7 is closed.

If the control unit 91 detects the inflection point of the fuel pressure curve, a delay in closing the pressure reducing valve 7 is determined based on a period from a time when the control unit 91 stops sending the valve opening command signal to a further time when the control unit 91 detects the inflection point of the fuel pressure curve.

The above mentioned procedures performed by the control unit 91, that is, a routines comprising steps of opening or closing the pressure reducing valve 7, the detecting the inflection point of the fuel pressure curve, and determining the delay in opening the pressure reducing valve 7, are repeatedly carried out when the fuel pressure reaches at a second learning value of the fuel pressure in the common rail, a third learning value and the like, then delays in opening and closing the pressure reducing valve 7 at the second learning value of the fuel pressure in the common rail, the third learning value and the like, are determined.

FIG. 17 is a graph showing changes over time of the fuel pressure in the common rail 5, the valve opening command signal, and a degree of opening of the pressure reducing valve 7 when the fuel pressure in the common rail 5 is increasing.

As shown in FIG. 17, when the fuel pressure in the common rail 5 is increasing, the control unit 91 sets the target value of the fuel pressure to the upper limit value of the fuel pressure. The control unit 91 reads a current value of the fuel pressure and calculates a different value of the fuel pressure. Further, the control unit 91 estimates an upper limit arrival time based on the current value of the fuel pressure and the different value of the fuel pressure. The upper limit arrival time is defined as a time when the fuel pressure reaches at the upper limit value of the fuel pressure.

Further, if a time which is the delay time for opening the pressure reducing valve 7 before the upper limit arrival time is come, the control unit 91 sets the valve opening command signal to be in the "ON" state so as to starts opening the pressure reducing valve 7 in order to compensate the delay in opening the pressure reducing valve 7. The feed-forward compensation is applied to the compensation method.

Further, accompanying this, the control unit 91 restudies the delay in opening pressure reducing valve 7 and updates the central characteristic map for opening the pressure reducing valve 7 and the offset map for opening the pressure reducing valve 7.

FIG. 18 is a graph showing changes over time of the fuel pressure in the common rail 5, the valve opening command signal, and a degree of opening of the pressure reducing valve 7 when the fuel pressure in the common rail 5 is decreasing.

As shown in FIG. 18, the control unit 91 sets the valve opening command signal to be in the "ON" state so as to open the pressure reducing valve 7. The control unit 91 obtains a current value of the fuel pressure and calculates a different value of the fuel pressure. Then, the control unit 91 estimates a target reducing time when the fuel pressure in the common rail 5 reaches at the predetermined target value of the fuel pressure based on the obtained value of the fuel pressure and the changing ratios of the fuel pressure while the fuel pressure in the common rail 5 is decreasing.

Further if a time which is the delay time for closing the pressure reducing valve 7 before the upper limit arrival time comes, the control unit 91 sets the valve opening command signal to be in the "OFF" state so as to start closing the pressure reducing valve 7 in order to compensate the delay in closing the pressure reducing valve 7. The feed-forward compensation is applied to the compensation method.

Further, accompanying with this, the control unit 91 restudies the delay in closing pressure reducing valve 7 and updates the central characteristic map for closing the pressure reducing valve 7 and the offset map for closing the pressure reducing valve 7.

Therefore, it is possible reliably to open the pressure reducing valve 7 before the target reducing time since the control unit 91 starts opening the pressure reducing valve 7 the delay time for opening pressure reducing valve 7 before the target reducing time.

The control unit 91 has a potential for avoiding an overshoot phenomenon in which an actual pressure of fuel accumulated in the common rail 5 overshoots a target value of fuel pressure while the fuel pressure in the common rail is increasing. Therefore, it is possible to prevent the common rail 7 from breaking due to exceeding the pressure limit of the common rail 7.

Further, the control unit 91 has a potential for preventing from occurring a undershoot phenomenon in which an actual fuel pressure in the common rail 7 undershoots a target value of the fuel pressure while the fuel pressure in the common rail is decreasing. Therefore, it is possible to prevent an engine-stool phenomenon from occurring while the fuel pressure is decreasing by using the pressure reducing valve provided with the common rail 7.

Further, the control unit 91 carries out an updating procedure of the central characteristic map for opening the pressure reducing valve 7 and the offset map for opening or closing the pressure reducing valve 7 every time the pressure reducing valve 7 is opened or closed, respectively. Therefore, it is possible to prevent the common rail 7 from breaking due to exceeding the pressure limit of the common rail 7 or to prevent an engine-stool phenomenon from occurring while the fuel pressure is decreasing by using the pressure reducing valve provided with the common rail 7.

Further, in the EOC production test, the control unit 91 measures-several delays in opening and closing the pressure reducing valve 7, each delay corresponding a given fuel pressure in the common rail 5. Therefore, it is possible to obtain the delay time for opening or closing the pressure reducing valve 7 accurately since external disturbances on the measurement such as an engine noise are removed and fluctuations of the fuel pressure are suppressed.

Further, since the control unit 91 captures the fact that the pressure reducing valve 7 is opened or closed based on the fuel pressure and the change rate of the fuel pressure in the common rail 5, that is, it is not necessary the extra devices for detecting the opening or closing the pressure reducing valve 7, it is possible to construct the common rail type fuel injection system economically.

Further, when the control unit 92 detects the inflection point of the fuel pressure curve, the control unit 91 reads the fuel pressure in the common rail 7 with a shorter interval. Thus, if the pressure reducing valve 7 is opened or closed, the fact thereof can be detected by the control unit 91 accurately. Therefore, it is possible to accurately determine the delay in opening or closing the pressure reducing valve.

Further, before the control unit 91 sets the valve opening command signal to be in the "OFF" state, the switching frequency of the PWM signal is increased over the high frequency control period. Thus, it is possible to determine the delay in closing the pressure reducing valve 7 accurately, so that the large fluctuations of the delay time for closing the pressure reducing valve 7 can be suppressed.

Further, the control unit 91 and the transistor 94 construct the control apparatus for the pressure reducing valve according to the present invention.

Further, the step S110 and S150 in the first learning processing of the delay in opening the pressure reducing valve 7 shown in FIG. 8 correspond to the fuel pressure sensing means. The step S525 in the pressure increasing feedback control operation, in the condition that the fuel pressure in the common rail 5 is increasing as shown in FIG. 11 and the step S735 in the pressure decreasing feedback control operation, in the condition that the fuel pressure in the common rail 5 is decreasing shown in FIG. 13 corresponds to the target reducing time estimating means.

Further, the step S830 in the pressure reducing valve control process during the fuel pressure increasing shown in FIG. 14 corresponds to the delay time estimating means. The step S835 in the pressure reducing valve control process during the fuel pressure increasing shown in FIG. 14 corresponds to the required time estimating means.

Further, the steps S640 and S645 in the pressure reducing valve control process during the fuel pressure decreasing shown in FIG. 12 correspond to the valve opening command sensing means according to the present invention, and the steps S850 and S855 in the pressure reducing valve control process during the fuel pressure increasing shown in FIG. 14 correspond to the valve closing command sensing means according to the present invention.

Further, the steps S160, S165 and S170 in the first learning processing of a delay in opening the pressure reducing valve 7 correspond to the delay time measurement means according to the present invention. I more specific, the steps S160 and S165 determines the delay time measurement means in opening the pressure reducing valve 7 and the steps S160 and S170 determine the delay time measurement means in closing the pressure reducing valve 7.

The step S230 in the first learning processing of the delay in opening the pressure reducing valve 7 shown in FIG. 8 corresponds to the first reference table updating means and the step S330 in the first learning processing of the delay in closing the pressure reducing valve 7 corresponds to the second reference table updating means.

Further, in this embodiment the steps S105 and S140 in the first learning processing of a delay in opening the pressure reducing valve 7 and step S235 in the first learning processing of the delay in opening the pressure reducing valve 7 is carried out by using the first learning commanding means and the pressure intensifying means. The step S420 in the EOL learning procedure shown in FIG. 10 corresponds to the pressure intensifying means.

Further, the step S200 in the first learning processing of the delay in opening the pressure reducing valve 7 shown in FIG. 8 corresponds to the valve opening detecting means. The step S300 in the first learning processing of the delay in closing the pressure reducing valve 7 corresponds to the valve closing detecting means.

The present invention should not be limited to the disclosed embodiment, but may be implemented in many other ways without departing from the spirit of the invention.

For example, the control apparatus for the pressure reducing valve according to the present invention is applicable not only to the common rail type fuel injection system for diesel engines, but also other accumulator type fuel injection system.

For example, in the disclosed embodiment, the control unit 91 detects the evidence of opening or closing of the pressure reducing valve 7 based on the inflection point of the fuel pressure curve. However, it is applicable that the control unit 91 detects the evidence of opening or closing of the pressure reducing valve 7 based on a difference between a prediction value of the fuel pressure estimated from the historical data of the fuel pressure in the common rail 5 and the current value of the fuel pressure.

Further, in the disclosed embodiment, the offset values of the delay in opening and closing the pressure reducing valve 7 are estimated based on the output voltage of the battery 40 and the temperature of the tubular coil 1021 of the pressure reducing valve 7. However, it is applicable that the offset values of the delay in opening and closing the pressure reducing valve 7 are influenced by the other engine conditions than the output voltage of the battery 40 and the temperature of the tubular coil 1021 of the pressure reducing valve 7, such as the crank speed, the cam phase, the air temperature, the coolant water temperature, the boost pressure, the air mass and like.

What is claimed is:

1. A control apparatus for a pressure reducing valve provided with a fuel accumulating device of a fuel injection system mounted on a vehicle for injecting the fuel into an internal combustion engine installed in the vehicle and is actuated in order to discharge a fuel accumulated in the fuel accumulating device in response to a command signal with a delay time being defined as an interval between a time when the command signal is outputted from a control unit of the fuel injection system and a further time when the pressure reducing valve starts to move for adjusting a degree of opening thereof, the control apparatus comprising:

engine condition detecting means for detecting either an operating state or an operating condition of the internal combustion engine, either the operating state or the operating condition at least including fuel pressure in the fuel accumulating device sequentially;

target reducing time estimating means for estimating a target reducing time when the fuel pressure in the fuel accumulating device reaches at a predetermined target value of the fuel pressure in the fuel accumulating device;

delay time estimating means for estimating the delay time in accordance with either the operating state or the operating conditions of the internal combustion engine detected by the engine condition detecting means;

a time distance estimating means for estimating a time distance which needs until the fuel pressure in the fuel accumulating device reaches the target value; and a valve control command outputting means for outputting the command signal to the pressure reducing valve to adjust the degree of opening of the pressure reducing valve when the time distance estimated by the time distance estimating means becomes to be shorter than the delay time estimated by the delay time estimating means such that the pressure reducing valve starts to change the degree of opening thereof when the fuel pressure in the fuel accumulating device arrives at the target value.

2. The control apparatus for the pressure reducing valve according to claim 1, further comprising a calculator configured to calculate a changing ratio of the fuel pressure in the common rail based on the fuel pressure in the common rail detected by the engine condition detecting means, wherein the target reducing value means is configured to estimate the target reducing time by using a changing ratio of the fuel pressure in the common rail calculated by the calculator.

3. The control apparatus for the pressure reducing valve according to claim 1, wherein the delay time estimating means is configured to estimate the delay time for opening the pressure reducing valve.

4. The control apparatus for the pressure reducing valve according to claim 1, wherein the delay time estimating is configured to estimate the delay time for closing the pressure reducing valve.

5. The control apparatus for the pressure reducing valve according to claim 3, further comprising a calculator configured to calculate a changing ratio of the fuel pressure in the common rail based on the fuel pressure in the common rail detected by the engine condition detecting means, wherein the target reducing value means is configured to estimate the target reducing time by using a changing ratio of the fuel pressure in the common rail calculated by the calculator.

6. The control apparatus for the pressure reducing valve according to claim 4, further comprising a calculator configured to calculate a changing ratio of the fuel pressure in the common rail based on the fuel pressure in the common rail detected by the engine condition detecting means, wherein the target reducing value means is configured to estimate the target reducing time by using a changing ratio of the fuel pressure in the common rail calculated by the calculator.

7. The control apparatus for the pressure reducing valve according to claim 5, wherein the delay time estimating means is configured to estimate the delay time for opening the pressure reducing valve with reference to a first reference table in which the delay times for opening the pressure reducing valve depends on the conditions of the internal combustion engine detected by the engine condition detecting means.

8. The control apparatus for the pressure reducing valve according to claim 6, wherein the delay time estimating means is configured to estimate the delay time for closing the pressure reducing valve with reference to a second reference table in which the delay times for closing the pressure reducing valve depends on the conditions of the internal combustion engine detected by the engine condition detecting means.

9. The control apparatus for the pressure reducing valve according to claim 7, further comprising:

a delay time measurement means for measuring an actual delay time between a time when the command signal is outputted from the control unit of the fuel injection system and a further time when the pressure reducing valve starts to open for discharging the fuel accumulated in the fuel accumulating device; and a first reference table updating means for update the first reference table which contains a plurality of relationships between parameters indicative of the conditions of the internal combustion engine and the delay times for opening the pressure reducing valve based on the actual delay time measured by the delay time measurement means.

10. The control apparatus for the pressure reducing valve according to claim 8, further comprising:

a delay time measurement means for measuring an actual delay time between a time when the command signal is outputted from the control unit of the fuel injection system and a further time when the pressure reducing valve starts to close for stopping discharging the fuel accumulated in the fuel accumulating device; and a first reference table updating means for update the second reference table which contains a plurality of relationships between parameters indicative of the conditions of the internal combustion engine and the delay times for closing the pressure reducing valve based on the actual delay time measured by the delay time measurement means.

11. The control apparatus for the pressure reducing valve according to claim 9, further comprising a first learning commanding means for outputting the command signal for opening the pressure reducing valve when it arrives at a predetermined time for learning a actual relationship between the delay in opening the pressure reducing valve and the operating state or operating conditions of the internal combustion engine and updating the first reference table based on the actual relationship between the delay in opening the pressure reducing valve and the operating state or operating conditions of the internal combustion engine.

12. The control apparatus for the pressure reducing valve according to claim 10, further comprising a first learning commanding means for outputting the command, signal for closing the pressure reducing valve when it arrives at a predetermined time for learning a actual relationship between the delay in closing the pressure reducing valve and the operating state or operating conditions of the internal combustion engine and updating the second reference table based on the actual relationship between the delay in closing the pressure reducing valve and the operating state or operating conditions of the internal combustion engine.

13. The control apparatus for the pressure reducing valve according to claim 9, further comprising;

a pressure intensifying means for intensifying the fuel pressure in the fuel accumulating device from the current value of the fuel pressure obtained by the engine condition detecting means to a first predetermined value of the fuel pressure when it arrives at a predetermined time for learning a actual relationship between the delay in closing the pressure reducing valve and the operating state or operating conditions of the internal combustion engine and updating the second reference table based on the actual relationship between the delay in closing the pressure reducing valve and the operating state or operating conditions of the internal combustion engine; and a second learning commanding means for outputting the command signal for opening the pressure reducing valve when the fuel pressure in the fuel accumulating device reaches a second predetermined value of the fuel pressure in order to learn a actual relationship between the delay in closing the pressure reducing valve and the operating state or operating conditions of the internal combustion engine and to update the second reference table based on the actual relationship between the delay in closing the pressure reducing valve and the operating state or operating conditions of the internal combustion engine.

14. The control apparatus for the pressure reducing valve according to claim 10, further comprising;

a pressure intensifying means for intensifying the fuel pressure in the fuel accumulating device from the current value of the fuel pressure obtained by the engine condition detecting means to a first predetermined value of the fuel pressure when it arrives at a predetermined time for learning a actual relationship between the delay in opening the pressure reducing valve and the operating state or operating conditions of the internal combustion engine and updating the second reference table based on the actual relationship between the delay in opening the pressure reducing valve and the operating state or operating conditions of the internal combustion engine; and a second learning commanding means for outputting the command signal for opening the pressure reducing valve when the fuel pressure in the fuel accumulating device reaches a second predetermined value of the fuel pressure and outputting the command signal for closing the pressure reducing valve in order to learn a actual relationship between the delay in closing the pressure reducing valve and the operating state or operating conditions of the internal combustion engine and to update the second reference table based on the actual relationship between the delay in closing the pressure reducing valve and the operating state or operating conditions of the internal combustion engine.

15. The control apparatus for the pressure reducing valve according to claim 11, wherein the first learning commanding means performs outputting the command signal for opening the pressure reducing valve when the internal combustion engine of the vehicle is stopped.

16. The control apparatus for the pressure reducing valve according to claim 12, wherein the second learning commanding means performs outputting the command signal for opening the pressure reducing valve when the internal combustion engine of the vehicle is stopped.

17. The control apparatus for the pressure reducing valve according to claim 9, further comprising a valve opening detecting means for detecting an evidence indicating the pressure reducing valve is surely opened based on the change ratio of pressure value, wherein the delay time measurement means is configured to measure the delay time in the manner where it is considered that a time when the pressure reducing valve starts to move for adjusting degree of opening of the pressure reducing valve is equal to a further time when the valve opening detecting means detects the evidence indicating the pressure reducing valve is surely opened.

18. The control apparatus for the pressure reducing valve according to claim 10, further comprising a valve closing detecting means for detecting an evidence indicating the pressure reducing valve is surely closed based on the changing ratio of pressure value, wherein the delay time measurement means is configured to measure the delay time in the manner where it is considered that a time when the pressure reducing valve starts to move for adjusting degree of closing of the pressure reducing valve is equal to a further time when the valve closing detecting means detects the evidence indicating the pressure reducing valve is surely closed.

19. The control apparatus for the pressure reducing valve according to claim 17, wherein the engine condition detecting means is configured to detect the fuel pressure in the common rail periodically with a first and a second periodic time being shorter than the first periodic time, the first periodic time being defined as a periodic time with which the engine condition detecting means detects the fuel pressure in the common rail when the valve opening detecting means is not running and the second being defined as a periodic time with which the engine condition detecting means detects the fuel pressure in the common rail when the valve opening detecting means is running.

20. The control apparatus for the pressure reducing valve according to claim 18, wherein the engine condition detecting means is configured to detect the fuel pressure in the common rail periodically with a first and a second periodic time being shorter than the first periodic time, the first periodic time being defined as a periodic time with which the engine condition detecting means detects the fuel pressure in the common rail when the valve closing detecting means is not running and the second being defined as a periodic time with which the engine condition detecting means detects the fuel pressure in the common rail when the valve closing detecting means is running.

21. A control method for a pressure reducing valve provided with a fuel accumulating device of a fuel injection system mounted on a vehicle for injecting the fuel into an internal combustion engine installed in the vehicle and is actuated in order to discharge a fuel accumulated in the fuel accumulating device in response to a command signal with a delay time being defined as an interval between a time when the command signal is outputted from a control unit of the fuel injection system and a further time when the pressure reducing valve starts to move for adjusting a degree of opening thereof, the control method comprising steps of:

detecting either an operating state or an operating condition of the internal combustion engine, either the operating state or the operating condition at least including fuel pressure in the fuel accumulating device sequentially;

estimating a target reducing time when the fuel pressure in the fuel accumulating device reaches at a predetermined target value of the fuel pressure in the fuel accumulating device;

estimating the delay time in accordance with either the operating state or the operating conditions of the internal combustion engine detected by the engine condition detecting means;

estimating a time distance which needs until the fuel pressure in the fuel accumulating device reaches the target value; and outputting the command signal to the pressure reducing valve to adjust the degree of opening of the pressure reducing valve when the time distance estimated by the time distance estimating means becomes to be shorter than the delay time estimated by the delay time estimating means such that the pressure reducing valve starts to change the degree of opening thereof when the fuel pressure in the fuel accumulating device reaches the target value.

22. The control method for the pressure reducing valve according to claim 21, further comprising a step of calculating a changing ratio of the fuel pressure in the common rail based on the fuel pressure in the common rail detected by the engine condition detecting means, wherein the target reducing time is estimated by using a changing ratio of the fuel pressure in the common rail.

23. The control method for the pressure reducing valve according to claim 21, wherein the delay time for opening the pressure reducing valve is estimated.

24. The control method for the pressure reducing valve according to claim 23, further comprising a step of calculating a changing ratio of the fuel pressure in the common rail based on the fuel pressure in the common rail, wherein the target reducing time is estimated by using a changing ratio of the fuel pressure in the common rail calculated.

25. The control method for the pressure reducing valve according to claim 21, wherein the delay time for closing the pressure reducing valve is estimated.

26. The control method for the pressure reducing valve according to claim 25, further comprising a step of calculating a changing ratio of the fuel pressure in the common rail based on the fuel pressure in the common rail, wherein the target reducing time is estimated by using a changing ratio of the fuel pressure in the common rail calculated.

27. A computer program embedded in a computer-readable medium for executing the method according to claim 21 when it is run on a computer.

* * * * *